US011533472B2

(12) United States Patent
Chen et al.

(10) Patent No.: US 11,533,472 B2
(45) Date of Patent: Dec. 20, 2022

(54) METHOD FOR REFERENCE PICTURE PROCESSING IN VIDEO CODING

(71) Applicant: ALIBABA GROUP HOLDING LIMITED, Grand Cayman (KY)

(72) Inventors: Jie Chen, Beijing (CN); Yan Ye, San Diego, CA (US); Ru-Ling Liao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/327,572

(22) Filed: May 21, 2021

(65) Prior Publication Data

US 2021/0368163 A1    Nov. 25, 2021

Related U.S. Application Data

(60) Provisional application No. 63/028,509, filed on May 21, 2020.

(51) Int. Cl.
| | |
|---|---|
| *H04N 19/105* | (2014.01) |
| *H04N 19/174* | (2014.01) |
| *H04N 19/172* | (2014.01) |
| *H04N 19/196* | (2014.01) |
| *H04N 19/139* | (2014.01) |
| *H04N 19/573* | (2014.01) |
| *H04N 19/70* | (2014.01) |

(52) U.S. Cl.
CPC ......... *H04N 19/105* (2014.11); *H04N 19/139* (2014.11); *H04N 19/172* (2014.11); *H04N 19/174* (2014.11); *H04N 19/196* (2014.11); *H04N 19/573* (2014.11); *H04N 19/70* (2014.11)

(58) Field of Classification Search
CPC combination set(s) only.
See application file for complete search history.

(56) References Cited

U.S. PATENT DOCUMENTS

2014/0341296 A1    11/2014  Sugio et al.
2021/0314624 A1*   10/2021  Coban ................... H04N 19/70

FOREIGN PATENT DOCUMENTS

WO    WO 2020/037272 A1    2/2020

OTHER PUBLICATIONS

Brass et al. Versatile Video Coding Joint Video Experts Team (JVET)of ITU-T SG 16 WP 3 and ISO/IEC JTC 1/SC 29/WG 11 Document: JVET-R2001-vB 18th Meeting: by teleconference, Apr. 15-24, 2020 (Year: 2020).*

(Continued)

*Primary Examiner* — William C Vaughn, Jr.
*Assistant Examiner* — Naod W Belai
(74) *Attorney, Agent, or Firm* — Finnegan, Henderson, Farabow, Garrett & Dunner, LLP

(57) ABSTRACT

The present disclosure provides a computer-implemented method for video processing. The method includes deriving a total number by summing a number of reference picture list structures in sequence parameter set (SPS) and one; allocating memory for the total number of reference picture list structures in response to a reference picture list structure being signaled in a picture header of a current picture or a slice header of a current slice; and processing a current picture or a current slice using the allocated memory.

3 Claims, 45 Drawing Sheets

(56) References Cited

OTHER PUBLICATIONS

"Requirements for a Future Video Coding Standard v5," International Organisation for Standardisation, Torino, IT, 14 pages (2017).
Bross et al., "Versatile Video Coding (Draft 9)," JVET-R2001-vB, 18th Meeting: by teleconference, Apr. 15-24, 2020, 523 pages.
Chen et al., "Algorithm Description of Joint Exploration Test Model 7 (JEM 7)," JVET-G1001-v1, $7^{th}$ Meeting: Torino, IT, Jul. 13-21, 2017, 50 pages.
Chen et al., "Algorithm description for Versatile Video Coding and Test Model 9 (VTM 9)," JVET-R2002-v2, $18^{th}$ Meeting: by teleconference, Apr. 15-24, 2020, 85 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://jvet.hhi.fraunhofer.de/svn/Svn_HMJEMSoftware.
Sullivan et al., "Overview of the High Efficiency Video Coding (HEVC) Standard," IEE Transactions on Circuits and Systems for Video Technology, vol. 22, No. 12, pp. 1649-1668 (2012).
PCT International Search Report and Written Opinion dated Aug. 24, 2021, issued in corresponding International Application No. PCT/US2021/033765 (9 pgs).

\* cited by examiner

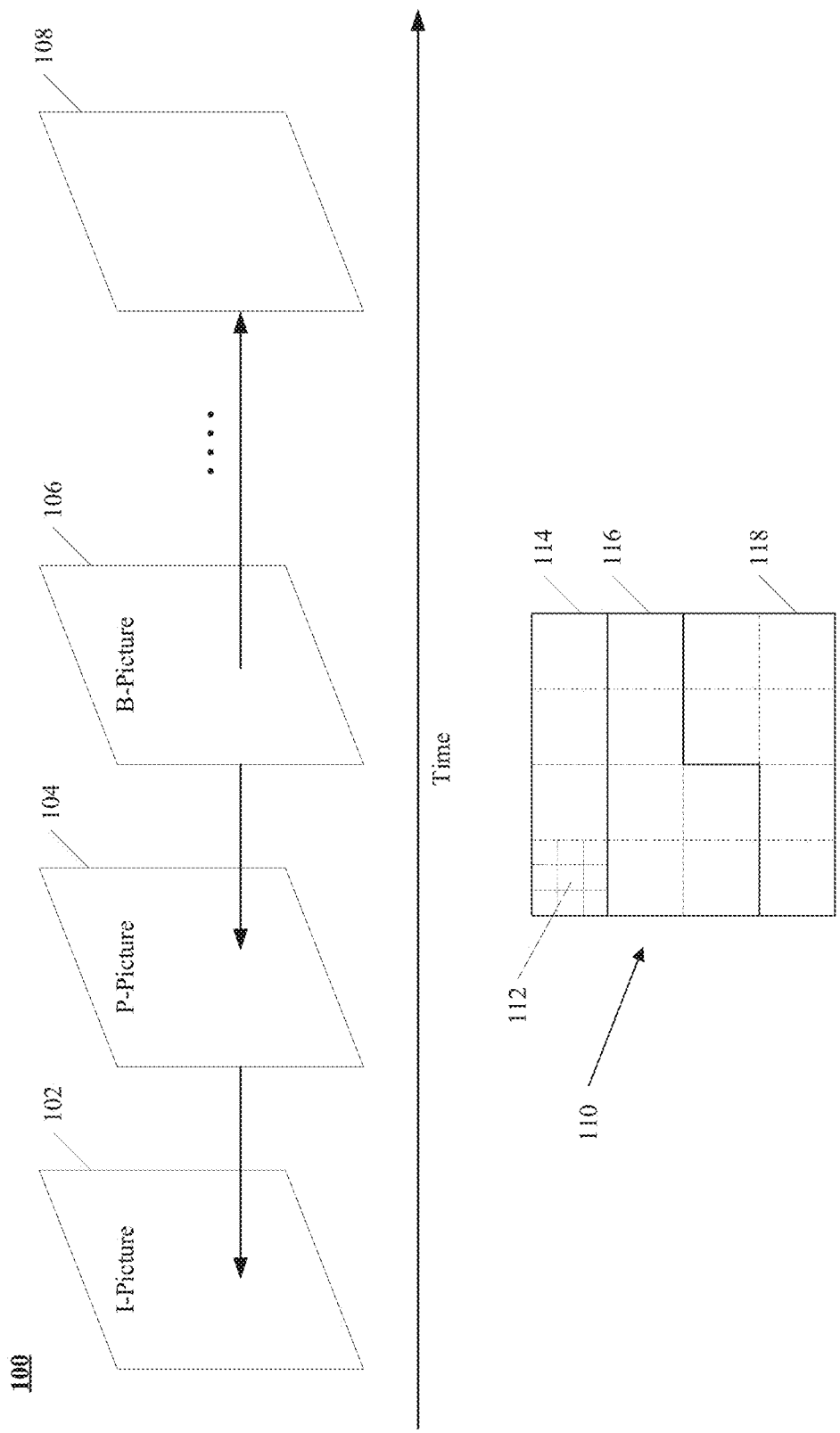

500A

| ref_pic_lists( ) { | Descriptor |
|---|---|
|   for( i = 0; i < 2; i++ ) { | |
|     if( sps_num_ref_pic_lists[ i ] > 0 &&<br>       ( i == 0 || ( i == 1 && pps_rpl1_idx_present_flag ) ) ) | |
|       rpl_sps_flag[ i ] | u(1) |
|     if( rpl_sps_flag[ i ] ) { | |
|       if( sps_num_ref_pic_lists[ i ] > 1 &&<br>         ( i == 0 || ( i == 1 && pps_rpl1_idx_present_flag ) ) ) | |
|         rpl_idx[ i ] | u(v) |
|     } else | |
|       ref_pic_list_struct( i, sps_num_ref_pic_lists[ i ] ) | |
|     for( j = 0; j < NumLtrpEntries[ i ][ RplsIdx[ i ] ]; j++ ) { | |
|       if( ltrp_in_header_flag[ i ][ RplsIdx[ i ] ] ) | |
|         poc_lsb_lt[ i ][ j ] | u(v) |
|       delta_poc_msb_cycle_present_flag[ i ][ j ] | u(1) |
|       if( delta_poc_msb_cycle_present_flag[ i ][ j ] ) | |
|         delta_poc_msb_cycle_lt[ i ][ j ] | ue(v) |
|     } | |
|   } | |
| } | |

510A → rpl_sps_flag[ i ]
520A → if( sps_num_ref_pic_lists[ i ] > 0 && ( i == 0 || ( i == 1 && pps_rpl1_idx_present_flag ) ) )
530A → rpl_idx[ i ]
540A → poc_lsb_lt[ i ][ j ]
550A → delta_poc_msb_cycle_present_flag[ i ][ j ]
560A → delta_poc_msb_cycle_lt[ i ][ j ]
570A → for( j = 0; j < NumLtrpEntries[ i ][ RplsIdx[ i ] ]; j++ )

FIG. 5A

```
if( j == 0 )
        deltaPocMsbCycleLt[ i ][ j ] = delta_poc_msb_cycle_lt[ i ][ j ]
else
        deltaPocMsbCycleLt[ i ][ j ] = delta_poc_msb_cycle_lt[ i ][ j ] + deltaPocMsbCycleLt[ i ][ j − 1 ]
FullPocLt[ i ][ j ] = PicOrderCntVal − deltaPocMsbCycleLt[ i ][ j ] * MaxPicOrderCntLsb −
        ( PicOrderCntVal & ( MaxPicOrderCntLsb − 1 ) ) + PocLsbLt[ i ][ j ]
```

| ref_pic_list_struct( listIdx, rplsIdx ) { | Descriptor |
|---|---|
|   num_ref_entries[ listIdx ][ rplsIdx ] | ue(v) |
|   if( sps_long_term_ref_pics_flag && rplsIdx < sps_num_ref_pic_lists[ listIdx ] ) | |
|     ltrp_in_header_flag[ listIdx ][ rplsIdx ] | u(1) |
|   for( i = 0, j = 0; i < num_ref_entries[ listIdx ][ rplsIdx ]; i++) { | |
|     if( sps_inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( sps_long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( !AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|     } | |
| } | |

610A → num_ref_entries
620A → ltrp_in_header_flag
630A → inter_layer_ref_pic_flag
640A → st_ref_pic_flag
650A → abs_delta_poc_st
660A → strp_entry_sign_flag
670A → rpls_poc_lsb_lt
680A → ilrp_idx
690A

FIG. 6A

```
for( i = 0, NumLtrpEntries[ listIdx ][ rplsIdx ] = 0; i < num_ref_entries[ listIdx ][ rplsIdx ]; i++ )
    if(!inter_layer_ref_pic_flag[ listIdx ][ rplsIdx ][ i ]  &&  !st_ref_pic_flag[ listIdx ][ rplsIdx ][ i ])
        NumLtrpEntries[ listIdx ][ rplsIdx ]++
```

FIG. 6B

```
if( ( sps_weighted_pred_flag || sps_weighted_bipred_flag ) && i != 0 )
        AbsDeltaPocSt[ listIdx ][ rplsIdx ][ i ] = abs_delta_poc_st[ listIdx ][ rplsIdx ][ i ]
else
        AbsDeltaPocSt[ listIdx ][ rplsIdx ][ i ] = abs_delta_poc_st[ listIdx ][ rplsIdx ][ i ] + 1
```

FIG. 6C

```
for( i = 0; i < num_ref_entries[ listIdx ][ rplsIdx ]; i++ )
    if( !inter_layer_ref_pic_flag[ listIdx ][ rplsIdx ][ i ] && st_ref_pic_flag[ listIdx ][ rplsIdx ][ i ] )
        DeltaPocValSt[ listIdx ][ rplsIdx ][ i ] = ( strp_entry_sign_flag[ listIdx ][ rplsIdx ][ i ] ) ?
            AbsDeltaPocSt[ listIdx ][ rplsIdx ][ i ] : 0 − AbsDeltaPocSt[ listIdx ][ rplsIdx ][ i ]
```

| seq_parameter_set_rbsp( ) { | Descriptor |
|---|---|
| ... | u(1) |
| sps_long_term_ref_pics_flag | u(1) |
| if( sps_video_parameter_set_id > 0 ) | |
| sps_inter_layer_ref_pics_present_flag | u(1) |
| sps_idr_rpl_present_flag | u(1) |
| sps_rpl1_same_as_rpl0_flag | u(1) |
| for( i = 0; i < sps_rpl1_same_as_rpl0_flag ? 1 : 2; i++ ) { | |
| sps_num_ref_pic_lists[ i ] | ue(v) |
| for( j = 0; j < sps_num_ref_pic_lists[ i ]; j++) | |
| ref_pic_list_struct( i, j ) | |
| } | |
| ... | u(1) |

710 → sps_long_term_ref_pics_flag
720 → sps_inter_layer_ref_pics_present_flag
730 → sps_idr_rpl_present_flag
740 → sps_rpl1_same_as_rpl0_flag
750 → sps_num_ref_pic_lists[ i ]

FIG. 7

| 800 | |
|---|---|
| pic_parameter_set_rbsp( ) { | Descriptor |
| ... | |
| for( i = 0; i < 2; i++ ) | |
|    pps_num_ref_idx_default_active_minus1[ i ] | ue(v) |
| pps_rpl1_idx_present_flag | u(1) |
| ... | u(1) |
| if( !pps_no_pic_partition_flag ) { | |
|    pps_rpl_info_in_ph_flag | u(1) |
| ... | ue(v) |
| } | |

810 — pps_num_ref_idx_default_active_minus1[ i ]
820 — pps_rpl1_idx_present_flag
830 — pps_rpl_info_in_ph_flag

FIG. 8

| 900A picture_header_structure( ) { | Descriptor |
|---|---|
|   if( pps_output_flag_present_flag && !ph_non_reference_picture_flag ) | |
|     ph_pic_output_flag | u(1) |
|   if( pps_rpl_info_in_ph_flag ) | |
|     ref_pic_lists( ) | |
|   ... | |
|   if( ph_inter_slice_allowed_flag ) { | |
|     if( sps_temporal_mvp_enabled_flag ) { | |
|       ph_temporal_mvp_enabled_flag | u(1) |
|       if( ph_temporal_mvp_enabled_flag && pps_rpl_info_in_ph_flag ) { | |
|         if( num_ref_entries[ 1 ][ RplsIdx[ 1 ] ] > 0 ) | |
|           ph_collocated_from_l0_flag | u(1) |
|         if ( ph_collocated_from_l0_flag &&            num_ref_entries[ 0 ][ RplsIdx[ 0 ] ] > 1 ) ||          ( !ph_collocated_from_l0_flag &&           num_ref_entries[ 1 ][ RplsIdx[ 1 ] ] > 1 ) ) | |
|           ph_collocated_ref_idx | ue(v) |
|       } | |
|     } | |
|     if( !pps_rpl_info_in_ph_flag || num_ref_entries[ 1 ][ RplsIdx[ 1 ] ] > 0 ) { | |
|       ph_mvd_l1_zero_flag | u(1) |
|     ... | |
|     } | |
|   ... | |

Labels: 910A, 920A, 930A, 940A, 950A, 960A

FIG. 9A

```
if( sps_affine_enabled_flag )
        MaxNumSubblockMergeCand = 5 - sps_five_minus_max_num_subblock_merge_cand
else
        MaxNumSubblockMergeCand = sps_sbtmvp_enabled_flag && ph_temporal_mvp_enabled_flag
```

| slice_header( ) { | Descriptor |
|---|---|
| ... | u(1) |
| if( !pps_rpl_info_in_ph_flag && ( ( nal_unit_type != IDR_W_RADL && nal_unit_type != IDR_N_LP ) \|\| sps_idr_rpl_present_flag ) ) | |
|   ref_pic_lists( ) | |
| if( ( ( sh_slice_type != I && num_ref_entries[ 0 ][ RplsIdx[ 0 ] ] > 1 ) \|\| ( sh_slice_type == B && num_ref_entries[ 1 ][ RplsIdx[ 1 ] ] > 1 ) ) ) { | |
|   sh_num_ref_idx_active_override_flag | u(1) |
|   if( sh_num_ref_idx_active_override_flag ) | |
|     for( i = 0; i < ( sh_slice_type == B ? 2 : 1 ); i++ ) | |
|       if( num_ref_entries[ i ][ RplsIdx[ i ] ] > 1 ) | |
|         sh_num_ref_idx_active_minus1[ i ] | ue(v) |
| } | |
| if( sh_slice_type != I ) { | |
|   if( pps_cabac_init_present_flag ) | |
|     sh_cabac_init_flag | u(1) |
|   if( ph_temporal_mvp_enabled_flag && !pps_rpl_info_in_ph_flag ) { | |
|     if( sh_slice_type == B ) | |
|       sh_collocated_from_l0_flag | u(1) |
|     if( ( sh_collocated_from_l0_flag && NumRefIdxActive[ 0 ] > 1 ) \|\| ( !sh_collocated_from_l0_flag && NumRefIdxActive[ 1 ] > 1 ) ) | |
|       sh_collocated_ref_idx | ue(v) |
|   } | |
|   if( !pps_wp_info_in_ph_flag && ( ( pps_weighted_pred_flag && sh_slice_type == P ) \|\| ( pps_weighted_bipred_flag && sh_slice_type == B ) ) ) | |
|     pred_weight_table( ) | |
| } | |

1010A — sh_num_ref_idx_active_override_flag
1020A — sh_num_ref_idx_active_minus1[ i ]
1030A — sh_cabac_init_flag
1040A — sh_collocated_from_l0_flag
1050A — sh_collocated_ref_idx
1060A

FIG. 10A

The variable NumRefIdxActive[ i ] is derived as follows:

```
for( i = 0; i < 2; i++ ) {
    if( sh_slice_type == B || ( sh_slice_type == P && i == 0 ) ) {
        if( sh_num_ref_idx_active_override_flag )
            NumRefIdxActive[ i ] = sh_num_ref_idx_active_minus1[ i ] + 1                    (1)
        else {
            if( num_ref_entries[ i ][ RplsIdx[ i ] ] >= pps_num_ref_idx_default_active_minus1[ i ] + 1 )
                NumRefIdxActive[ i ] = pps_num_ref_idx_default_active_minus1[ i ] + 1
            else
                NumRefIdxActive[ i ] = num_ref_entries[ i ][ RplsIdx[ i ] ]
        }
    } else /* sh_slice_type == I || ( sh_slice_type == P && i == 1 ) */
        NumRefIdxActive[ i ] = 0
}
```

FIG. 10B

| 1100C | | |
|---|---|---|
| picture_header_structure( ) { | | Descriptor |
| ... | | |
| if( pps_output_flag_present_flag && !ph_non_reference_picture_flag ) | | |
|   ph_pic_output_flag | | u(1) |
| if( pps_rpl_info_in_ph_flag ) | | |
|   ref_pic_lists( ) | | |
| ... | | |
| if( ph_inter_slice_allowed_flag ) { | | |
| ... | | |
| if( sps_temporal_mvp_enabled_flag ) { | | |
|   ph_temporal_mvp_enabled_flag | | u(1) |
|   if( ph_temporal_mvp_enabled_flag && pps_rpl_info_in_ph_flag ) { | | |
| 1110C     if( num_ref_entries[0][RplsIdx[0]] > 0 && num_ref_entries[1][RplsIdx[1]] > 0 ) | | |
|       ph_collocated_from_l0_flag | | u(1) |
|     if( ph_collocated_from_l0_flag && | | |
|       num_ref_entries[0][RplsIdx[0]] > 1 ) || | | |
|       ( !ph_collocated_from_l0_flag && | | |
|       num_ref_entries[1][RplsIdx[1]] > 1 ) ) | | |
|       ph_collocated_ref_idx | | ue(v) |
|     } | | |
|   } | | |
|   ... | | |
| 1120C   if( !pps_rpl_info_in_ph_flag || ( num_ref_entries[0][RplsIdx[0]] > 0 && | | |
|     num_ref_entries[1][RplsIdx[1]] > 0 ) ) { | | |
|     ph_mvd_l1_zero_flag | | u(1) |
|     ... | | |
|   } | | |
| } | | |
| ... | | |

FIG. 11C

| pic_parameter_set_rbsp( ) { | Descriptor |
|---|---|
| .... | |
| if( sps_temporal_mvp_enabled_flag ) { | |
|   ph_temporal_mvp_enabled_flag | u(1) |
|   ~~if( ph_temporal_mvp_enabled_flag && pps_rpl_info_in_ph_flag ) {~~ | |
|     ~~if( num_ref_entries[ 1 ][ RplsIdx[ 1 ] ] > 0 )~~ | |
|       ~~ph_collocated_from_l0_flag~~ | ~~u(1)~~ |
|     ~~if( ( ph_collocated_from_l0_flag &&~~ | |
|       ~~num_ref_entries[ 0 ][ RplsIdx[ 0 ] ] > 1 ) ||~~ | |
|       ~~( !ph_collocated_from_l0_flag &&~~ | |
|       ~~num_ref_entries[ 1 ][ RplsIdx[ 1 ] ] > 1 ) )~~ | |
|       ~~ph_collocated_ref_idx~~ | ~~ue(v)~~ |
|   if( sps_inter_layer_ref_pics_present_flag ) | |
|     inter_layer_col_pic_flag | u(1) |
|   if( !inter_layer_col_pic_flag ) { | |
|     if( sps_long_term_ref_pics_flag ) | |
|       st_col_pic_flag | u(1) |
|     if( st_col_pic_flag) { | |
|       abs_delta_poc_st_col | ue(v) |
|       if( AbsDeltaPocStCol > 0 ) | |
|         sign_delta_poc_st_col_flag | u(1) |
|     } else { | |
|       poc_lsb_lt_col | u(v) |
|       delta_poc_msb_cycle_col_present_flag | u(1) |
|       if( delta_poc_msb_cycle_col_present_flag ) | |
|         delta_poc_msb_cycle_lt_col | ue(v) |
|     } else | |
|       inter_layer_col_pic_idx | ue(v) |
|   } | |
| } | |
| ... | |

1200F

1210F — inter_layer_col_pic_flag
1220F — st_col_pic_flag
1230F — abs_delta_poc_st_col
1240F — sign_delta_poc_st_col_flag
1250F — poc_lsb_lt_col
1260F — delta_poc_msb_cycle_col_present_flag
1270F — delta_poc_msb_cycle_lt_col
1280F — inter_layer_col_pic_idx

| slice_header( ) { | Descriptor |
|---|---|
| ... | |
| ~~if( ph_temporal_mvp_enabled_flag && !pps_rpl_info_in_ph_flag ) {~~ | |
| ~~if( sh_slice_type == B )~~ | |
| ~~sh_collocated_from_l0_flag~~ | ~~u(1)~~ |
| ~~if( ( sh_collocated_from_l0_flag && NumRefIdxActive[ 0 ] > 1 ) \|\|~~ | |
| ~~( !sh_collocated_from_l0_flag && NumRefIdxActive[ 1 ] > 1 ) )~~ | |
| ~~sh_collocated_ref_idx~~ | ~~ue(v)~~ |
| ~~}~~ | |
| ... | |

1210G points to the struck-through block.

FIG. 12G

```
if( (sps_weighted_pred_flag || sps_weighted_bipred_flag ) && i != 0 )
    AbsDeltaPocStCol= abs_delta_poc_st_col
else
    AbsDeltaPocStCol =   abs_delta_poc_st_col+ 1
```

The variable DeltaPocValStCol is derived as follows:

if( !inter_layer_col_pic_flag && st_ref_pic_col_flag)
DeltaPocValStCol = sign_delta_poc_st_col_flag ? AbsDeltaPocStCol : 0 − AbsDeltaPocStCol

FIG. 12I

```
colPic="no reference picture"
colPicFlag = 1
for( i = 0; i < 2; i++ ) {
        for( j = 0, k = 0, pocBase = PicOrderCntVal; j < num_ref_entries[ i ][ RplsIdx[ i ] ]; j++ ) {
                if( !inter_layer_ref_pic_flag[ i ][ RplsIdx[ i ] ][ j ] ) {
                        if( st_ref_pic_flag[ i ][ RplsIdx[ i ] ][ j ] ) {
                                RefPicPocList[ i ][ j ] = pocBase − DeltaPocValSt[ i ][ RplsIdx[ i ] ][ j ]
                                if( there is a reference picture picA in the DPB with the same nuh_layer_id
as the current picture
                                                        and PicOrderCntVal equal to RefPicPocList[ i ][ j ] ){
                                        RefPicList[ i ][ j ] = picA
                                        if(ph_temporal_mvp_enabled_flag && !inter_layer_col_pic_flag &&
st_col_pic_flag &&
        DeltaPocValSt[ i ][ RplsIdx[ i ] ][ j ] ==
DeltaPocValStCol && colPic != "no reference picture")
                                                colPic=picA
                                }
                                else
                                        RefPicList[ i ][ j ] = "no reference picture"
                                pocBase = RefPicPocList[ i ][ j ]
                        } else {
                                if( !delta_poc_msb_cycle_present_flag[ i ][ k ] ){
                                        if( there is a reference picA in the DPB with the same nuh_layer_id
as the current picture and
        PicOrderCntVal & ( MaxPicOrderCntLsb − 1 ) equal to PocLsbLt[ i ][ k ] ){
                                                RefPicList[ i ][ j ] = picA
                                                if(ph_temporal_mvp_enabled_flag &&
!inter_layer_col_pic_flag && !st_col_pic_flag && !
        delta_poc_msb_cycle_col_present_flag &&
        (PicOrderCntVal & ( MaxPicOrderCntLsb − 1 )) equal to poc_lsb_lt_col && colPic !=
                                                                "no reference picture")
                                                        colPic = picA
                                        }
                                        else
                                                RefPicList[ i ][ j ] = "no reference picture"
                                        RefPicLtPocList[ i ][ j ] = PocLsbLt[ i ][ k ]
                                } else {
                                        if( there is a reference picA in the DPB with the same nuh_layer_id
as the current picture and
                                                        PicOrderCntVal equal to
        FullPocLt[ i ][ k ] ){
                                                RefPicList[ i ][ j ] = picA
                                                if(ph_temporal_mvp_enabled_flag &&
!inter_layer_col_pic_flag && !st_col_pic_flag &&
        delta_poc_msb_cycle_col_present_flag && PicOrderCntVal equal to FullPocLtCol
                                                                && colPic != "no reference picture")
                                                        colPic = picA
                                        }
```

FIG. 12J

```
                else
                    RefPicList[ i ][ j ] = "no reference picture"
                    RefPicLtPocList[ i ][ j ] = FullPocLt[ i ][ k ]
                }
                k++
            }
        } else {
            layerIdx = DirectRefLayerIdx[ GeneralLayerIdx[ nuh_layer_id ] ][ ilrp_idx[ i ][ RplsIdx ][ j ] ]
            refPicLayerId = vps_layer_id[ layerIdx ]
            if( there is a reference picture picA in the DPB with nuh_layer_id equal to refPicLayerId and
                the same PicOrderCntVal as the current picture ){
                RefPicList[ i ][ j ] = picA
                if(ph_temporal_mvp_enabled_flag && inter_layer_col_pic_flag &&
inter_layer_col_pic_idx
                    == ilrp_idx[ i ][ RplsIdx ][ j ] &&
                    colPic != "no reference picture")
                    colPic = picA
            else
                RefPicList[ i ][ j ] = "no reference picture"
        }
        fRefWidth is set equal to CurrPicScalWinWidthL of the reference picture RefPicList[ i ][ j ]
        fRefHeight is set equal to CurrPicScalWinHeightL of the reference picture RefPicList[ i ][ j ]

refPicWidth, refPicHeight, refScalingWinLeftOffset, refScalingWinRightOffset,
refScalingWinTopOffset,
            and refScalingWinBottomOffset, are set equal to the values of
pps_pic_width_in_luma_samples,
                pps_pic_height_in_luma_samples, pps_scaling_win_left_offset,
pps_scaling_win_right_offset,
                pps_scaling_win_top_offset, and pps_scaling_win_bottom_offset, respectively, of the
reference picture
            RefPicList[ i ][ j ]

RefPicScale[ i ][ j ][ 0 ] = ( ( fRefWidth << 14 ) + ( CurrPicScalWinWidthL >> 1 ) ) /
            CurrPicScalWinWidthL
        RefPicScale[ i ][ j ][ 1 ] = ( ( fRefHeight << 14 ) + ( CurrPicScalWinHeightL >> 1 ) ) /
            CurrPicScalWinHeightL
        RprConstraintsActive[ i ][ j ] = ( pps_pic_width_in_luma_samples != refPicWidth ||
            pps_pic_height_in_luma_samples != refPicHeight ||
            pps_scaling_win_left_offset != refScalingWinLeftOffset ||
            pps_scaling_win_right_offset != refScalingWinRightOffset ||
            pps_scaling_win_top_offset != refScalingWinTopOffset ||
            pps_scaling_win_bottom_offset != refScalingWinBottomOffset )
        if(colPic != "no_reference pic")
            colPicFlag = RprConstraintsActive[ i ][ j ]
    }
}
```

1302A — Determining whether to signal a parameter to indicate a reference index of a collocated picture in a slice header.

1304A — In response to the parameter not being signaled in the slice header, determining the collocated picture as the picture referred to by an index with a value equal to a smaller one between a value of a reference index of the collocated picture signaled in a picture header and a number of active entries in a target reference picture list minus 1

1306A — Encoding a current picture based on the collocated picture, wherein the collocated picture is used for temporal motion vector prediction.

When sh_collocated_ref_idx is not present, the following applies:

– If pps_rpl_info_in_ph_flag is equal to 1, the value of sh_collocated_ref_idx is inferred to be equal to ~~ph_collocated_ref_idx~~ *min(ph_collocated_ref_idx, NumRefIdxActive[ sh_collocated_from_l0_flag ] − 1)*.

– Otherwise (pps_rpl_info_in_ph_flag is equal to 0), the value of sh_collocated_ref_idx is inferred to be equal to 0.

FIG. 13C

For each value of listIdx (equal to 0 or 1), a decoder should allocate memory for a total number of sps_num_ref_pic_lists[ i ] + 1 ref_pic_list_struct( listIdx, rplsIdx ) syntax structures since there may be one ref_pic_list_struct( listIdx, rplsIdx ) syntax structure directly signalled in the *picture headers or* slice headers of a current picture.

1410B

FIG. 14B rpl_idx[ i ] specifies the index, into the list of the ref_pic_list_struct( listIdx, rplsIdx ) syntax structures with listIdx equal to i included in the SPS, of the ref_pic_list_struct( listIdx, rplsIdx ) syntax structure with listIdx equal to i that is used for derivation of reference picture list i of the current picture. The syntax element rpl_idx[ i ] is represented by Ceil( Log2( sps_num_ref_pic_lists[ i ] ) ) bits. The value of rpl_idx[ i ] shall be in the range of 0 to sps_num_ref_pic_lists[ i ] − 1, inclusive. ~~When not present, if rpl_sps_flag[i] is equal to 1 and pps_rpl1_idx_present_flag is equal to 0, the value of rpl_idx[ 1 ] is inferred to be equal to rpl_idx[ 0 ], otherwise the value of rpl_idx[ 1 ] is inferred to be equal to 0.~~

When the value of rpl_sps_flag[i] is equal to 1 and rpl_idx[i] is not present, rpl_idx[i] is inferred as follows:

1510C
1511C
- if sps_num_ref_pic_list[i] is less than or equal to 1, the value of rpl_idx[i] is inferred to be equal to 0.
- Otherwise (sps_num_ref_pic_list[i] is greater than 1), when rpl_sps_flag[i] is equal to 1, pps_rpl1_idx_present_flag is equal to 0 and i is equal to 1, the value of rpl_idx[1] is inferred to be equal to rpl_idx[0].

Or the inference rule can also be expressed as

When the value of rpl_sps_flag[i] is equal to 1 and rpl_idx[i] is not present, rpl_idx[i] is inferred as follows:

1520C
1521C
- if sps_num_ref_pic_list[i] is less than or equal to 1, the value of rpl_idx[i] is inferred to be equal to 0.
- Otherwise, when sps_num_ref_pic_list[1] is greater than 1, rpl_sps_flag[1] is equal to 1, pps_rpl1_idx_present_flag is equal to 0, the value of rpl_idx[1] is inferred to be equal to rpl_idx[0].

FIG. 15C

1610C — sh_num_ref_idx_active_override_flag equal to 1 specifies that the syntax element sh_num_ref_idx_active_minus1[ 0 ] is *may be* present for P and B slices and the syntax element sh_num_ref_idx_active_minus1[ 1 ] is *may be* present for B slices. sh_num_ref_idx_active_override_flag equal to 0 specifies that the syntax elements sh_num_ref_idx_active_minus1[ 0 ] and sh_num_ref_idx_active_minus1[ 1 ] are not present. When not present, the value of sh_num_ref_idx_active_override_flag is inferred to be equal to 1.

Alternatively, it may also be changed as follows

1620C — sh_num_ref_idx_active_override_flag equal to 1 specifies that the syntax element sh_num_ref_idx_active_minus1[ 0 ] is present for P and B slices *when num_ref_entries[ 0 ][ RplsIdx[ 0 ] ] is greater than 1* and the syntax element sh_num_ref_idx_active_minus1[ 1 ] is present for B slices *when num_ref_entries[ 1 ][ RplsIdx[ 1 ] ] is greater than 1*. sh_num_ref_idx_active_override_flag equal to 0 specifies that the syntax elements sh_num_ref_idx_active_minus1[ 0 ] and sh_num_ref_idx_active_minus1[ 1 ] are not present. When not present, the value of sh_num_ref_idx_active_override_flag is inferred to be equal to 1.

FIG. 16C

1710B — It is a requirement of bitstream conformance that the picture referred to by sh_collocated_ref_idx is the same for all *non-I* slices of a coded picture and RprConstraintsActive[ sh_collocated_from_l0_flag ? 0 : 1 ][ sh_collocated_ref_idx ] shall be equal to 0.

1720B — It is a requirement of bitstream conformance that the picture referred to by sh_collocated_ref_idx is the same for all ~~I slices~~ *P slices and B slices* of a coded picture and RprConstraintsActive[ sh_collocated_from_l0_flag ? 0 : 1 ][ sh_collocated_ref_idx ] shall be equal to 0.

FIG. 17B

METHOD FOR REFERENCE PICTURE PROCESSING IN VIDEO CODING

CROSS-REFERENCE TO RELATED APPLICATIONS

This disclosure claims the benefits of priority to U.S. Provisional Application No. 63/028,509, filed on May 21, 2020, which is incorporated herein by reference in its entirety.

TECHNICAL FIELD

The present disclosure generally relates to video processing, and more particularly, to methods, apparatus and a non-transitory computer-readable storage medium for processing reference pictures.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for video processing. In some embodiments, the method includes: deriving a total number by summing a number of reference picture list structures in sequence parameter set (SPS) and one; allocating memory for the total number of reference picture list structures in response to a reference picture list structure being signaled in a picture header of a current picture or a slice header of a current slice; and processing a current picture or a current slice using the allocated memory.

In some embodiments, the method includes: signaling a first flag in a picture parameter set (PPS) to indicate whether a second flag and a first index is present in a picture header syntax or a slice header for a current picture referring to the PPS; wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1; determining whether the first index and a second index to be signaled, wherein the second index is an index, to the list of the reference picture list structures associated with reference picture list 0 included in the SPS, of the reference picture list structure associated with reference picture list 0 that is used for derivation of reference picture list 0; in response to the second index not to be signaled, determining a value of the second index comprising: when at most one reference picture list structure associated with reference picture list 0 is included in SPS, determining the value of the second index to be equal to 0; in response to the first index not to be signaled, determining a value of the first index comprising: when at most one reference picture list structure associated with reference picture list 1 is included in SPS, determining the value of the first index to be equal to 0; and when the first flag is equal to 0 and the second flag is equal to 1, determining the value of the first index to be equal to the value of the second index; deriving the reference picture list based on the first index and the second index; and encoding the current picture based on the reference picture list.

In some embodiments, the method includes: receiving a video bitstream; determining a value of a first flag indicating whether a second flag and a first index is present in a picture header syntax or a slice header for a current picture, wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1; determining whether the first index and a second index being present, wherein the second index is the index, to the list of the reference picture list structures associated with reference picture list 0 included in the SPS, of the reference picture list structure associated with reference picture list 0 that is used for derivation of reference picture list 0; in response to the second index being not present, determining a value of the second index comprising: when at most one reference picture list structure associated with reference picture list 0 is included in SPS, determining the value of the second index to be equal to 0; in response to the first index being not present, determining a value of the first index comprising: when at most one reference picture list structure associated with reference picture list 1 is included in SPS, determining the value of the first index to be equal to 0; and when the first flag is equal to 0 and the second flag is equal to 1, determining the value of the first index to be equal to the value of the second index; and decoding a current picture based on the first index and the second index.

In some embodiments, the method includes: signaling a first flag in a slice header to indicate whether an active reference index number is present in a slice header, wherein the active reference index number is used to derive maximum reference index for a corresponding reference picture list that is used to encode a current slice; in response to the first flag indicating the active reference index number is present in the slice header, determining a number of entries of reference picture list 0, and signaling the active reference index number of reference picture list 0 in the slice header for P and B slice when the number of entries of reference picture list 0 is greater than 1; and determining a number of entries of reference picture list 1, and signaling the active reference index number of reference picture list 1 in the slice header for B slice when the number of entries of reference picture list 1 is greater than 1.

In some embodiments, the method includes: receiving a video bitstream including a slice header and a picture header syntax; determining a value of a first flag signaled in the slice header that indicates whether an active reference index number is present in the slice header, wherein the active reference index number is used to derive maximum reference index for a corresponding reference picture list that is used to decode a current slice; in response to the first flag indicating the active reference index number is present, determining a number of entries of reference picture list 0, and decoding the active reference index number of reference picture list 0 in the slice header for P and B slice when the number of entries of reference picture list 0 is greater than 1; and determining a number of entries of reference picture list 1, and decoding the active reference index number of reference picture list 1 in slice header for B slice when a number of entries of reference picture list 1 is greater than 1.

In some embodiments, the method includes: determining a collocated picture referred to by a reference index of the collocated picture in slice level, wherein the collocated picture is determined to be a same picture for all non-I slices of a current picture; and processing the current picture based on the collocated picture, wherein the collocated picture is used for temporal motion vector prediction.

Embodiments of the present disclosure provide an apparatus for performing video processing. In some embodiments, the apparatus comprising: a memory configured to store instructions; and one or more processors configured to execute the instructions to cause the apparatus to perform: deriving a total number by summing a number of reference picture list structures in sequence parameter set (SPS) and one; allocating memory for the total number of reference picture list structures in response to a reference picture list structure being signaled in a picture header of a current picture or a slice header of a current slice; and processing a current picture or a current slice using the allocated memory.

In some embodiments, the apparatus comprising: a memory configured to store instructions; and one or more processors configured to execute the instructions to cause the apparatus to perform: signaling a first flag in a picture parameter set (PPS) to indicate whether a second flag and a first index is present in a picture header syntax or a slice header for a current picture referring to the PPS; wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1; determining whether the first index and a second index to be signaled, wherein the second index is an index, to the list of the reference picture list structures associated with reference picture list 0 included in the SPS, of the reference picture list structure associated with reference picture list 0 that is used for derivation of reference picture list 0; in response to the second index not to be signaled, determining a value of the second index comprising: when at most one reference picture list structure associated with reference picture list 0 is included in SPS, determining the value of the second index to be equal to 0; in response to the first index not to be signaled, determining a value of the first index comprising: when at most one reference picture list structure associated with reference picture list 1 is included in SPS, determining the value of the first index to be equal to 0; and when the first flag is equal to 0 and the second flag is equal to 1, determining the value of the first index to be equal to the value of the second index; deriving the reference picture list based on the first index and the second index; and encoding the current picture based on the reference picture list.

In some embodiments, the apparatus comprising: a memory configured to store instructions; and one or more processors configured to execute the instructions to cause the apparatus to perform: receiving a video bitstream; determining a value of a first flag indicating whether a second flag and a first index is present in a picture header syntax or a slice header for a current picture, wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1; determining whether the first index and a second index being present, wherein the second index is the index, to the list of the reference picture list structures associated with reference picture list 0 included in the SPS, of the reference picture list structure associated with reference picture list 0 that is used for derivation of reference picture list 0; in response to the second index being not present, determining a value of the second index comprising: when at most one reference picture list structure associated with reference picture list 0 is included in SPS, determining the value of the second index to be equal to 0; in response to the first index being not present, determining a value of the first index comprising: when at most one reference picture list structure associated with reference picture list 1 is included in SPS, determining the value of the first index to be equal to 0; and when the first flag is equal to 0 and the second flag is equal to 1, determining the value of the first index to be equal to the value of the second index; and decoding a current picture based on the first index and the second index.

In some embodiments, the apparatus comprising: a memory configured to store instructions; and one or more processors configured to execute the instructions to cause the apparatus to perform: signaling a first flag in a slice header to indicate whether an active reference index number is present in a slice header, wherein the active reference index number is used to derive maximum reference index for a corresponding reference picture list that is used to encode a current slice; in response to the first flag indicating the active reference index number is present in the slice header, determining a number of entries of reference picture list 0, and signaling the active reference index number of reference picture list 0 in the slice header for P and B slice when the number of entries of reference picture list 0 is greater than 1; and determining a number of entries of reference picture list 1, and signaling the active reference index number of reference picture list 1 in the slice header for B slice when the number of entries of reference picture list 1 is greater than 1.

In some embodiments, the apparatus comprising: a memory configured to store instructions; and one or more processors configured to execute the instructions to cause the apparatus to perform: receiving a video bitstream including a slice header and a picture header syntax; determining a value of a first flag signaled in the slice header that indicates whether an active reference index number is present in the slice header, wherein the active reference index number is used to derive maximum reference index for a corresponding reference picture list that is used to decode a current slice; in response to the first flag indicating the active reference index number is present, determining a number of entries of reference picture list 0, and decoding the active reference index number of reference picture list 0 in the slice header for P and B slice when the number of entries of reference picture list 0 is greater than 1; and determining a number of entries of reference picture list 1, and decoding the active reference index number of reference picture list 1 in slice header for B slice when a number of entries of reference picture list 1 is greater than 1.

In some embodiments, the apparatus comprising: a memory configured to store instructions; and one or more processors configured to execute the instructions to cause the apparatus to perform: determining a collocated picture referred to by a reference index of the collocated picture in slice level, wherein the collocated picture is determined to be a same picture for all non-I slices of a current picture; and processing the current picture based on the collocated picture, wherein the collocated picture is used for temporal motion vector prediction.

Embodiments of the present disclosure provide a non-transitory computer-readable storage medium that stores a set of instructions that is executable by one or more processors of an apparatus to cause the apparatus to initiate a method for performing video processing. In some embodiments, the method includes: deriving a total number by summing a number of reference picture list structures in sequence parameter set (SPS) and one; allocating memory for the total number of reference picture list structures in response to a reference picture list structure being signaled in a picture header of a current picture or a slice header of a current slice; and processing a current picture or a current slice using the allocated memory.

In some embodiments, the method includes: signaling a first flag in a picture parameter set (PPS) to indicate whether a second flag and a first index is present in a picture header syntax or a slice header for a current picture referring to the PPS; wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1; determining whether the first index and a second index to be signaled, wherein the second index is an index, to the list of the reference picture list structures associated with reference picture list 0 included in the SPS, of the reference picture list structure associated with reference picture list 0 that is used for derivation of reference picture list 0; in response to the second index not to be signaled, determining a value of the second index comprising: when at most one reference picture list structure associated with reference picture list 0 is included in SPS, determining the value of the second index to be equal to 0; in response to the first index not to be signaled, determining a value of the first index comprising: when at most one reference picture list structure associated with reference picture list 1 is included in SPS, determining the value of the first index to be equal to 0; and when the first flag is equal to 0 and the second flag is equal to 1, determining the value of the first index to be equal to the value of the second index; deriving the reference picture list based on the first index and the second index; and encoding the current picture based on the reference picture list.

In some embodiments, the method includes: receiving a video bitstream; determining a value of a first flag indicating whether a second flag and a first index is present in a picture header syntax or a slice header for a current picture, wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1; determining whether the first index and a second index being present, wherein the second index is the index, to the list of the reference picture list structures associated with reference picture list 0 included in the SPS, of the reference picture list structure associated with reference picture list 0 that is used for derivation of reference picture list 0; in response to the second index being not present, determining a value of the second index comprising: when at most one reference picture list structure associated with reference picture list 0 is included in SPS, determining the value of the second index to be equal to 0; in response to the first index being not present, determining a value of the first index comprising: when at most one reference picture list structure associated with reference picture list 1 is included in SPS, determining the value of the first index to be equal to 0; and when the first flag is equal to 0 and the second flag is equal to 1, determining the value of the first index to be equal to the value of the second index; and decoding a current picture based on the first index and the second index.

In some embodiments, the method includes: signaling a first flag in a slice header to indicate whether an active reference index number is present in a slice header, wherein the active reference index number is used to derive maximum reference index for a corresponding reference picture list that is used to encode a current slice; in response to the first flag indicating the active reference index number is present in the slice header, determining a number of entries of reference picture list 0, and signaling the active reference index number of reference picture list 0 in the slice header for P and B slice when the number of entries of reference picture list 0 is greater than 1; and determining a number of entries of reference picture list 1, and signaling the active reference index number of reference picture list 1 in the slice header for B slice when the number of entries of reference picture list 1 is greater than 1.

In some embodiments, the method includes: receiving a video bitstream including a slice header and a picture header syntax; determining a value of a first flag signaled in the slice header that indicates whether an active reference index number is present in the slice header, wherein the active reference index number is used to derive maximum reference index for a corresponding reference picture list that is used to decode a current slice; in response to the first flag indicating the active reference index number is present, determining a number of entries of reference picture list 0, and decoding the active reference index number of reference picture list 0 in the slice header for P and B slice when the number of entries of reference picture list 0 is greater than 1; and determining a number of entries of reference picture list 1, and decoding the active reference index number of reference picture list 1 in slice header for B slice when a number of entries of reference picture list 1 is greater than 1.

In some embodiments, the method includes: determining a collocated picture referred to by a reference index of the collocated picture in slice level, wherein the collocated picture is determined to be a same picture for all non-I slices of a current picture; and processing the current picture based on the collocated picture, wherein the collocated picture is used for temporal motion vector prediction.

BRIEF DESCRIPTION OF THE DRAWINGS

Embodiments and various aspects of the present disclosure are illustrated in the following detailed description and the accompanying figures. Various features shown in the figures are not drawn to scale.

FIG. 1 is a schematic diagram illustrating structures of an exemplary video sequence, according to some embodiments of the present disclosure.

FIG. 5A shows an exemplary syntax including syntax structure for reference picture lists, according to some embodiments of the present disclosure.

FIG. 5B shows an exemplary pseudocode including derivation of variable FullPocLt[i][j], according to some embodiments of the present disclosure.

FIG. 6A shows an exemplary syntax including syntax structure for reference picture list, according to some embodiments of the present disclosure.

FIG. 6B shows an exemplary pseudocode including derivation for variable NumLtrpEntries[listIdx][rplsIdx], according to some embodiments of the present disclosure.

FIG. 6C shows an example pseudocode including derivation for variable AbsDeltaPocSt[listIdx][rplsIdx][i], according to some embodiments of the present disclosure.

FIG. 6D shows an example pseudocode including derivation for variable DeltaPocValSt[listIdx][rplsIdx], according to some embodiments of the present disclosure.

FIG. 7 shows an exemplary syntax including syntax structure for reference picture list in sequence parameter set, according to some embodiments of the present disclosure.

FIG. 8 shows an exemplary syntax including syntax structure for reference picture list in picture parameter set, according to some embodiments of the present disclosure.

FIG. 9A shows an exemplary syntax including syntax structure for reference picture list in picture header structure, according to some embodiments of the present disclosure.

FIG. 9B shows an example pseudocode including derivation for variable MaxNumSubblockMergeCand, according to some embodiments of the present disclosure.

FIG. 10A shows an exemplary syntax including syntax structure for reference picture list in slice header, according to some embodiments of the present disclosure.

FIG. 10B shows an exemplary pseudocode including derivation for variable NumRefIdxActive[i], according to some embodiments of the present disclosure.

FIG. 11C shows an exemplary syntax including updated signaling of ph_collocated_from_l0_flag and ph_mvd_l1_zero_flag, according to some embodiments of the present disclosure.

FIG. 12F shows an exemplary syntax including updated reference picture list in picture parameter set, according to some embodiments of the present disclosure.

FIG. 12G shows an exemplary syntax including updated slice header, according to some embodiments of the present disclosure.

FIG. 12H shows an exemplary pseudocode including derivation of AbsDeltaPocStCol, according to some embodiments of the present disclosure.

FIG. 12I shows an exemplary pseudocode including derivation of DeltaPocValStCol, according to some embodiments of the present disclosure.

FIG. 12J shows an exemplary pseudocode for deriving the collocated picture used in a decoding method, according to some embodiments of the present disclosure.

FIG. 13A shows a flow-chart of an exemplary video encoding method for inferring the index of collocated picture in SH using the number of active entries in reference picture list, according to some embodiments of the present disclosure.

FIG. 13C shows an exemplary semantics for updated syntax element sh_collocated_ref_idx, according to some embodiments of the present disclosure.

FIG. 14B shows an exemplary semantics for allocating memory, according to some embodiments of the present disclosure.

FIG. 15C shows an exemplary semantics for updated variable rpl_idx[i], according to some embodiments of the present disclosure.

FIG. 16C shows an exemplary semantics for updated syntax element sh_num_ref_idx_active_override_flag, according to some embodiments of the present disclosure.

FIG. 17B shows an exemplary semantics for updated bitstream conformance constraint for syntax element sh_collocated_ref_idx, according to some embodiments of the present disclosure.

DETAILED DESCRIPTION

Figure 2A:
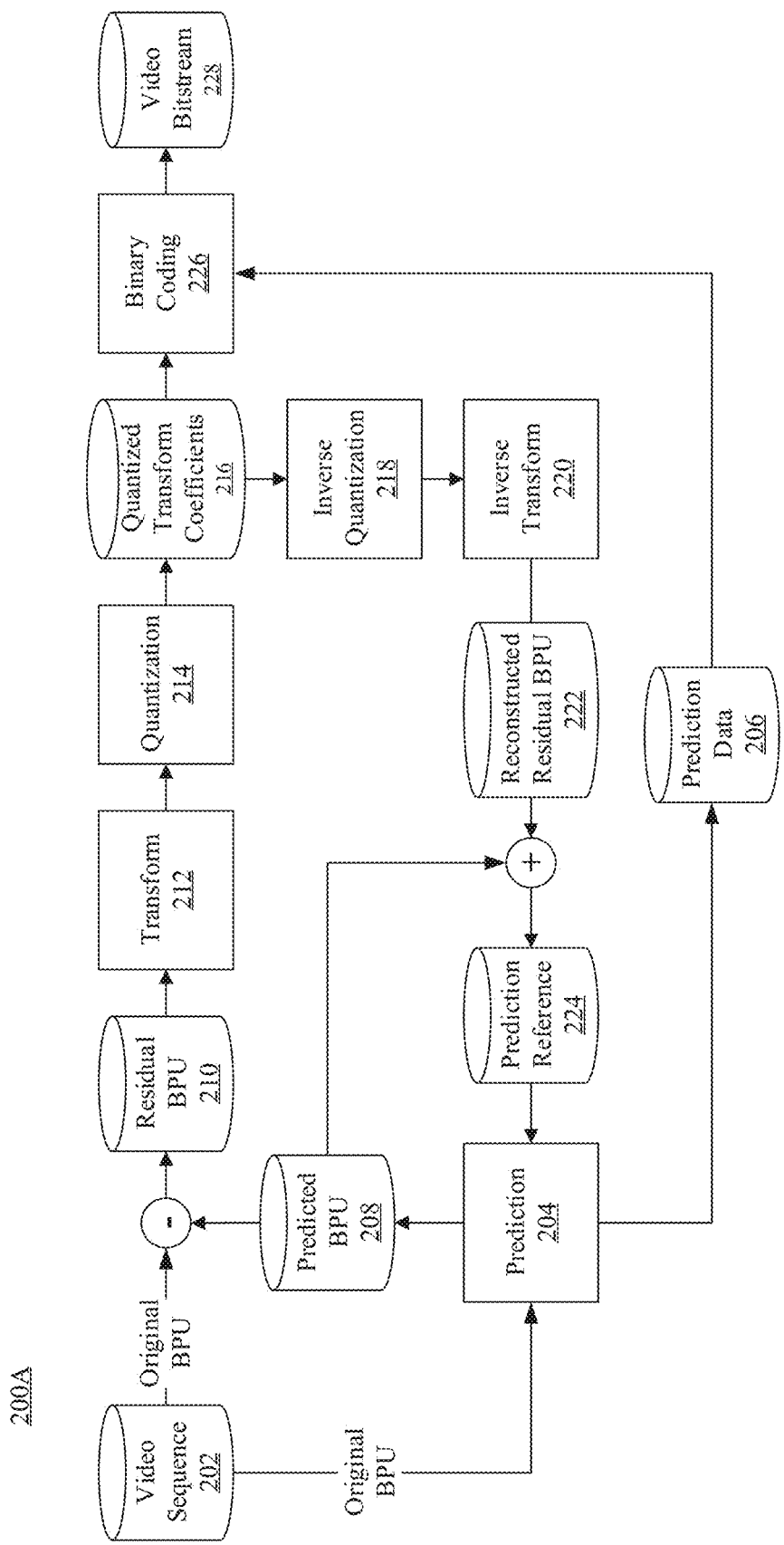
FIG. 2A is a schematic diagram illustrating an exemplary encoding process of a hybrid video coding system, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an exemplary video sequence 100, according to some embodiments of the present disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2B:
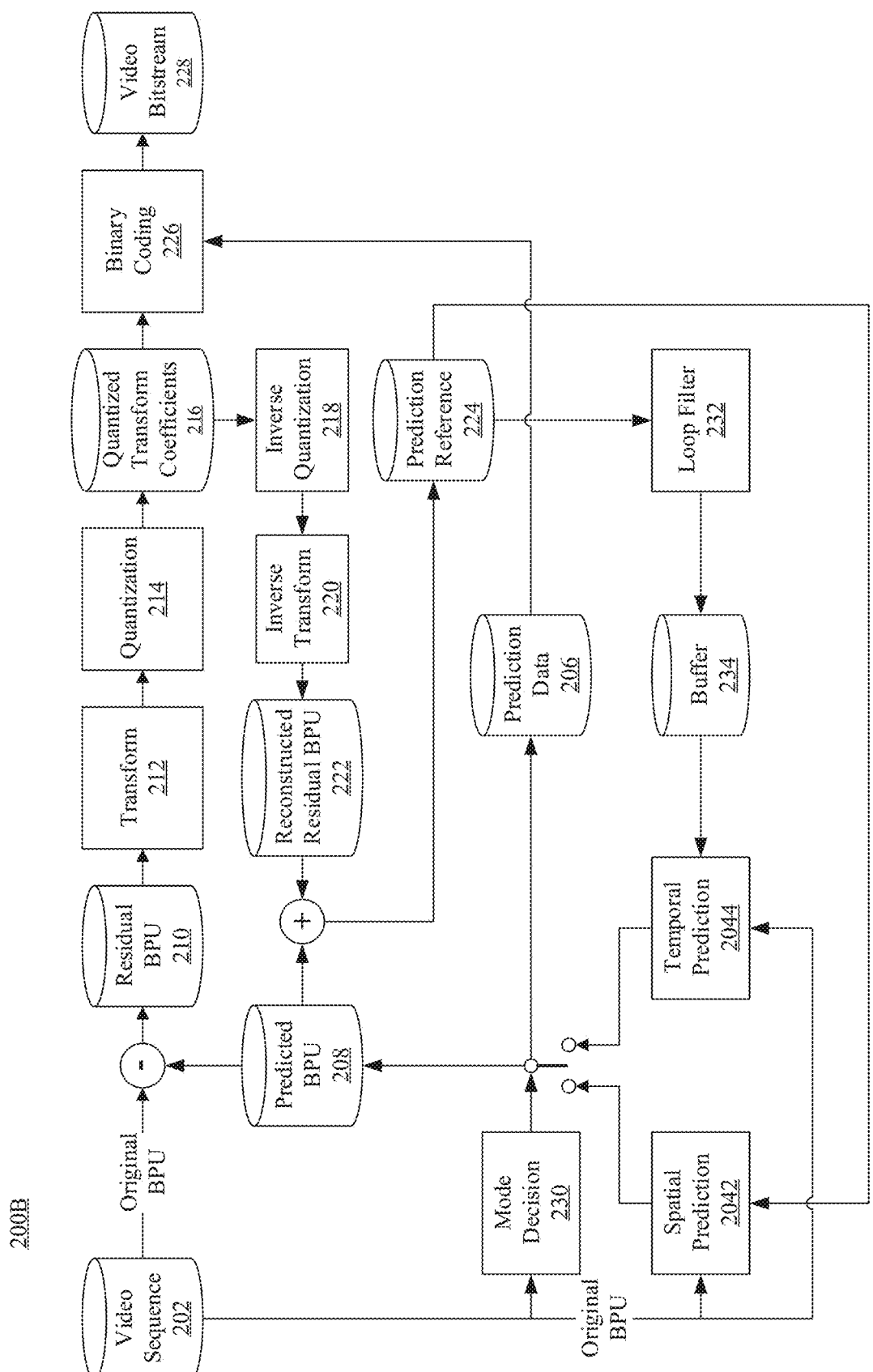
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIG. 2A and FIG. 2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an exemplary encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization syntax element or any other syntax element of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, syntax elements of the prediction operation, a transform type at transform stage 212, syntax elements of the quantization process (e.g., quantization syntax elements), an encoder control syntax element (e.g., a bitrate control syntax element), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another exemplary encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, syntax elements of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer (DPB)") for later use (e.g., to be used as an inter-prediction reference picture for a future picture of video sequence 202). The encoder can store one or more reference pictures in buffer 234 to be used at temporal prediction stage 2044. In some embodiments, the encoder can encode syntax elements of the loop filter (e.g., a loop filter strength) at binary coding stage 226, along with quantized transform coefficients 216, prediction data 206, and other information.

Figure 3A:
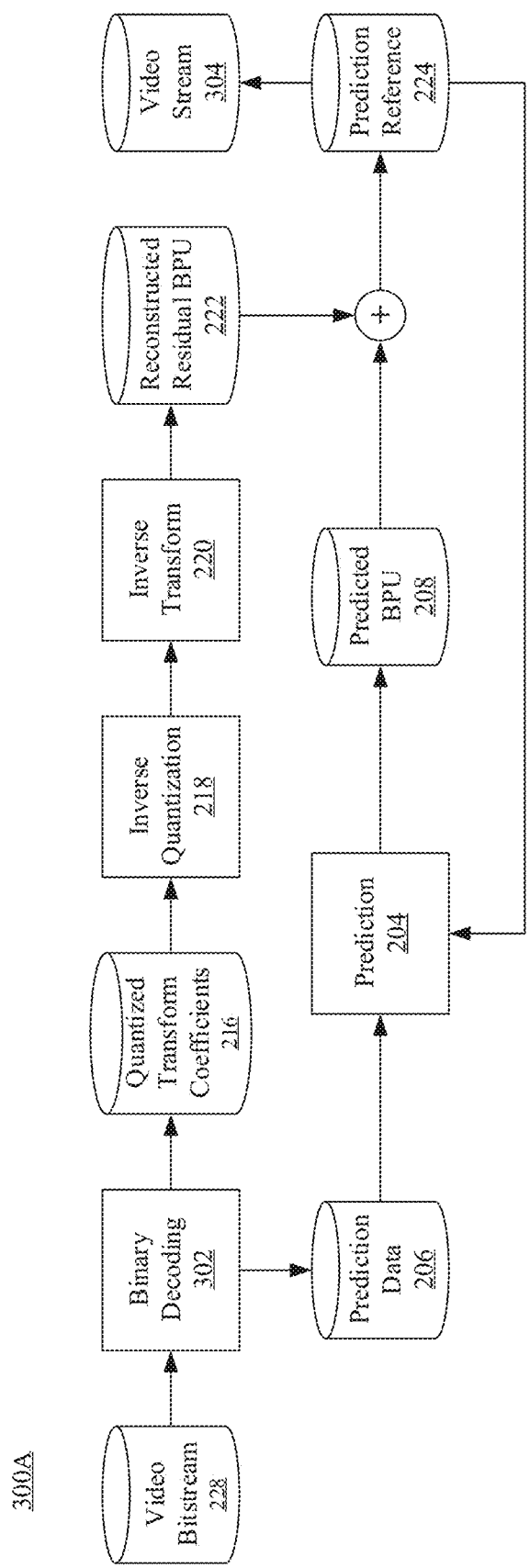
FIG. 3A is a schematic diagram illustrating an exemplary decoding process of a hybrid video coding system, consistent with embodiments of the disclosure.

FIG. 3A illustrates a schematic diagram of an exemplary decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIG. 2A and FIG. 2B), generally, video stream 304 is not identical to video sequence 202. Similar to processes 200A and 200B in FIG. 2A and FIG. 2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, syntax elements of the prediction operation, a transform type, syntax elements of the quantization process (e.g., quantization syntax elements), an encoder control syntax element (e.g., a bitrate control syntax element), or the like. In some embodiments, if video bitstream 228 is transmitted over a network in packets, the decoder can depacketize video bitstream 228 before feeding it to binary decoding stage 302.

Figure 3B:
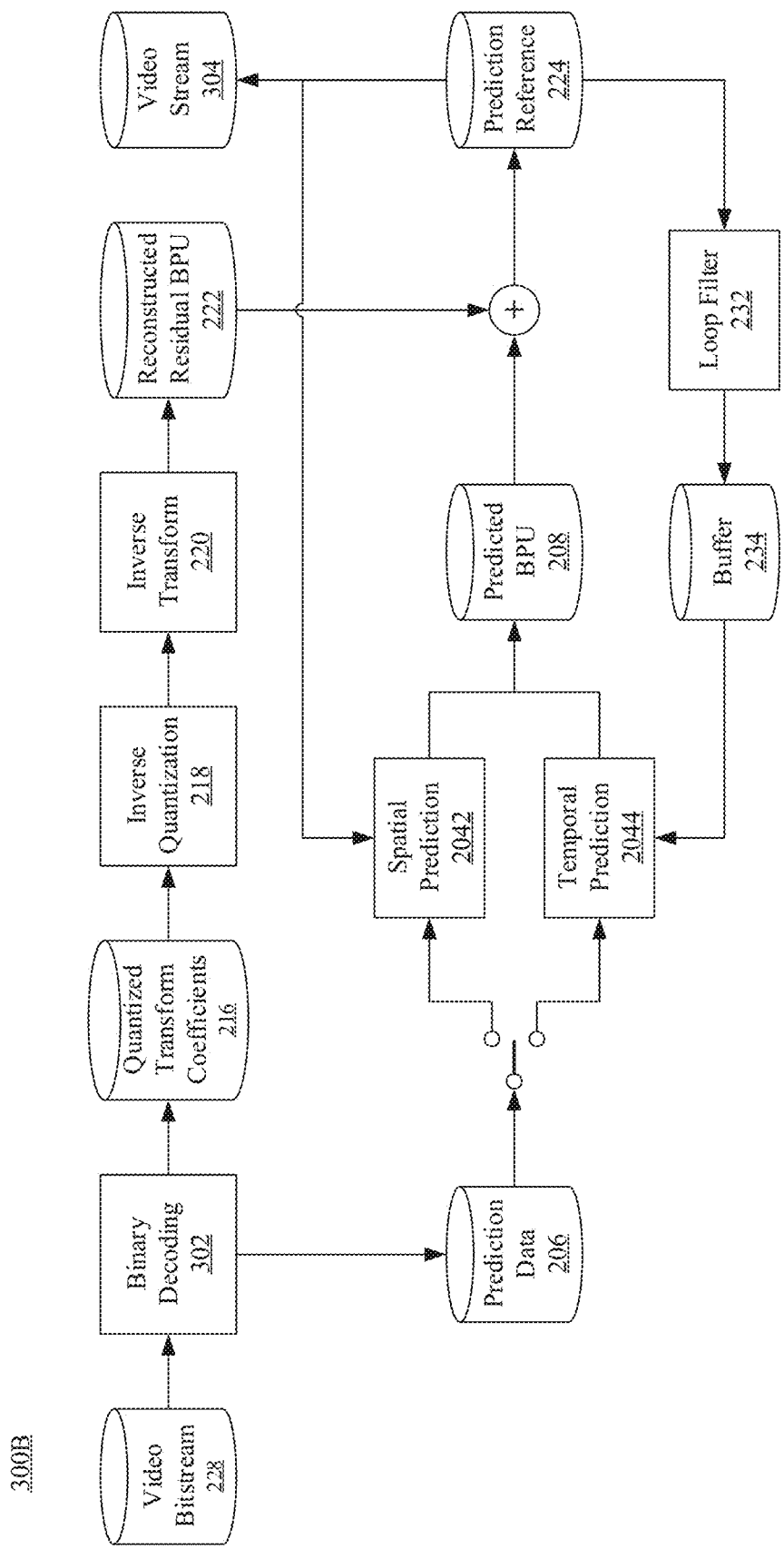
FIG. 3B is a schematic diagram illustrating another exemplary decoding process of a hybrid video coding system, consistent with embodiments of the disclosure.

FIG. 3B illustrates a schematic diagram of another exemplary decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, syntax elements of the intra prediction operation, or the like. The syntax elements of the intra prediction operation can include, for example, locations (e.g., coordinates) of one or more neighboring BPUs used as a reference, sizes of the neighboring BPUs, syntax elements of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, syntax elements of the inter prediction operation, or the like. The syntax elements of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer (DPB) in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include syntax elements of the loop filter (e.g., a loop filter strength). In some embodiments, prediction data includes syntax elements of the loop filter when the prediction mode indicator of prediction data 206 indicates that inter prediction was used to encode the current BPU.

Figure 4:
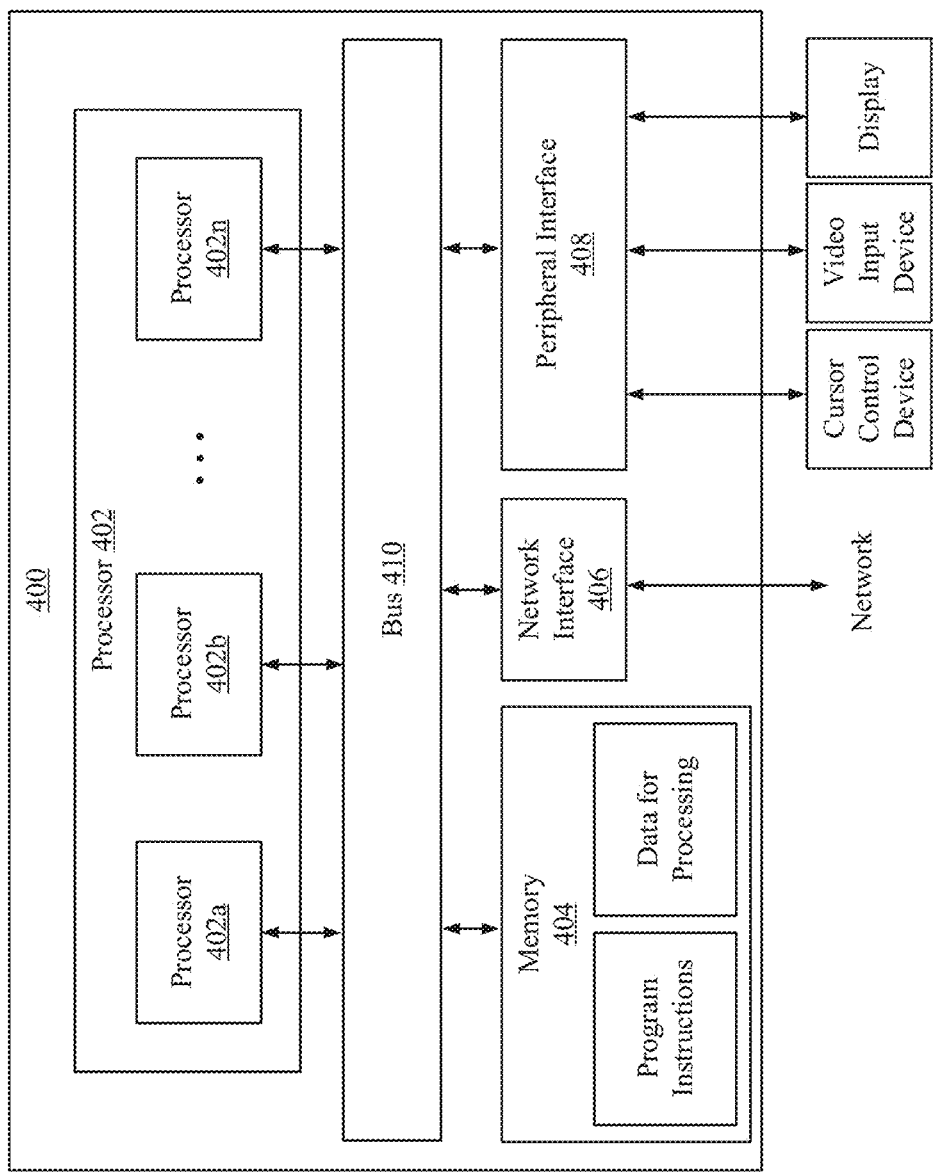
FIG. 4 is a block diagram of an exemplary apparatus for encoding or decoding a video, according to some embodiments of the present disclosure.

FIG. 4 is a block diagram of an exemplary apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In video coding, pictures need to be identified for multiple purposes, including for being identified as reference pictures in inter prediction, as pictures to be output from the DPB, as temporal collocated picture for motion vector prediction, etc. The most common way to identify a picture is using picture order count ("POC").

For identifying reference pictures in inter prediction, temporal collocated picture in motion vector ("MV") temporal prediction and scaling, the reference picture lists (usually two as in AVC, HEVC and VVC) can be derived. For example, reference picture list 0 and reference picture list1 can be derived, each of which includes a list of reconstructed pictures in the DPB to be used as the reference pictures. And reference indices to the reference picture lists can be signaled at a block level for identifying the reference picture for the current block. To correctly maintain the reference pictures in the DPB without requiring unnecessarily large amount of DPB memory, reference picture marking is needed.

In VVC (e.g., VVC draft 9), two Reference Picture Lists ("RPL"), reference picture list 0 and reference picture list 1, are used. They are directly signaled and derived. Information on the two reference picture lists is signaled by syntax elements and syntax structures in a Sequence Parameter Set ("SPS"), a Picture Parameter Set ("PPS"), a Picture Header ("PH"), and a Slice Header ("SH"). Predefined reference picture list structures are signaled in the SPS, for use by referencing in the PH or SH. New reference picture list structure can also be signaled in PH or SH, for derivation of reference picture list 0 and reference picture list 1. Whether the reference picture list information is signaled in PH or SH is determined by a flag signaled in PPS.

In VVC (e.g., VVC draft 9), two reference picture lists are generated for all types of slices (e.g., B, P, and I slice). For I slices, neither of the two reference picture lists, reference picture list 0 nor reference picture list 1, may be used for decoding. For P slices, only reference picture list 0 may be used for decoding. For B slices, both reference picture lists, reference picture list 0 and reference picture list 1, may be used for decoding. The two reference picture lists are constructed without using a reference picture list initialization process or a reference picture list modification process.

Not all pictures in the reference picture list are used as the reference picture for the current picture or slice. Only the active entries of a reference picture list may be used in the decoding process of the slice data. The default number of active entries is signaled in PPS in VVC (e.g., VVC draft 9) and can be overridden by slice header for the current slice.

To identify the pictures in DPB to construct the RPL, the POC comprising most significant bits ("MSB") and least significant bits ("LSB") are used. In VVC (e.g., VVC draft 9), LSB of POC is signaled in PH and MSB may be explicitly signaled in PH or derived by comparing POC LSB of the current picture and that of one or more preceding pictures.

In VVC (e.g., VVC draft 9), a decoded picture in the DPB can be marked as "unused for reference," "used for short-term reference," or "used for long-term reference." The decoded picture can be marked as only one among these three at any given moment during the operation of the decoding process. Assigning one of these markings to a picture implicitly removes other markings when applicable. When a picture is referred to as being marked as "used for reference," this also refers to the picture being marked as "used for short-term reference" or "used for long-term reference," but not both.

Short-term reference pictures ("STRP") and inter-layer reference pictures ("ILRP") are identified by their NAL (Network Abstraction Layer) unit ID and POC values. Long-term reference pictures ("LTRP") are identified by their NAL unit ID and a number of LSBs of their POC values.

FIG. 5A illustrates an exemplary syntax including syntax structure for reference picture lists, according to some embodiments of the present disclosure. The syntax shown in FIG. 5A can be a part of the VVC standard (e.g., VVC draft 9) or in other video coding technologies.

As shown in FIG. 5A, the syntax structure 500A for reference picture lists (e.g., ref_pic_lists( )) may be present in the PH syntax structure or the SH.

As shown in FIG. 5A, syntax element 510A (e.g., rpl_sps_flag[i]) equal to 1 specifies that reference picture list i (e.g., i can be 0 or 1) in the syntax structure for reference picture lists (e.g., ref_pic_lists( )) is derived based on one of the synatx structures for referece picture list structure (e.g. ref_pic_list_struct(listIdx, rplsIdx) with listIdx equal to i) in the SPS. Syntax element 510A being equal to 0 specifies that reference picture list i (e.g., i can be 0 or 1) is derived based on the synatx structure for referece picture list structure (e.g., ref_pic_list_struct(listIdx, rplsIdx) with listIdx equal to i) that is directly included in the syntax structure for reference picture lists (e.g., ref_pic_lists( )).

When syntax element 510A is not present, the following applies. First, if the number of reference picture lists in SPS (e.g., sps_num_ref_pic_lists[i]) is equal to 0, the value of syntax element 510A is inferred to be equal to 0. Second, if the number of reference picture lists in SPS (e.g., sps_num_ref_pic_lists[i]) is not equal to 0 (e.g., if the number of reference picture lists in SPS is greater than 0), when syntax element 520A (e.g. pps_rpl1_idx_present_flag) is equal to 0 and i is equal to 1, the value of syntax element 510A for reference picture list 1 in SPS (e.g. rpl_sps_flag[1]) is inferred to be equal to the value of syntax element 510A for reference picture list 0 in SPS (e.g. rpl_sps_flag[0]).

Syntax element 530A (e.g., rpl_idx[i]) specifies the index, to the list of the ref_pic_list_struct(listIdx, rplsIdx) with listIdx equal to i included in the SPS, of the ref_pic_list_struct(listIdx, rplsIdx) with listIdx equal to i that is used for derivation of reference picture list i of the current picture. The length of syntax element 530A is a number of bits with a smallest integer greater than or equal to a base-2 logarithm of the number of the ref_pic_list_struct(listIdx, rplsIdx) syntax structures in SPS, which can be represented by Ceil(Log 2(sps_num_ref_pic_lists[i])) bits. The value of syntax element 530A can be in an inclusive range of 0 to the number of reference picture lists in SPS−1 (e.g., sps_num_ref_pic_lists[i]−1). When syntax element 530A is not present, if syntax element 510A is equal to 1 and syntax element 520A is equal to 0, the value of rpl_idx[1] is inferred to be equal to the value of rpl_idx[0], otherwise the value of rpl_idx[1] is inferred to be equal to 0.

The variable RplsIdx[i] can be derived as follows:

RplsIdx[i]=rpl_sps_flag[i]?rpl_idx[i]:sps_num_ref_pic_lists[i].

Syntax element 540A (e.g. poc_lsb_lt[i][j]) specifies the value of the picture order count modulo MaxPicOrderCntLsb of the j-th LTRP entry in the i-th reference picture list in the ref_pic_lists( ). The length of syntax element 540A is equal to base-2 logarithm of the maximum LSB in POC bits (e.g., sps_log 2_max_pic_order_cnt_lsb_minus4+4 bits).

The variable PocLsbLt[i][j] can be derived as follows:

PocLsbLt[i][j]=ltrp_in_header_flag[i][RplsIdx[i]]
?poc_lsb_lt[i][j]:rpls_poc_lsb_lt[listIdx][RplsIdx[i]][j].

Syntax element 550A (e.g. delta_poc_msb_cycle_present_flag[i][j]) equal to 1 specifies that syntax element 560A (e.g. delta_poc_msb_cycle_lt[i][j]) is present. Syntax element 550A being equal to 0 specifies that syntax element 560 is not present.

The previous picture in decoding order having nuh_layer_id that is the same as the slice header or picture header referring to the ref_pic_lists( ) syntax structure and having TemporalID and ph_non_ref_pic_flag both equal to 0 and is not a RASL (Radom Access Skipped Leading) or RADL (Random Access Decodable Leading) picture can be described as prevTidOPic. nuh_layer_id is a syntax element specifies the identifier of the layer to which a VCL (Video Coding Layer) NAL (Network Abstraction Layer) unit belongs or the identifier of a layer to which a non-VCL NAL unit applies. TemporalID is a temporal identifier of the picture. A set of previous POC values described as setOfPrevPocVals is a set comprising the following:

- the POC value (e.g. PicOrderCntVal) of prevTidOPic;
- the POC value (e.g. PicOrderCntVal) of each picture that is referred to by entries in reference picture list 0 (e.g. RefPicList[0]) or reference picture list 1 (e.g. RefPicList[1]) of prevTidOPic and has nuh_layer_id the same as the current picture;
- the POC value (e.g. PicOrderCntVal) of each picture that follows prevTidOPic in decoding order, has nuh_layer_id the same as the current picture, and precedes the current picture in decoding order.

When there is more than one value in setOfPrevPocVals for which the value modulo MaxPicOrderCntLsb is equal to variable PocLsbLt[i][j], the value of syntax element 550A (e.g. delta_poc_msb_cycle_present_flag[i][j]) is equal to 1.

FIG. 5B shows an exemplary pseudocode including derivation of variable FullPocLt [i][j], according to some embodiments of the present disclosure. Syntax element 560A (e.g. delta_poc_msb_cycle_lt[i][j]) specifies the value of the variable FullPocLt[i][j] as shown in FIG. 5B. The value of syntax element 560A (e.g., delta_poc_msb_cycle_lt [i][j]) can be in an inclusive range of 0 to $2^{(32-sps\_log2\_max\_pic\_order\_cnt\_lsb\_minus4-4)}$. When syntax element 560 is not present, the value of syntax element 560 is inferred to be equal to 0.

FIG. 6A illustrates an exemplary syntax including syntax structure for reference picture list structure, according to some embodiments of the present disclosure. The syntax structure shown in FIG. 6A can be a part of the VVC standard (e.g., VVC draft 9) or in other video coding technologies. As shown in FIG. 6A, the ref_pic_list_struct (listIdx, rplsIdx) may be present in an SPS, in a PH syntax structure, or in an SH. Depending on whether the syntax structure is included in an SPS, a PH syntax structure, or an SH, the following applies:

- If ref_pic_list_struct(listIdx, rplsIdx) is present in a PH syntax structure or an SH, the ref_pic_list_struct(listIdx, rplsIdx) syntax structure specifies reference picture list listIdx of the current picture (e.g., the coded picture containing the PH syntax structure or SH).
- If ref_pic_list_struct(listIdx, rplsIdx) is not present in a PH syntax structure or an SH (e.g., present in an SPS), the ref_pic_list_struct(listIdx, rplsIdx) syntax structure specifies a candidate for reference picture list listIdx, and the term "the current picture" in the semantics specified in the remainder of this clause refers to each picture that 1) has a PH syntax structure or one or more slices containing rpl_idx[listIdx] equal to an index into the list of the ref_pic_list_struct(listIdx, rplsIdx) syntax structures included in the SPS, and 2) is in a Coded Layer-wise Video Sequence (CLVS) that refers to the SPS.

As shown in FIG. 6A, syntax element 610A (e.g., num_ref_entries[listIdx][rplsIdx]) specifies the number of entries in the ref_pic_list_struct(listIdx, rplsIdx) syntax structure. The value of parameter 610A can be in an inclusive range of 0 to MaxDpbSize+13, where MaxDpbSize is as specified in a level of a video coding standard (e.g., VVC draft 9).

Syntax element 620A (e.g., ltrp_in_header_flag[listIdx] [rplsIdx]) being equal to 0 specifies that the POC LSBs of the LTRP entries indicated in the ref_pic_list_struct(listIdx, rplsIdx) syntax structure are present in the same syntax structure. Syntax element 620A being equal to 1 specifies that the POC LSBs of the LTRP entries indicated in the ref_pic_list_struct(listIdx, rplsIdx) syntax structure are not present in the same syntax structure. When sps_long_term_ ref_pics_flag is equal to 1 and the rplsIdx is equal to sps_num_ref_pic_lists[listIdx], the value of syntax element 620A is inferred to be equal to 1.

Syntax element 630A (e.g., inter_layer_ref_pic_flag[listIdx][rplsIdx][i]) being equal to 1 specifies that the i-th entry in the ref_pic_list_struct(listIdx, rplsIdx) syntax structure is an ILRP entry. Syntax element 630A being equal to 0 specifies that the i-th entry in the ref_pic_list_struct(listIdx, rplsIdx) syntax structure is not an ILRP entry. When the syntax element 630A is not present, the value of syntax element 630A is inferred to be equal to 0.

Syntax element 640A (e.g., st_ref_pic_flag[listIdx][rplsIdx][i]) being equal to 1 specifies that the i-th entry in the ref_pic_list_struct(listIdx, rplsIdx) syntax structure is an STRP entry. Syntax element 640A being equal to 0 specifies that the i-th entry in the ref_pic_list_struct(listIdx, rplsIdx) syntax structure is an LTRP entry. When syntax element 630A is equal to 0 and syntax element 640A is not present, the value of syntax element 640A is inferred to be equal to 1.

FIG. 6B shows an exemplary pseudocode including derivation for the number of LTRP entries (e.g., variable NumLtrpEntries[listIdx][rplsIdx]), according to some embodiments of the present disclosure. The variable NumLtrpEntries[listIdx][rplsIdx] (e.g. variable 570A in FIG. 5A) can be derived as shown in FIG. 6B.

FIG. 6C shows an exemplary pseudocode including derivation for variable AbsDeltaPocSt[listIdx][rplsIdx][i], according to some embodiments of the present disclosure. Syntax element 650A (e.g., abs_delta_poc_st[listIdx][rplsIdx][i]) specifies the value of the variable AbsDeltaPocSt [listIdx][rplsIdx][i] (e.g. variable 690A) as shown in FIG. 6C. The value of syntax element 650A (e.g., abs_delta_poc_ st[listIdx][rplsIdx][i]) can be in an inclusive range of 0 to $2^{15}-1$.

Syntax element 660A (e.g., strp_entry_sign_flag[listIdx] [rplsIdx][i]) equal to 1 specifies that i-th entry in the ref_pic_list_struct(listIdx, rplsIdx) syntax structure has a value greater than or equal to 0. Syntax element 660A equal to 0 specifies that the i-th entry in the ref_pic_list_struct(listIdx, rplsIdx) syntax structure has a value less than 0. When the syntax element 660A is not present, the value of the syntax element 660A is inferred to be equal to 1.

FIG. 6D shows an exemplary pseudocode including derivation for variable DeltaPocValSt[listIdx][rplsIdx], according to some embodiments of the present disclosure. The DeltaPocValSt[listIdx][rplsIdx] can be derived as shown in FIG. 6D.

Referring back to FIG. 6A, syntax element 670A (e.g., rpls_poc_lsb_lt[listIdx][rplsIdx][i]) specifies the value of the picture order count modulo MaxPicOrderCntLsb of the picture referred to by the i-th entry in the ref_pic_list_struct (listIdx, rplsIdx) syntax structure. The length of the syntax element 670A is sps_ log 2_max_pic_order_cnt_lsb_minus4+4 bits.

Syntax element 680A (e.g. ilrp_idx[listIdx][rplsIdx][i]) specifies the index, to the list of the direct reference layers, of the ILRP of the i-th entry in the ref_pic_list_struct(listIdx, rplsIdx) syntax structure. The value of the syntax element 680A can be in an inclusive range of 0 to NumDirectRefLayers[GeneralLayerIdx[nuh_layer_id]]−1, where NumDirectRefLayers[LayerIdx] means the number of direct reference layers of a layer with index equal to LayerIdx.

FIG. 7 shows an exemplary syntax including syntax structure for reference picture list structure in sequence parameter set, according to some embodiments of the present disclosure. The syntax shown in FIG. 7 can be a part of the VVC standard (e.g., VVC draft 9) or in other video coding technologies.

As shown in FIG. 7, syntax element 710 (e.g., sps_long_ term_ref_pics_flag) being equal to 0 specifies that no LTRP is used for inter prediction of any coded picture in the CLVS. Syntax element 710 being equal to 1 specifies that LTRPs may be used for inter prediction of one or more coded pictures in the CLVS.

Syntax element 720 (e.g., sps_inter_layer_ref_pics_present_flag) being equal to 0 specifies that no ILRP is used for inter prediction of any coded picture in the CLVS. Syntax element 720 being equal to 1 specifies that ILRPs may be used for inter prediction of one or more coded pictures in the CLVS. When sps_video_syntax_element_set_id is equal to 0, that is, the SPS does not refer to a VPS (Video Parameter Set), and no VPS is referred to when decoding each CLVS referring to the SPS (there is only one layer), the value of syntax element 720 is inferred to be equal to 0. When vps_independent_layer_flag[GeneralLayerIdx[nuh_layer_id]] is equal to 1, that is, the layer with index GeneralLayerIdx[nuh_layer_id] does not use inter-layer prediction, the value of syntax element 720 is equal to 0.

Syntax element 730 (e.g., sps_idr_rpl_present_flag) being equal to 1 specifies that reference picture list syntax elements are present in slice headers of IDR (Instaneous Decoding Refresh) pictures. Syntax element 730 equal to 0 specifies that reference picture list syntax elements are not present in slice headers of IDR pictures.

Syntax element 740 (e.g., sps_rpl1_same_as_rpl0_flag) being equal to 1 specifies that the syntax element sps_num_ ref_pic_lists[1] and the syntax structure ref_pic_list_struct (1, rplsIdx) are not present and the following applies: the value of sps_num_ref_pic_lists[1] is inferred to be equal to the value of sps_num_ref_pic_lists[0]; and the value of each of syntax elements in ref_pic_list_struct(1, rplsIdx) is inferred to be equal to the value of corresponding syntax element in ref_pic_list_struct(0, rplsIdx) for rplsIdx ranging from 0 to sps_num_ref_pic_lists[0]−1.

Syntax element 750 (e.g., sps_num_ref_pic_lists[i]) specifies the number of the ref_pic_list_struct(listIdx, rplsIdx) syntax structures with listIdx equal to i included in the SPS. The value of syntax element 750 can be in an inclusive range of 0 to 64. For each value of listIdx (equal to 0 or 1), a decoder (e.g., by process 300A of FIG. 3A or 300B of FIG. 3B) can allocate memory for ref_pic_list_struct(listIdx, rplsIdx) syntax structures with a total number of the number of RPLs in SPS plus 1 (e.g., sps_num_ref_pic_lists[i]+1), since there may be one ref_pic_list_struct(listIdx, rplsIdx) syntax structure directly signaled in the slice headers of a current picture.

FIG. 8 shows an exemplary syntax including syntax structure for reference picture list in picture parameter set, according to some embodiments of the present disclosure.

The syntax shown in FIG. 8 can be a part of the VVC standard (e.g., VVC draft 9) or in other video coding technologies.

As shown in FIG. 8, syntax element 810 (e.g., pps_num_ref_idx_default_active_minus1[i]) plus 1, when i is equal to 0, that is for reference picture list 0, specifies the inferred value of the variable NumRefIdxActive[0] for P or B slices with sh_num_ref_idx_active_override_flag equal to 0. When i is equal to 1, that is for reference picture list 1, syntax element 810 plus 1 specifies the inferred value of variable NumRefIdxActive[1] for B slices with sh_num_ref_idx_active_override_flag equal to 0. The value of syntax element 810 can be in an inclusive range of 0 to 14.

Syntax element 820 (e.g., pps_rpl1_idx_present_flag) being equal to 0 specifies that rpl_sps_flag[1] and rpl_idx[1] are not present in the PH syntax structures or the slice headers for pictures referring to the PPS. Syntax element 820 being equal to 1 specifies that rpl_sps_flag[1] and rpl_idx[1] may be present in the PH syntax structures or the slice headers for pictures referring to the PPS.

Syntax element 830 (e.g., pps_rpl_info_in_ph_flag) being equal to 1 specifies that reference picture list information is present in the PH syntax structure and not present in slice headers referring to the PPS that do not contain a PH syntax structure. Syntax element 830 being equal to 0 specifies that reference picture list information is not present in the PH syntax structure and may be present in slice headers referring to the PPS. When the syntax element 830 is not present, the value of the syntax element 830 is inferred to be equal to 0.

FIG. 9A shows an exemplary syntax including syntax structure for reference picture list in picture header structure, according to some embodiments of the present disclosure. The syntax shown in FIG. 9A can be a part of the VVC standard (e.g., VVC draft 9) or in other video coding technologies.

As shown in FIG. 9A, syntax element 910A (e.g., ph_pic_output_flag) affects the decoded picture output and removal processes. When the syntax element 910A is not present, it is inferred to be equal to 1. There is no picture in the bitsteam that has ph_non_reference_picture_flag equal to 1 and syntax element 910A equal to 0. Element ph_non_reference_picture_flag being equal to 1 specifies that the current picture is never used as a reference picture. Element ph_non_ref_pic_flag being equal to 0 specifies that the current picture might or might not be used as a reference picture.

Syntax element 920A (e.g., ph_temporal_mvp_enabled_flag) being equal to 0 specifies that temporal motion vector predictor is disabled and not used in decoding of the slices in the current picture. Syntax element 920A being equal to 1 specifies that temporal motion vector predictors is enabled and may be used in decoding of the slices in the current picture. When syntax element 920A is not present, the value of syntax element 920A is inferred to be equal to 0. Due to other existing constraints, the value of syntax element 920A can only be equal to 0 in a conforming bitstream when one or more of the following conditions are true: 1) no reference picture in the DPB has the same spatial resolution and the same scaling window offsets as the current picture, and 2) no reference picture in the DPB exists in the active entries of the RPLs of all slices in the current picture. There can be other situations, complicated conditions under which syntax element 920A can only be equal to 0 that are not listed.

FIG. 9B shows an exemplary pseudocode including derivation for variable MaxNumSubblockMergeCand, according to some embodiments of the present disclosure. As shown in FIG. 9B, the value of MaxNumSubblockMergeCand refers to the maximum number of subblock-based merging MVP (Motion Vector Predictor) candidates. The value of MaxNumSubblockMergeCand can be in an inclusive range of 0 to 5.

Referring back to FIG. 9A, syntax element 930A (e.g., ph_collocated_from_l0_flag) being equal to 1 specifies that the collocated picture used for temporal motion vector prediction is derived from reference picture list 0. Syntax element 930A being equal to 0 specifies that the collocated picture used for temporal motion vector prediction is derived from reference picture list 1. When syntax element 920A and syntax element 830A (e.g., pps_rpl_info_in_ph_flag) are both equal to 1 and num_ref_entries[1][RplsIdx[1]] is equal to 0, the value of syntax element 930A is inferred to be equal to 1.

Syntax element 940A (e.g., ph_collocated_ref_idx) specifies the reference index of the collocated picture used for temporal motion vector prediction. When syntax element 930A is equal to 1, syntax element 940A refers to an entry in reference picture list 0, and the value of syntax element 940A can be in an inclusive range of 0 to num_ref_entries[0][RplsIdx[0]]−1. When syntax element 930A is equal to 0, syntax element 940A refers to an entry in reference picture list 1, and the value of syntax element 940A can be in an inclusive range of 0 to num_ref_entries[1][RplsIdx[1]]−1. When syntax element 940A is not present, the value of syntax element 940A is inferred to be equal to 0.

Syntax element 950A (e.g., ph_mvd_l1_zero_flag) being equal to 1 specifies that the motion vector difference (e.g., mvd_coding(x0, y0, 1, cpIdx)) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. Syntax element 950A being equal to 0 specifies that the mvd_coding(x0, y0, 1, cpIdx) syntax structure is parsed. When the syntax element 950A is not present, the value of syntax element 950A is inferred to be 1. MvdL1 is the motion vector difference decoded from the bitstream associated with the reference picture in the reference picture list1. MvdCpL1 is the control point motion vector difference decoded from the bitstream associated with the reference picture in the reference picture list 1. It is for a coding block using affine motion compensation. x0, y0 are the top-left position of the current coding block, compIdx is the component index, and cpIdx is the index of control point.

FIG. 10A shows an exemplary syntax including syntax structure for reference picture list in slice header, according to some embodiments of the present disclosure. The syntax shown in FIG. 10A can be a part of the VVC standard (e.g., VVC draft 9) or in other video coding technologies.

As shown in FIG. 10A, syntax element 110A (e.g., sh_num_ref_idx_active_override_flag) equal to 1 specifies that the syntax element sh_num_ref_idx_active_minus1[0] is present for P and B slices and the syntax element sh_num_ref_idx_active_minus1[1] is present for B slices. Syntax element 110A equal to 0 specifies that the syntax elements sh_num_ref_idx_active_minus1[0] and sh_num_ref_idx_active_minus1[1] are not present. When the syntax element 1010A is not present, the value of syntax element 1010A is inferred to be equal to 1.

Syntax element 1020A (e.g., sh_num_ref_idx_active_minus1[i]) is used for the derivation of the variable NumRefIdxActive[i]. The value of syntax element 1020A can be in an inclusive range of 0 to 14. For i equal to 0 or 1, when the current slice is a B slice, syntax element 1010A is equal to 1, and when syntax element 1020A is not present, the syntax element 1020A is inferred to be equal to 0.

FIG. 10B shows an exemplary pseudocode including derivation for variable NumRefIdxActive[i], according to some embodiments of the present disclosure. As shown in FIG. 10B, value of NumRefIdxActive[i]−1 specifies the maximum reference index for reference picture list i that may be used to decode the slice. Syntax element 1020A is used for the derivation of NumRefIdxActive[i] as shown by Equation (1) in FIG. 10B. When the value of NumRefIdxActive[i] is equal to 0, no reference index for reference picture list i may be used to decode the slice. When the current slice is a P slice, the value of NumRefIdxActive[0] is greater than 0. When the current slice is a B slice, both NumRefIdxActive[0] and NumRefIdxActive[1] is greater than 0.

As shown in FIG. 10A, syntax element 1030A (e.g., sh_cabac_init_flag) specifies the method for determining the initialization table used in the initialization process for context variables. When syntax element 1030A is not present, it is inferred to be equal to 0.

Syntax element 1040A (e.g., sh_collocated_from_l0_flag) being equal to 1 specifies that the collocated picture used for temporal motion vector prediction is derived from reference picture list 0. Syntax element 1040A being equal to 0 specifies that the collocated picture used for temporal motion vector prediction is derived from reference picture list 1. When sh_slice_type is equal to B or P, syntax element 920A (e.g., ph_temporal_mvp_enabled_flag) is equal to 1, and syntax element 1040A is not present, the following applies: if sh_slice_type is equal to B, syntax element 1040A is inferred to be equal to syntax element 930A (e.g., ph_collocated_from_l0_flag); and if sh_slice_type is not equal to P (e.g., sh_slice_type is equal to P), the value of syntax element 1040A is inferred to be equal to 1.

Syntax element 1050A (e.g., sh_collocated_ref_idx) specifies the reference index of the collocated picture used for temporal motion vector prediction. When sh_slice_type is equal to P or when sh_slice_type is equal to B and syntax element 1040A is equal to 1, syntax element 1050A refers to an entry in reference picture list 0, and the value of syntax element 1050A can be in an inclusive range of 0 to NumRefIdxActive[0]−1. When sh_slice_type is equal to B and syntax element 1040A is equal to 0, syntax element 1050A refers to an entry in reference picture list 1, and the value of syntax element 1050A can be in an inclusive range of 0 to NumRefIdxActive[1]−1. When syntax element 1050A is not present, the following applies: if syntax element 830 (e.g., pps_rpl_info_in_ph_flag) is equal to 1, the value of syntax element 1050A is inferred to be equal to syntax element 940A (e.g., ph_collocated_ref_idx); and if syntax element 830 is not equal to 1 (e.g., syntax element 830 is equal to 0), the value of syntax element 1050A is inferred to be equal to 0. It is a requirement of bitstream conformance that the picture referred to by syntax element 1050A is the same for all slices of a coded picture and RprConstraintsActive [sh_collocated_from_l0_flag ? 0:1][sh_collocated_ref_idx] is equal to 0. This constraint requires the collocated picture to have the same spatial resolution and the same scaling window offsets as the current picture.

In VVC (e.g., VVC draft 9), syntax element 930A (e.g., ph_collocated_from_l0_flag) and syntax element 950A (e.g., ph_mvd_l1_zero_flag) are two flags signaled in PH. Syntax element 930A indicates which reference picture list the collocated picture used for temporal motion vector prediction is from. Syntax element 950A indicates whether the mvd_coding( ) syntax structure is parsed for reference picture list 1. As a result, these two flags are only relevant when the number of active entries in reference picture list 1 is larger than 0. However, as shown in FIG. 10A, since the number of active entries in reference picture list are overridden in slice header by sh_num_ref_idx_active_minus1[i], when syntax element 930A and syntax element 950A are signaled in PH, the decoder has no knowledge of the exact number of active entries of reference picture list 1. Therefore, in VVC (e.g., VVC draft 9), the total number of entries in reference picture list 1 is used as a condition to signal these two flags, as shown in FIG. 9A.

It is appreciated that while the present disclosure refers to various syntax elements providing inferences based on the value being equal to 0 or 1, the values can be configured in any way (e.g., 1 or 0) for providing the appropriate inference.

In VVC (e.g., VVC draft 9), it is guaranteed that for an I slice, the number of active entries of both two reference picture lists are equal to 0. For a P slice, the number of active entries in reference picture list 0 is greater than 0 and the number of active entries in reference picture list 1 is equal to 0. For a B slice, the number of active entries in both two reference picture lists are greater than 0. There is no guarantee for the total number of entries in the reference picture list. For example, for an I slice, the number of entries in any of two reference picture lists may be greater than 0. As a result, the signaling condition that total number of entries in reference picture list 1 is greater than 0 is too relaxed for syntax element 930A and syntax element 950A, which causes unnecessary signaling of these two syntax elements.

To overcome this deficiency with conventional coding technologies, in some embodiments of the present disclosure (such as provided below in FIG. 11A to FIG. 11C), an unnecessary signaling in case the number of entries in reference picture list 0 equals to 0 is avoided.

Figure 11A:
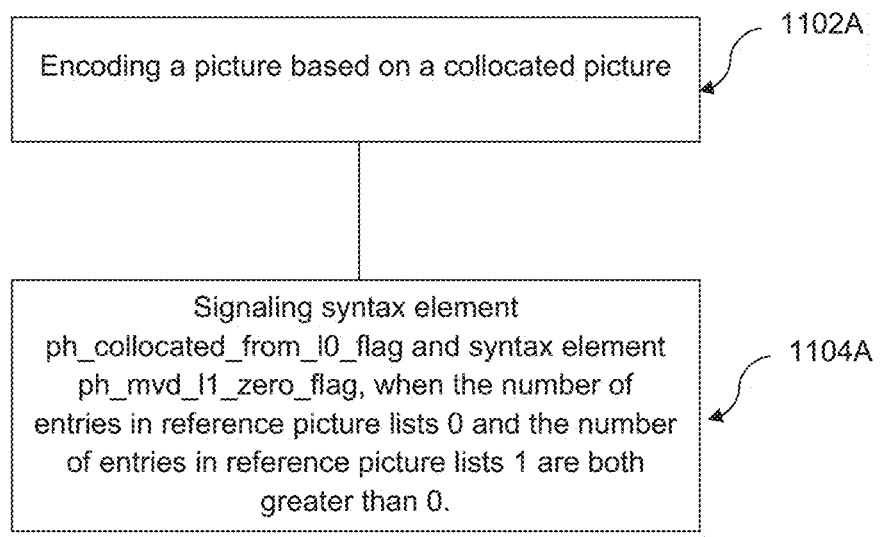
FIG. 11A shows a flow-chart of an exemplary video encoding method for signaling flags in PH syntax structure, according to some embodiments of the present disclosure.

FIG. 11A illustrates a flow-chart of an exemplary video encoding method 1100A for signaling flags in PH syntax structure, according to some embodiments of the disclosure. Method 1100A can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1100A. In some embodiments, method 1100A can be implemented by a computer program product, embodied in a computer-readable medium, including computer-executable instructions, such as program code, executed by computers (e.g., apparatus 400 of FIG. 4). Referring to FIG. 11A, method 1100A may include the following steps 1102A and 1104A.

At step 1102A, the encoder encodes a current picture based on a collocated picture. The reference pictures can be derived, for example, by reference picture 0 and reference picture list 1, each of which includes a list of reconstructed pictures in the DPB (e.g., buffer 234 in FIG. 3B) to be used as the reference pictures. The current picture is used for temporal motion vector prediction.

At step 1104A, syntax element ph_collocated_from_l0_flag (e.g., syntax element 930A) and syntax element ph_mvd_l1_zero_flag (e.g., syntax element 950A) are signaled, when the number of entries in reference picture lists 0 and the number of entries in reference picture lists 1 are both greater than 0. The syntax element ph_collocated_from_l0_flag indicates which reference picture list a collocated picture used for temporal motion vector prediction is from, that is, the collocated picture used for temporal motion vector prediction is from a reference picture list that is indicated by the first flag. The syntax element ph_mvd_l1_zero_flag indicates whether a motion vector difference syntax structure associated with reference picture list 1 is signaled. In this way, the entries in both reference picture list 1 and reference picture 0 are guaranteed when signaling the two flags. Therefore, an unnecessary signaling in case the number of entries in reference picture list 0 equals to 0 is avoided, and the efficiency of decoding is improved.

Figure 11B:
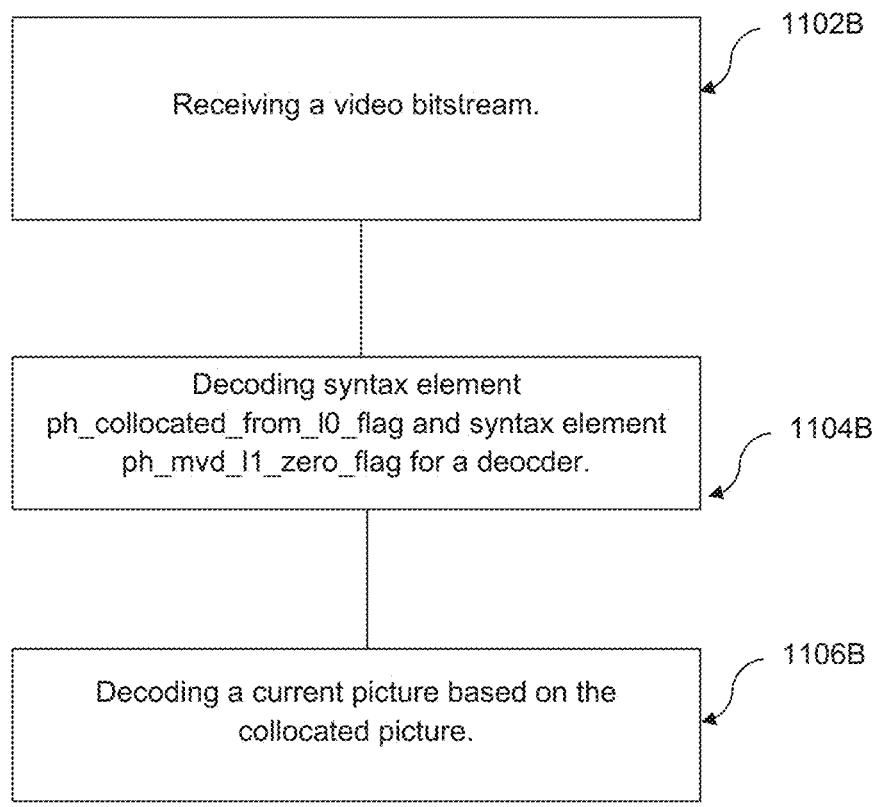
FIG. 11B shows a flow-chart of an exemplary video decoding method for signaling flags in PH syntax structure, according to some embodiments of the present disclosure.

FIG. 11B illustrates a flow-chart of an exemplary video decoding method 1100B for decoding flags in PH syntax structure, according to some embodiments of the disclosure. Method 1100B can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1100B. In some embodiments, method 1100B can be implemented by a computer program product, embodied in a computer-readable medium, including computer-executable instructions, such as program code, executed by computers (e.g., apparatus 400 of FIG. 4). Referring to FIG. 11B, method 1100B may include the following steps 1102B-1106B.

At step 1102B, the decoder receives a video bitstream (e.g., video bitstream 228 in FIG. 3B) and the video bitstream may be coded using inter prediction.

At step 1104B, syntax element ph_collocated_from_l0_flag (e.g., syntax element 930A) and syntax element ph_mvd_l1_zero_flag (e.g., syntax element 950A) are decoded from the bitstream by a decoder, when the number of entries in reference picture lists 0 and the number of entries in reference picture lists 1 are both greater than 0. The syntax element ph_collocated_from_l0_flag indicates which reference picture list a collocated picture used for temporal motion vector prediction is from, that is, the collocated picture used for temporal motion vector prediction is from a reference picture list that is indicated by the first flag. The syntax element ph_mvd_l1_zero_flag indicates whether a motion vector difference syntax structure associated with reference picture list 1 is present in the bitstream. In this way, the entries in both reference picture list 1 and reference picture 0 are guaranteed when signaling the two flags.

At step 1106B, a current picture is decoded based on the collocated picture. Therefore, an unnecessary signaling in case the number of entries in reference picture list 0 equals to 0 is avoided, and the efficiency is improved.

FIG. 11C illustrates a portion of an exemplary picture header syntax structure 1100C, according to some embodiments of the present disclosure. The picture header (PH) syntax structure 1100C can be used in method 1100A. PH syntax structure 1100B is modified based on syntax structure 900A of FIG. 9A, and changes from the previous VVC are shown in italic in block 1110C and 1120C.

Referring to 1110C, in some embodiments, syntax element ph_collocated_from_l0_flag (e.g., syntax element 930A) is signaled when num_ref_entries[0][RplsIdx[0]] is greater than 0 and num_refe_entries[1][RplsIdx[1]] is greater than 0. Referring to 1120C, syntax element ph_mvd_l1_zero_flag (e.g., syntax element 950A) is signaled when pps_rpl_info_in_ph_flag is not equal to 0 or num_ref_entries[0][RplsIdx[0]] is greater than 0 with num_refe_entries[1][RplsIdx[1]] is greater than 0. Therefore, syntax element 930A and syntax element 950A can be signaled when the number of entries in reference picture list 0 and the number of reference picture list 1 are both greater than 0. An unnecessary signaling in case the number of entries in reference picture list 0 equals to 0 is avoided, and the coding efficiency is improved.

In VVC (e.g., VVC draft 9), the collocated picture can be indicated in PH or SH. If reference picture list information is signaled in PH, collocated picture is indicated in PH by syntax element 930A (e.g., ph_collocated_from_l0_flag) and syntax element 940A (e.g., ph_collocated_ref_idx). If the reference picture list information is signaled in SH, collocated picture is indicated in SH by syntax element 1040A (e.g., sh_collocated_from_l0_flag) and syntax element 1050A (e.g., sh_collocated_ref_idx). Syntax element 930A being equal to 1 specifies that the collocated picture used for temporal motion vector prediction is derived from reference picture list 0. Syntax element 930A being equal to 0 specifies that the collocated picture used for temporal motion vector prediction is derived from reference picture list 1. When syntax element 930A is signaled in PH, the signaling condition is that the number of entries in reference picture list 1 is greater than 0. However, the number of active entries in reference picture list can be overridden in slice level. Therefore, even if syntax element 930A is signaled to be 0, it cannot be guaranteed that the collocated picture can be selected from reference picture list 1, since SH may override the number of active entries in reference picture list 1 to be 0. Similarly, when syntax element 940A is signaled in PH, the maximum allowed value is the number of entries in the reference picture list minus 1. If SH overrides the number of active entries to be a value less than syntax element 940A, then it is an illegal bitstream.

To avoid such illegal scenarios, VVC (e.g., VVC draft 9) imposes several bitstream conformance constraints. However, it gives a burden for encoder to satisfy all the constraints. And practically the decoder should also consider how to deal with the bitstream when such illegal cases happen.

To overcome this deficiency with conventional coding technologies, in some embodiments of the present disclosure (such as provided below in FIGS. 12A-12J), the collocated picture is indicated without signaling the index to the reference picture list, such that the illegal scenarios are avoided in a more robust way.

Figure 12A:
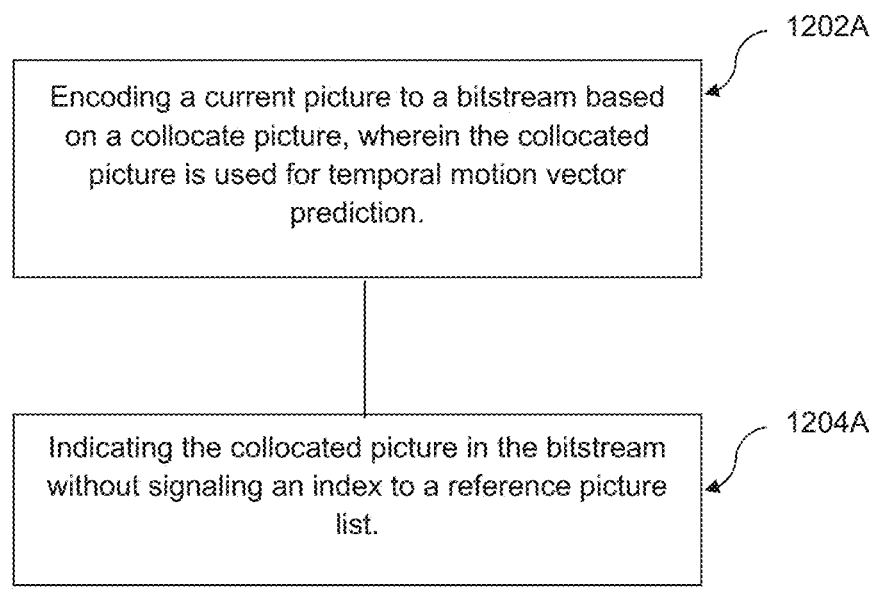
FIG. 12A shows a flow-chart of an exemplary video encoding method for indicating a collocated picture using picture order count, according to some embodiments of the present disclosure.

FIG. 12A illustrates a flow-chart of an exemplary video encoding method 1200A for indicating a collocated picture without signaling the index to the reference picture list, according to some embodiments of present disclosure. Method 1200A can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1200A. In some embodiments, method 1200A can be implemented by a computer program product, embodied in a computer-readable medium, including computer-executable instructions, such as program code, executed by computers (e.g., apparatus 400 of FIG. 4). Referring to FIG. 12A, method 1200A may include the following steps 1202A and 1204A.

At step 1202A, the encoder encodes a current picture to a bitstream based on a collocated picture, wherein the collocated picture is used for temporal motion vector prediction. At step 1204A, the collocated picture in the bitstream is indicated without signaling an index of a reference picture list. Since the collocated picture is indicated without referring to an entry in the reference picture list via the index, the collocated picture can be legally indicated even if SH overrides the number of active entries in reference picture list 1 to be 0. Therefore, the robustness of encoding process is improved.

Figure 12B:
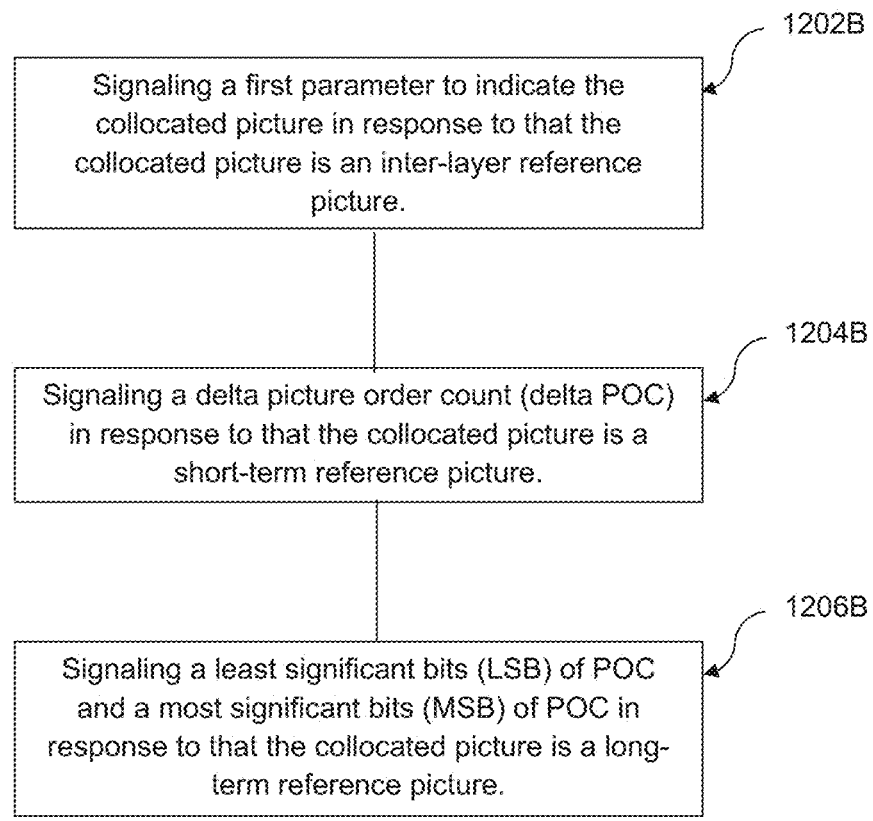
FIG. 12B shows a flow-chart of an exemplary video encoding method for indicating a collocated picture using picture order count, according to some embodiments of the present disclosure.
Figure 12C:
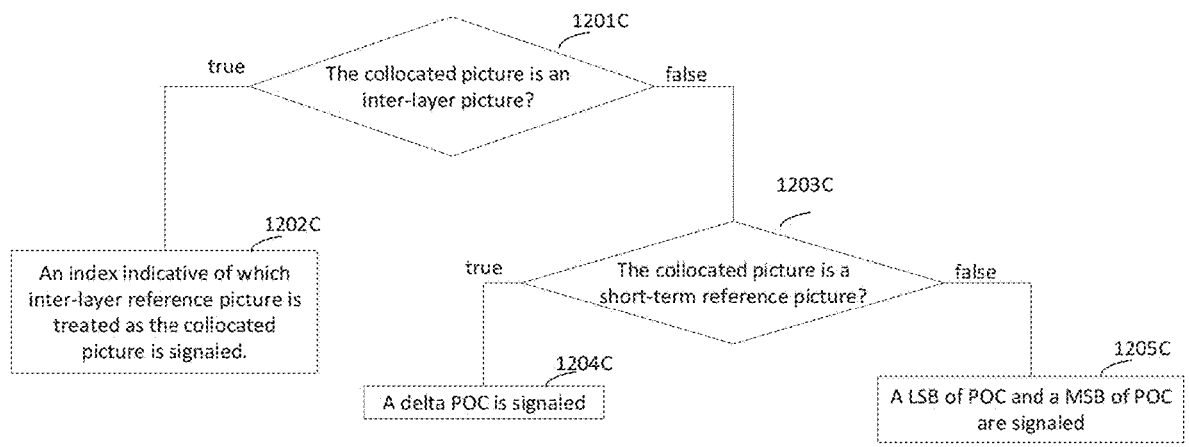
FIG. 12C shows another flow-chart of an exemplary video encoding method for indicating a collocated picture, according to some embodiments of present disclosure.

FIG. 12B shows an exemplary flowchart of an encoding method 1200B, according to some embodiments of present disclosure. It is appreciated that method 1200B can be part of step 1204A in method 1200A of FIG. 12A. FIG. 12C shows another flow-chart of an exemplary video encoding method 1200B for indicating a collocated picture, according to some embodiments of present disclosure. Referring to FIG. 12B and FIG. 12C, in some embodiments, the method 1200B may further include the following steps 1202B-1206B.

At step 1202B, when the collocated picture is an inter-layer reference picture, a first parameter is signaled to indicate the collocated picture. The first parameter indicates the index of the collocated picture to the list of direct reference layers of the layer where the current picture is in. For example, the index could be syntax element inter_layer_col_pic_idx. Therefore, the collocated picture is indicated without using the reference picture list. The illegal scenarios can be avoided when the SH overrides the number of active entries in the reference picture list. Prior to step 1202B, a flag to indicate whether the collocated picture is an inter-layer reference picture can be signaled. The step 1202B may also be referred to 1201C and 1202C in FIG. 12C.

At step 1204B, when the collocated picture is a short-term reference picture (STRP), a delta picture order count (delta POC) is signaled. Furthermore, a POC can be derived by the delta POC. In this scenario, the collocated picture is indicated using the POC, without using the reference picture list. Therefore, the illegal scenarios can be avoided when the SH overrides the number of active entries in the reference picture list. The step 1204B may also be referred to 1203C and 1204C in FIG. 12C.

At step 1206B, when the collocated picture is a long-term reference picture (LTRP), a least significant bits (LSB) of POC and a most significant bits (MSB) of POC is signaled. Furthermore, a POC can be derived by the LSB and MSB. In this scenario, the collocated picture is indicated using the POC, without using the reference picture list. Therefore, the illegal scenarios can be avoided when the SH overrides the number of active entries in the reference picture list. The step 1206B may also be referred to 1203C and 1205C in FIG. 12C. Indicating the collocated picture using the POC can efficiently enhance the robustness for determining the collocated picture. In some embodiments, prior to steps 1204B and 1206B, a flag to indicate whether the collocated picture is a short-term reference picture can be signaled.

Figure 12D:
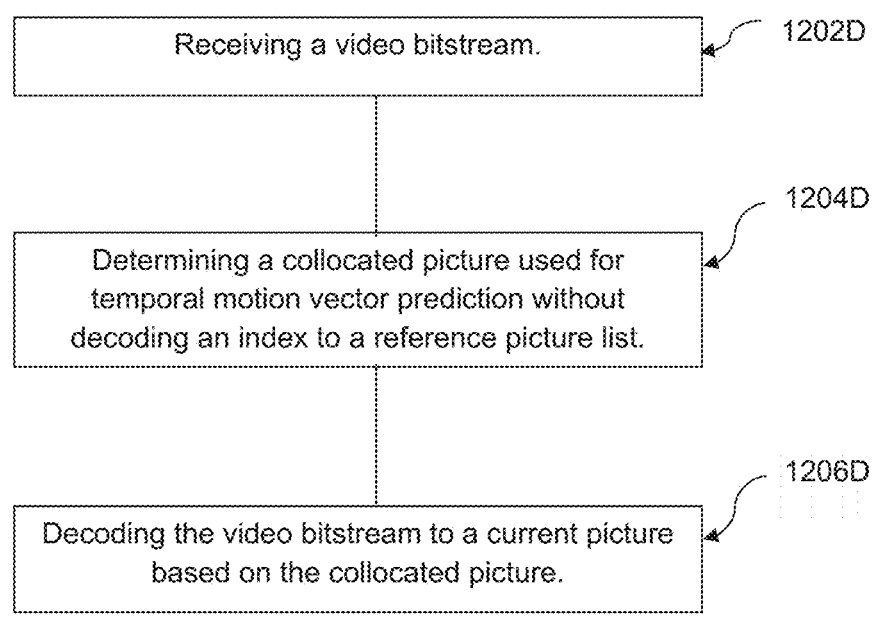
FIG. 12D shows a flow-chart of an exemplary video decoding method for indicating a collocated picture using picture order count, according to some embodiments of the present disclosure.

FIG. 12D illustrates a flow-chart of an exemplary video decoding method 1200D for indicating a collocated picture without decoding the index to the reference picture list, according to some embodiments of present disclosure. Method 1200D can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1200D. In some embodiments, method 1200D can be implemented by a computer program product, embodied in a computer-readable medium, including computer-executable instructions, such as program code, executed by computers (e.g., apparatus 400 of FIG. 4). Referring to FIG. 12D, method 1200D may include the following steps 1202D-1206D.

At step 1202D, the decoder receives a video bitstream (e.g., video bitstream 228 in FIG. 3B) for processing and the video bitstream may be coded using inter prediction. The reference pictures can be derived, for example, by reference picture 0 and reference picture list 1, each of which includes a list of reconstructed pictures in the DPB (e.g., buffer 234 in FIG. 3B) to be used as the reference pictures.

At step 1204D, a collocated picture used for temporal motion vector prediction is determined based on the bitstream but without decoding an index to a reference picture list.

At step 1206D, a current picture is decoded based on the collocated picture. Since the collocated picture is indicated without using the reference picture list structure, the collocated picture can be legally indicated even if SH overrides the number of active entries in reference picture list 1 to be 0. Therefore, the robustness of decoding process is improved.

Since the collocated picture is indicated without using the reference picture list structure, the collocated picture can be legally indicated even if SH overrides the number of active entries in reference picture list 1 to be 0. Therefore, the robustness of decoding process is improved.

Figure 12E:
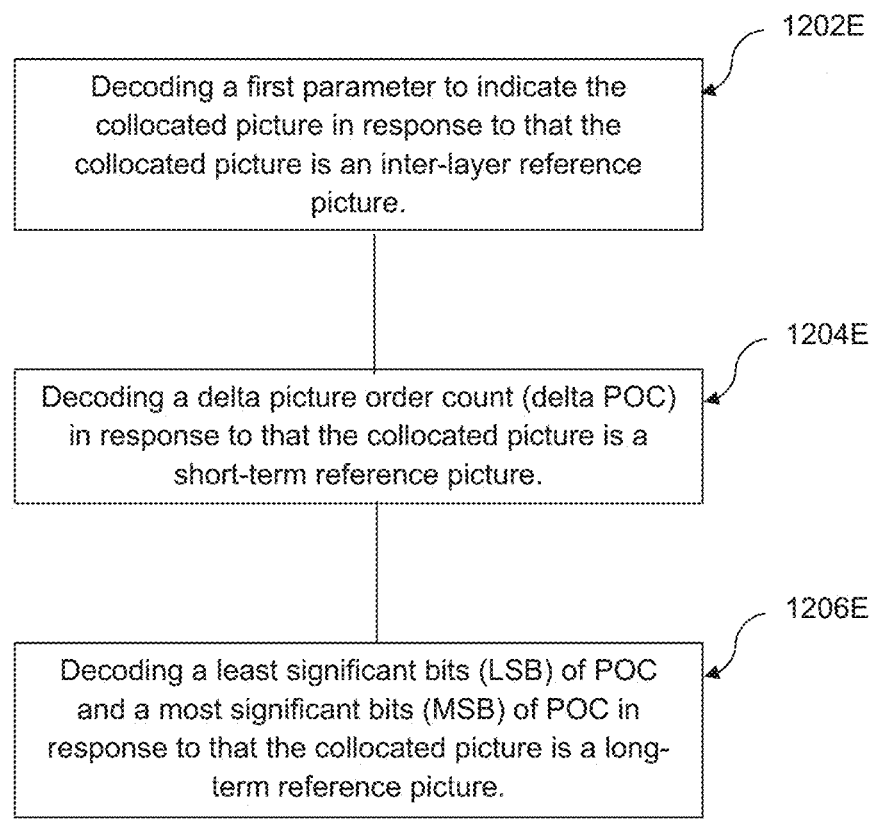
FIG. 12E shows a flow-chart of an exemplary video decoding method for indicating a collocated picture using picture order count, according to some embodiments of the present disclosure.

FIG. 12E shows an exemplary flowchart of a decoding method 1200E, according to some embodiments of present disclosure. It is appreciated that method 1200E can be part of step 1204D in method 1200D of FIG. 12D.

At step 1202E, when the collocated picture is an inter-layer reference picture, a first parameter is decoded to indicate the collocated picture. The first parameter indicates the index of the collocated picture to the list of direct reference layers of the layer where the current picture is in. For example, the index could be syntax element inter_layer_col_pic_idx. Therefore, the collocated picture is indicated without using the reference picture list. The illegal scenarios can be avoided when the SH overrides the number of active entries in the reference picture list. In some embodiments, prior to step 1202E, a first flag that indicates whether the collocated picture is an inter-layer reference picture is decoded, and whether the collocated picture is an inter-layer reference picture is determined based on the first flag.

At step 1204E, when the collocated picture is a short-term reference picture (STRP), a delta picture order count (delta POC) is decoded. Furthermore, a POC can be derived by the delta POC. In this scenario, the collocated picture is indicated using the POC, without using the reference picture list. Therefore, the illegal scenarios can be avoided when the SH overrides the number of active entries in the reference picture list.

At step 1206E, when the collocated picture is a long-term reference picture (LTRP), a least significant bits (LSB) of POC and a most significant bits (MSB) of POC is decoded. Furthermore, a POC can be derived by the LSB and MSB. In this scenario, the collocated picture is indicated using the POC, without using the reference picture list. Therefore, the illegal scenarios can be avoided when the SH overrides the number of active entries in the reference picture list. In some embodiment, prior to step 1204E and 1206E, a second flag that indicates whether the collocated picture is a short-term reference picture is decoded, and whether the collocated picture is a short-term reference picture is determined based on the second flag.

FIG. 12F and FIG. 12G illustrate a portion of an exemplary picture parameter set syntax structure 1200F and a portion of an exemplary slice header syntax structure 1200G, according to some embodiments of the present disclosure. The picture parameter set syntax structure 1200F together with the slice header syntax structure 1200G can be used in methods 1200A, 1200B, 1200D and 1200E. Picture parameter set syntax structure 1200F is modified based on a portion 960A of syntax structure 900A of FIG. 9A, and changes from the previous VVC are shown in italic, with proposed deleted syntax being further shown in strikethrough. Slice header syntax structure 1200G is modified based on a portion 1060A of syntax structure 1000A of FIG. 10A, with proposed deleted syntax being further shown in strikethrough. As shown in FIG. 12F and FIG. 12G, the syntax element ph_collocated_from_l0_flag, ph_collocated_ref_idx, sh_collocated_from_l0_flag and sh_collocated_ref_idx are no longer signaled in PPS nor in SH.

As shown in FIG. 12F, syntax element 1210F (e.g., inter_layer_col_pic_flag) being equal to 1 specifies that the collocated picture used for temporal motion vector prediction is referred to by an ILRP entry in the reference picture list. Syntax element 1210F being equal to 0 specifies that collocated picture used for temporal motion vector prediction is not referred to by an ILRP entry in the reference picture list. When syntax element 1210F is not present, the value of syntax element 1210F is inferred to be equal to 0. The syntax element 1210F can be signaled in 1201C for determining whether the collocated picture is an inter-layer reference picture.

Syntax element 1220F (e.g., st_col_pic_flag) being equal to 1 specifies that collocated picture used for temporal motion vector prediction is referred to by an STRP entry in the reference picture list. Syntax element 1220F being equal to 0 specifies that collocated picture used for temporal motion vector prediction is referred to by an LTRP entry in the reference picture list. When syntax element 1210F is equal to 0 and syntax element 1220F is not present, the value of syntax element 1220F is inferred to be equal to 1. The syntax element 1220F can be signaled in 1203C for determining whether the collocated picture is a short-term reference picture. If the syntax element 1220F is equal to 1 (e.g., 1203C-true in FIG. 12C), then step 1204B (as shown in FIG. 12B) is processed, and a delta picture order count (delta POC) is signaled (e.g., in 1204C in FIG. 12C). If the syntax element 1220F equals to 0 (e.g., 1203C—false in FIG. 12C), then step 1206B (as shown in FIG. 12B) is processed, and a least significant bits (LSB) of POC and a most significant bits (MSB) of POC is signaled (e.g., in 1205C in FIG. 12C).

Syntax element 1230F (e.g., abs_delta_poc_st_col) specifies the value of the variable AbsDeltaPocStCol. FIG. 12H shows an example pseudocode including derivation of AbsDeltaPocStCol 1210H, according to some embodiments of the present disclosure. The value of syntax element 1230F (e.g., abs_delta_poc_st_col) can be in an inclusive range of 0 to $2^{15}-1$.

Referring back to FIG. 12F, syntax element 1240F (e.g., sign_delta_poc_st_col_flag) being equal to 1 specifies that the value of variable DeltaPocValStCol is greater than or equal to 0. Syntax element 1240F being equal to 0 specifies that the value of variable DeltaPocValStCol is less than 0. When syntax element 1240F is not present, the value of syntax element 1240F is inferred to be equal to 1. FIG. 12I shows an example pseudocode including derivation of DeltaPocValStCol, according to some embodiments of the present disclosure. The variable DeltaPocValStCol can be derived as shown in FIG. 12I.

Referring back to FIG. 12F, in some embodiments, syntax element 1250F (e.g., poc_lsb_lt_col) specifies the value of the picture order count modulo MaxPicOrderCntLsb of the collocated picture used for temporal motion vector prediction. The length of the syntax element 1250F is sps_log 2_max_pic_order_cnt_lsb_minus4+4 bits.

Syntax element 1260F (e.g., delta_poc_msb_cycle_lt_col) specifies the value of the variable FullPocLtCol as follows:

FullPocLtCol=PicOrderCntVal−
delta_poc_msb_cycle_lt_col*MaxPicOrderCntLsb−
(PicOrderCntVal&(MaxPicOrderCntLsb−1))+
poc_lsb_lt_col Syntax element 1270F (e.g., delta_poc_msb_cycle_col_present_flag) being equal to 1 specifies that syntax element 1260F (e.g., delta_poc_msb_cycle_lt_col) is present. Syntax element 1270B being equal to 0 specifies that syntax element 1260F is not present.

Further for syntax element 1270F, let prevTidOPic be the previous picture in decoding order that has nuh_layer_id the same as the slice or picture header referring to the ref_pic_lists ( ) syntax structure, has TemporalId equal to 0, and is not a RASL or RADL picture. Let setOfPrevPocVals be a set consisting of the following:
the PicOrderCntVal of prevTidOPic,
the PicOrderCntVal of each picture that is referred to by entries in RefPicList[0] or RefPicList[1] of prevTidOPic and has nuh_layer_id the same as the current picture,
the PicOrderCntVal of each picture that follows prevTidOPic in decoding order, has nuh_layer_id the same as the current picture, and precedes the current picture in decoding order.

When there is more than one value in setOfPrevPocVals for which the value modulo MaxPicOrderCntLsb is equal to syntax element 1250F (e.g., poc_lsb_lt_col), the value of delta_poc_msb_cycle_present_flag[i][j] shall be equal to 1.

Syntax element 1280F (e.g., inter_layer_col_pic_idx) specifies the index, to the list of the direct reference layers, of the collocated picture used for temporal motion vector when the collocated picture used for temporal motion vector prediction is referred to by an ILRP entry in the reference picture list. The value of syntax element 1280F can be in an inclusive range of 0 to NumDirectRefLayers[GeneralLayerIdx[nuh_layer_id]]−1.

As shown in FIG. 12F, when sps_inter_layer_ref_pics_present_flag (e.g., syntax element 720) is equal to 1, syntax element 1210F is signaled, that is, ILRPs may be used for inter prediction of one or more coded pictures in the CLVS, an index (e.g., syntax element 1280F inter_layer_col_pic_idx) is signaled to indicate which inter-layer reference picture is treated as collocated picture, which is corresponding to step 1202B in FIG. 12B. If the collocated picture is a short-term reference picture, that is, syntax element 1220F (e.g., st_col_pic_flag) is equal to 1, a delta POC (e.g., syntax element 1230F) is signaled, which is corresponding to step 1204B in FIG. 12B. If the collocated picture is a long-term reference picture, that is syntax element 1220F (e.g., st_col_pic_flag) is equal to 0, a LSB of POC (e.g., syntax element 1250F and a delta MSB of POC (e.g., syntax element 1260F) are signaled, which is corresponding to step 1206B in FIG. 12B. Furthermore, a MSB of POC can be derived by a delta MSB, and a POC can be derived by a MSB and an LSB. Therefore, the collocated picture can be indicated independently from the reference picture list structure.

Considering the fact that VVC (e.g., VVC draft 9) has a constraint that the collocated picture referred to by all the slices within a picture should be a same picture, according to the updated syntax structure 1200F and 1200G, the collocated picture can be only indicated in PH, and not in SH. As a result, all the slices within a picture can be guaranteed to have the same collocated picture and the constraint is not needed, therefore the efficiency and robustness for indicating the collocated picture is enhanced.

FIG. 12J illustrates an example pseudocode for deriving the collocated picture denoted as colPic and the flag colPicFlag used in methods 1200A, 1200B, 1200C and 1200D, according to some embodiments of the present disclosure. As shown in FIG. 12J, for different scenarios of the collocated picture, such as the collocated picture being referred to by an STRP entry in the reference picture list (as shown in scenario 1210J), the collocated picture being referred to by an LTRP entry in the reference picture list (as shown in scenario 1220J), or the collocated picture being referred to by an ILPR entry in the reference picture list (as shown in scenario 1230J), all the slices within a picture have the same collocated picture (e.g., picA). Therefore, the robustness for determining the collocated picture is improved.

In some embodiments, there is a requirement of bitstream conformance that the following constraints apply: colPic is not be "no reference picture" and is referred to by an active entry in RefPicList[0] or RefPicList[1] and colPicFlag is equal to 0, when ph_temporal_mvp_enabled_flag is equal to 1. The "no reference picture" can be regarded as a marker to indicate that there is no reference picture in RPL. The colPicFlag being equal to 0 indicates that the current picture and the collocated picture have a same picture size and same scaling window. In another word, when the temporal MVP is enabled, the collocated picture should exist in the reference picture list and is referred to by an active entry in reference picture list 0 or reference picture list 1. Therefore, the robustness for the collocated picture is improved.

In VVC (e.g., VVC draft 9), ref_pic_list_struct( ) and the syntax elements that are used to identify the collocated picture (syntax element 930A (e.g., ph_collocated_from_l0_flag) and syntax element 940A (e.g., ph_collocated_ref_idx) in PH and syntax element 1040A (e.g., sh_collocated_from_l0_flag) and syntax element 1050A (e.g., sh_colocated_ref_idx) in SH)) may be signaled in PH or SH dependent on the value of pps_rpl_infoph_flag. When the value of pps_rpl_info_ph_flag is equal to 1, syntax element 930A, syntax element 940A and ref_pic_list_struct( ) are signaled in PH, and syntax element 1040A and syntax element 1050A are not signaled. In this case, the value of syntax element 1040A and syntax element 1050A are inferred according to the value of syntax element 930A, syntax element 940A and slice type of the current slice. If it is a B slice, syntax element 1040A is inferred to be equal to syntax element 930A. If it is a P slice, syntax element 1040A is directly inferred to be equal to 1 regardless of the value of syntax element 930A. And syntax element 1050A is inferred to be equal to syntax element 940A for both P and B slices. However, for syntax element 940A that is signaled in PH, the maximum allowed value is the number of entries in reference picture list minus 1, but for syntax element 1050A, the maximum allowed value is the number of active entries in reference picture list minus 1 which may be overridden in slice header. As a result, when syntax element 1050A is inferred to be equal to syntax element 940A, it might violate the maximum value constraint.

For example, when syntax element 930A is signaled as 0, the number of entries in reference picture list 1 (num_ref_entries[1] signaled in refpic_list_structure( )) is N and ph_colocated_ref_idx is signaled as N−1, and then in this case, syntax element 1040A is inferred to be equal to 0 and syntax element 1050A is inferred to be equal to N−1. But the number of active entries in reference picture list 1 may be overridden as a number less than N. In that case, the bitstream is illegal.

In another example, when syntax element 930A is signaled as 0, the number of entries in reference picture list 1 (num_ref_entries[1] signaled in ref_pic_list_structure( )) is N, syntax element 940A is signaled as N−1, and the number of active entries is not overridden in slice header (assume the number of active entries is the same as the number of entries in both reference picture lists). But if the current slice is a P slice, then syntax element 940A is inferred to be equal to 1 and syntax element 1050A is inferred to be equal to N−1. However, the number of entries in reference picture list 0 (num_ref_entries[0] signaled in refpic_list_structure( )) may be less than N. As a result, the bitstream is also illegal.

To overcome this deficiency with conventional coding technologies, in some embodiments of the present disclosure (such as provided below in FIGS. 13A-13C), the collocated picture in SH is inferred also based on the number of active entries in reference picture list.

FIG. 13A shows a flow-chart of an exemplary video encoding method 1300A for determining the index of collocated picture in SH using the number of active entries in reference picture list, according to some embodiments of the disclosure. Method 1300A can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1300A. In some embodiments, method 1300A can be implemented by a computer program product, embodied in a computer-readable medium, including computer-executable instructions, such as program code, executed by computers (e.g., apparatus 400 of FIG. 4). Referring to FIG. 13A, method 1300A may include the following steps 1302A-1306A.

At step 1302A, whether to signal a parameter to indicate a reference index of the collocated picture in a slice header is determined. In VVC, the parameter to indicate a reference index of the collocated picture in a slice header could be syntax element sh_collocated_ref_idx.

At step 1304A, when the parameter not being signaled in the slice header, the collocated picture is determined as the picture referred to by an index with the value equal to the smaller one between a value of a reference index of the collocated picture signaled in a picture header (e.g., ph_collocated_ref_idx) and a number of active entries in a target reference picture list minus 1 (e.g., NumRefIdxActive[!sh_collocated_from_l0_flag]−1). The target reference picture list in reference picture lists is indicated by a flag that indicates from which reference picture list the collocated picture used for temporal motion vector prediction is derived. Therefore, the number of active entries in the reference picture is taken into consideration when inferring the value of syntax element 1050A (e.g., sh_collocated_ref_idx). If the value of syntax element 940A (e.g., ph_collocated_ref_idx) signaled in PH is greater than or equal to the number of active entries in the target reference picture list, the inferred value of syntax element 1050A (e.g., sh_collocated_ref_idx) is clipped to less than the number of active entries in the target reference picture list. The target reference picture list in the reference picture list is indicated by syntax element 1040A (e.g., sh_collocated_from_l0_flag).

At step 1306A, a current picture is encoded based on the collocated picture, wherein the collocated picture is used for temporal motion vector prediction. Therefore, illegal bitstreams are avoided and the robustness of the collocated picture is improved.

Figure 13B:
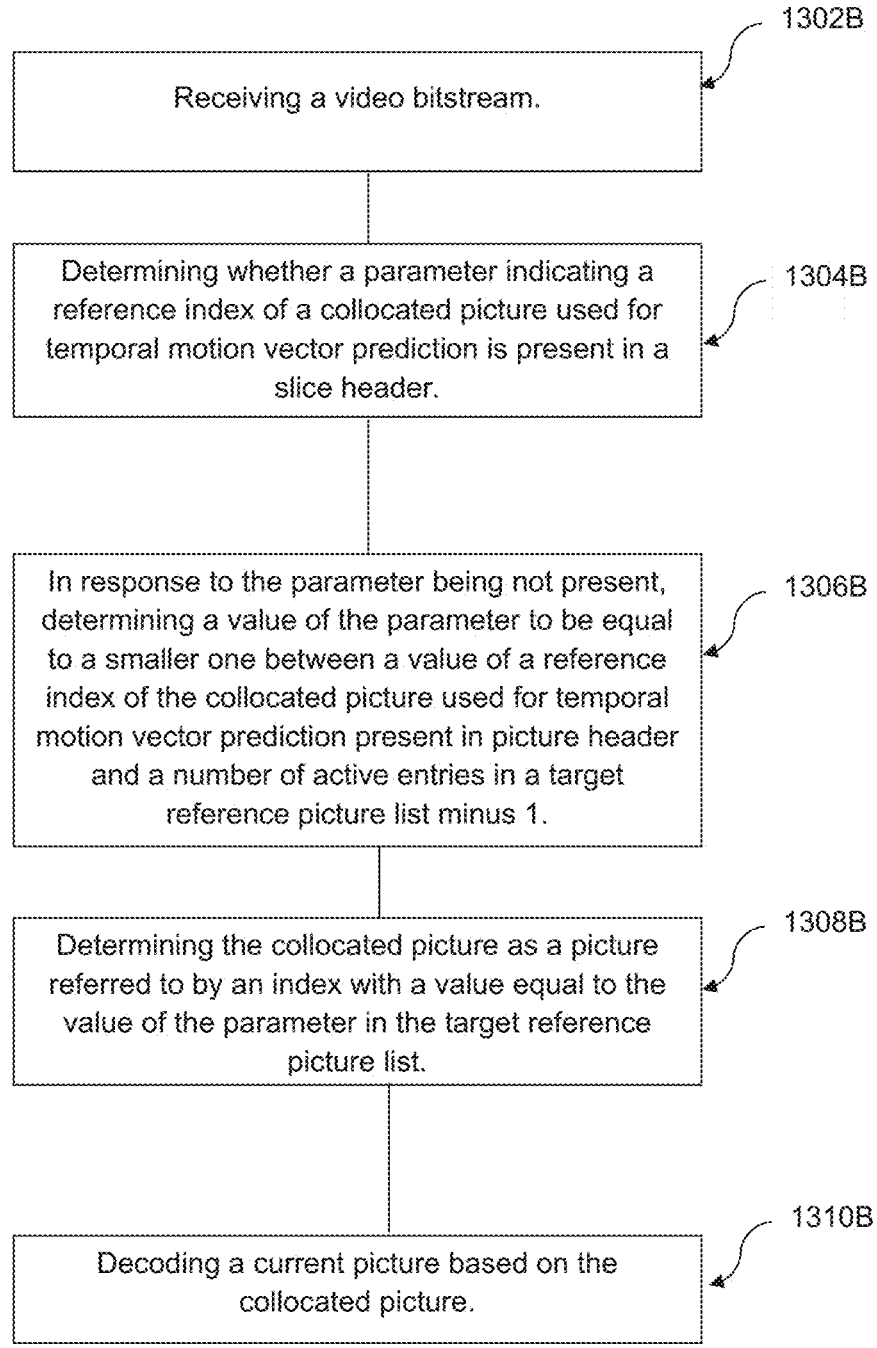
FIG. 13B shows a flow-chart of an exemplary video decoding method for inferring the index of collocated picture in SH using the number of active entries in reference picture list, according to some embodiments of the present disclosure.

FIG. 13B shows a flow-chart of an exemplary video decoding method 1300B for determining the index of collocated picture in SH using the number of active entries in reference picture list, according to some embodiments of the disclosure. Method 1300B can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1300B. In some embodiments, method 1300B can be implemented by a computer program product, embodied in a computer-readable medium, including computer-executable instructions, such as program code, executed by computers (e.g., apparatus 400 of FIG. 4). Referring to FIG. 13B, method 1300B may include the following steps 1302B-1310B.

At step 1302B, the decoder receives a video bitstream (e.g., video bitstream 228 in FIG. 3B and the video bitstream may be coded using inter prediction. Therefore the reference pictures can be derived, for example, by reference picture 0 and reference picture list 1, each of which includes a list of reconstructed pictures in the DPB (e.g., buffer 234 in FIG. 3B) to be used as the reference pictures.

At step 1304B, whether a parameter indicating a reference index of the collocated picture used for temporal motion vector prediction being present in a slice header is determined. In VVC, the parameter to indicate a reference index of the collocated picture in the slice header could be syntax element sh_collocated_ref_idx.

At step 1306B, when the parameter being not present, a value of the parameter is determined to be equal to the smaller one between a value of a reference index of the collocated picture used for temporal motion vector prediction present in picture header (e.g., ph_collocated_ref_idx) and a number of active entries in a target reference picture list minus 1 (e.g., NumRefIdxActive[!sh_collocated_from_l0_flag]−1). The target reference picture list in reference picture lists is indicated by a flag that indicates from which reference picture list the collocated picture used for temporal motion vector prediction is derived. Therefore, the number of active entries in the reference picture is taken into consideration when determining the value of syntax element 1050A (e.g., sh_collocated_ref_idx). If the value of syntax element 940A (e.g., ph_collocated_ref_idx) signaled in PH is greater than or equal to the number of active entries in the target reference picture list, the determined value of syntax element 1050A (e.g., sh_collocated_ref_idx) is clipped to less than the number of active entries in the target reference picture list. The target reference picture list in the reference picture list is indicated by syntax element 1040A (e.g., sh_collocated_from_l0_flag). Therefore, illegal bitstreams are avoided.

At step 1308B, the collocated picture is determined as a picture referred to by an index with a value equal to the parameter in the target reference picture list. The robustness of the collocated picture is improved.

At step 1310B, a current picture is decoded based on the collocated picture. The reliability of the decoding process is improved.

FIG. 13C illustrates a portion of an exemplary semantics 1300C, according to some embodiments of the present disclosure. The semantics 1300C can be used in method 1300A and method 1300B. As shown in FIG. 13C, changes from the previous VVC are shown in italic, with proposed deleted syntax being further shown in strikethrough in syntax 1310C. The syntax 1310C is corresponding to the step 1306A in FIG. 13A and step 1306B in FIG. 13B. If pps_rpl_info_in_ph_flag (e.g., syntax element 830) is equal to 1, that means the reference picture list information is present in the PH syntax structure and not present in SH referring to the PPS that do not contain a PH syntax structure, the value of sh_collocated_ref_idx (e.g., syntax element 1050A) is inferred to be equal to min(ph_collocated_ref_idx, NumRefIdxActive[!sh_collocated_from_l0_flag]−1), that is, the value of sh_collocated_ref_idx is set equal to a smaller one of a value of reference index of the collocated picture used for temporal motion vector prediction in picture header (e.g., ph_collocated_ref_idx) and a number of active entries in a target reference picture list minus 1 (e.g., NumRefIdxActive[!sh_collocated_from_l0_flag]−1). The target reference picture list is indicated by syntax element 1040A (e.g., sh_collocated_from_l0_flag), which is the reference picture list that the collocated picture used for temporal motion vector prediction is derived from. When the collocated picture used for temporal MVP is derived from reference picture list 0, the target reference picture list is reference picture list 0. When the collocated picture used for temporal MVP is derived from reference picture list 1, the target reference picture list is reference picture list 1.

In VVC (e.g., VVC draft 9), ref_pic_list_struct( ) may be signaled in SPS or included in syntax structure ref_pic_lists( ). When ref_pic_list_structure( ) that are signaled in SPS are not selected in PH or SH, another ref_pic_list_structure( ) may be directly signaled in ref_pic_lists( ), which is signaled in PH or SH. However, the VVC (e.g., VVC draft 9) provides the following: each value of listIdx (equal to 0 or 1), a decoder should allocate memory for a total number of sps_num_ref_pic_lists[i] plus one ref_pic_list_struct(listIdx, rplsIdx) syntax structures since there may be one ref_pic_list_struct(listIdx, rplsIdx) syntax structure directly signalled in the slice headers of a current picture. This is not accurate in view of the above.

To overcome this deficiency with conventional coding technologies, in some embodiments of the present disclosure (such as provided below in FIG. 14A and FIG. 14B), for each value of listIdx (equal to 0 or 1), a decoder allocate memory for a total number of sps_num_ref_pic_lists[i] plus one ref_pic_list_struct(listIdx, rplsIdx) syntax structures for the case that one ref_pic_list_struct(listIdx, rplsIdx) syntax structure directly signalled in the picture headers or slice headers of a current picture.

Figure 14A:
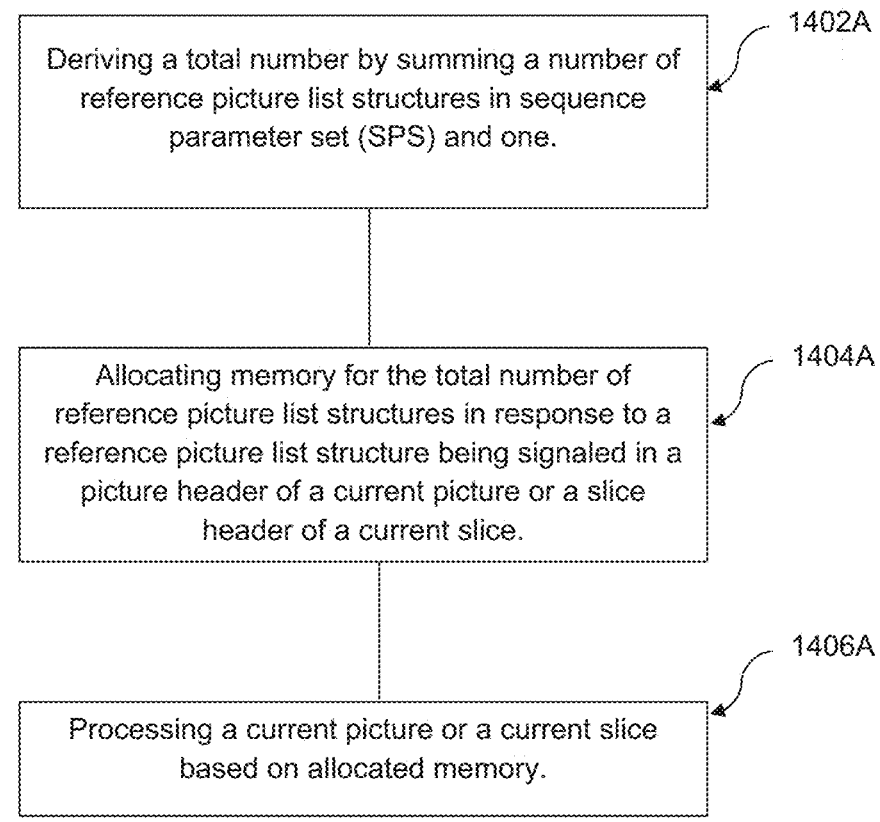
FIG. 14A shows a flow-chart of an exemplary video processing method for a decoder allocating memory, according to some embodiments of the present disclosure.

FIG. 14A illustrates a flow-chart of an exemplary video processing method 1400A for allocating memory, according to some embodiments of the disclosure. Method 1400A can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, one or more processor (e.g., processor 402 of FIG. 4) can perform method 1400A. In some embodiments, method 1400A can be implemented by a computer program product, embodied in a computer-readable medium, including computer-executable instructions, such as program code, executed by computers (e.g., apparatus 400 of FIG. 4). Referring to FIG. 14A, method 1400A may include the following steps 1402A-1406A.

At step 1402A, a total number by summing a number of reference picture list structures in sequence parameter set (SPS) and one is derived. Since there is a possibility that one additional RPL is signaled later (in picture header or slice header), the additional number one is added to number of reference picture list structure in SPS to get a total number.

At step 1404A, memory for the total number of reference picture list structures in response to a reference picture list structure being signaled in a picture header of a current picture or a slice header of a current slice is allocated. Therefore, more memory is allocated for the additional RPL that is signaled in a picture header of a current picture or in a slice header of a current slice by an encoder/decoder before encoding/decoding, which will be helpful for video processing.

At step 1406A, a current picture or a current slice is processed using the allocated memory. Since the allocated memory is more reliable for the additional RPL, the encoding/decoding process can be more accurate and robust.

FIG. 14B illustrates a portion of an exemplary semantics 1400B, according to some embodiments of the present disclosure. The semantics 1400B can be used in method 1400A, changes from the previous VVC are shown in italic (refer to block 1410B). More memory is allocated for additional RPL for a possibility that one additional RPL is signaled later (in picture header or slice header).

In VVC (e.g., VVC draft 9), syntax element 530A (e.g., rpl_idx[i]) specifies the index, into the list of the ref_pic_list_struct(listIdx, rplsIdx) syntax structures with listIdx equal to i included in the SPS, of the ref_pic_list_struct (listIdx, rplsIdx) syntax structure with listIdx equal to i that is used for derivation of reference picture list i of the current picture. This semantics may not be accurate since reference picture list may be derived for a picture or a slice.

In VVC (e.g., VVC draft 9), when syntax element 530A is not present, there is a inference rule to infer the value of syntax element 530A: if syntax element 510A (e.g., rpl_sps_flag[i]) is equal to 1 and syntax element 520A (e.g., pps_rpl1_idx_present_flag) is equal to 0, the value of rpl_idx[1] is inferred to be equal to rpl_idx[0], otherwise the value of rpl_idx[1] is inferred to be equal to 0. The inference rule has some problems. First, there is only an inference rule for rpl_idx[1], but no inference rule for rpl_idx[0]. Second, when syntax element 510A is equal to 1 and syntax element 520A is equal to 0, there is no guarantee that rpl_idx[0] is signaled. So inferring the value of rpl_idx[1] to be equal to rpl_idx[0] may be problematic in this case. In a word, the inference rule in VVC (e.g., VVC draft 9) cannot guarantee that both rpl_idx[0] and rpl_idx[1] get a proper value in decoder side when they are not present.

To overcome this deficiency with conventional coding technologies, in some embodiments of the present disclosure (such as provided below in FIGS. 15A-15C), an updated semantics for syntax element 530A (e.g., rpl_idx[i]) is provided.

Figure 15A:
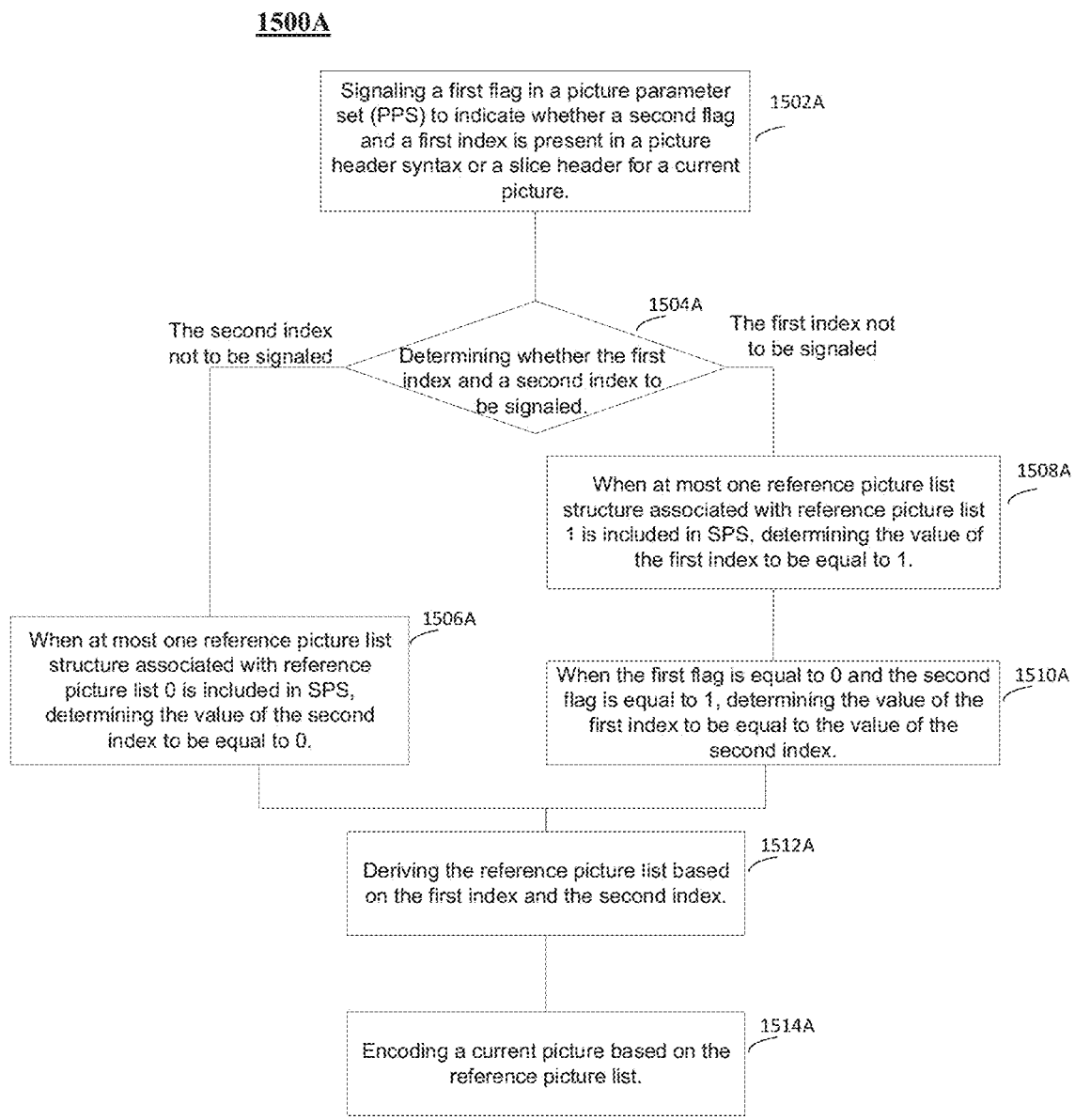
FIG. 15A shows a flow-chart of an exemplary video encoding method for inferring the index in the reference picture list, according to some embodiments of the present disclosure.

FIG. 15A illustrates a flow-chart of an exemplary video encoding method 1500A for determining the index in the reference picture list, according to some embodiments of the disclosure. Method 1500A can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1500A. In some embodiments, method 1500A can be implemented by a computer program product, embodied in a computer-readable medium, including computer-executable instructions, such as program code, executed by computers (e.g., apparatus 400 of FIG. 4). Referring to FIG. 15A, method 1500A may include the following steps 1502A-1514A.

At step 1502A, a first flag (e.g., pps_rpl1_idx_present_flag) in a picture parameter set (PPS) is signaled to indicate whether a second flag (e.g., rpl_sps_flag[1]) and a first index (e.g., rpl_idx[1]) being present in a picture header syntax or a slice header for a current picture referring to the PPS. The first flag (e.g., pps_rpl1_idx_present_flag) indicates whether reference picture list 1 is derived based on one of the reference picture list structures associated with reference picture list 1 signaled in a sequence parameter set (SPS) and the first index (e.g., rpl_idx[1]) is the index, to the list of the reference picture list structures associated with reference picture list 1 included in the SPS, of the reference picture list structure associated with reference picture list 1 that is used for derivation of reference picture list 1. Then the second flag (e.g., rpl_sps_flag[1]) can be signaled.

At step 1504A, whether the first index (e.g., rpl_idx[1]) and a second index (e.g., rpl_idx[0]) to be signaled is determined. The second index (e.g., rpl_idx[0]) is the index, to the list of the reference picture list structures associated with reference picture list 0 included in the SPS, of the reference picture list structure associated with reference picture list 0 that is used for derivation of reference picture list 0.

When the second index (e.g., rpl_idx[0]) is not to be signaled, a value of the second index (e.g., rpl_idx[0]) can be determined by step 1506A.

At step 1506A, the value of the second index (e.g., rpl_idx[0]) is determined to be equal to 0, when at most one reference picture list structure associated with reference picture list 0 is included in SPS. Referring to FIG. 5A, when the sps_num_ref_pic_lists[0] is less than or equal to one, the rpl_idx[0] is not signaled. Therefore, with step 1506A, the value of rpl_idx[0] is determined for the situation that the rpl_idx[0] is not signaled, enhancing the reliability for inferring rpl_idx[0].

When the first index (e.g., rpl_idx[1]) is not to be signaled, the value of the first index (e.g., rpl_idx[0]) can be determined by the step 1508A and 1510A.

At step 1508A, the value of the first index (e.g., rpl_idx[1]) is determined to be equal to 0 when at most one reference picture list structure associated with reference picture list 1 is included in SPS. Referring to FIG. 5A, when the sps_num_ref_pic_lists[1] is less than or equal to one, the rpl_idx[1] is not signaled. Therefore, with step 1508A, the value of rpl_idx[1] is determined for the situation that the rpl_idx[1] is not signaled, enhancing the reliability for inferring rpl_idx[1].

At step 1510A, the value of the first index (e.g., rpl_idx [1]) is determined to be equal to the value of the second index (e.g., rpl_idx[0]), when the first flag (e.g., pps_rpl1_idx_present_flag) is equal to 0 and the second flag (e.g., rpl_sps_flag[1]) is equal to 1. Since the value of rpl_idx[0] is set to 0 if sps_num_ref_pic_lists[0] is less than or equal to one (in step 1508A) and otherwise (e.g., sps_num_ref_pic_list[0]>1), the rpl_idx[0] is signaled (referring to FIG. 5A), the value of rpl_idx[0] is determined for all the scenarios. Therefore, in this case, the value of rpl_idx[1] is set equal to the value of rpl_idx[0], which is determined. Thus, for all the scenarios (e.g., no matter rpl_idx[0] is signaled or not), the value of rpl_idx[1] is determined. The value of rpl_idx[i] (both rpl_idx[0] and rpl_idx[1]) can be guaranteed to get a proper value if the rpl_idx[i] is not signaled.

After the determination of values of the first index (e.g., rpl_idx[1]) and the second index (e.g., rpl_idx[0]), at step 1512A, the reference picture list is determined based on the first index and the second index. Since the determination of the values of the first index (e.g., rpl_idx[1]) and the second index (e.g., rpl_idx[0]) is guaranteed for the cases no matter the first index (e.g., rpl_idx[1]) and the second index (e.g., rpl_idx[0]) being signaled or not, the determination for the reference picture list can be more reliable.

At step 1514A, a current picture is encoded based on the reference picture list. Therefore, the robustness for the encoding process is improved.

In some embodiments, the step 1510A can be replaced by "rpl_idx[i] is determined to be equal to 0 in response to one reference picture list structure for reference picture list i being present in SPS", as rpl_idx[0] is inferred to be equal to 0 when one reference picture list structure of reference picture list 0 being present in SPS (referring to step 1508A). The efficiency of encoding process can be further improved.

Figure 15B:
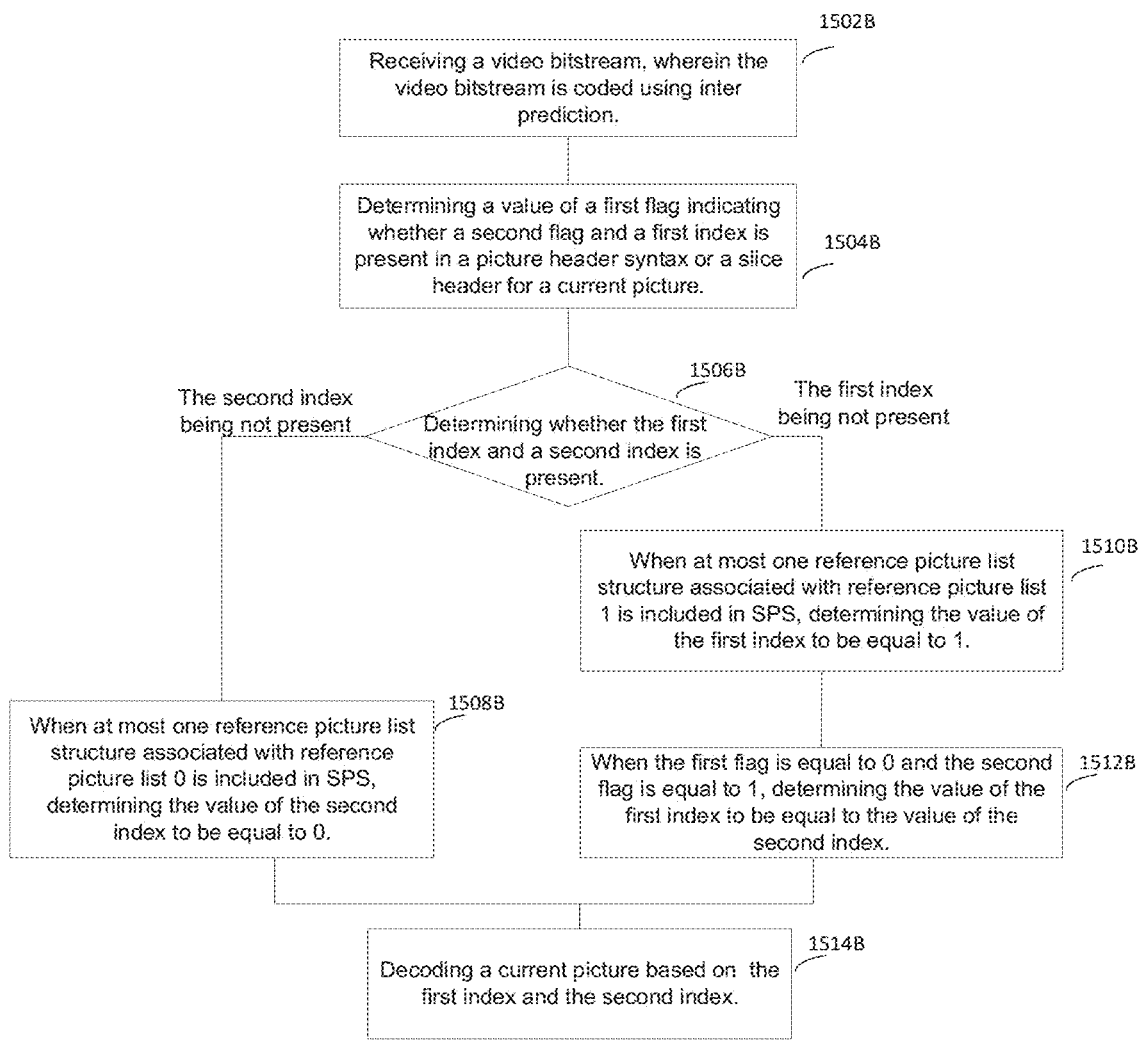
FIG. 15B shows a flow-chart of an exemplary video decoding method for inferring the index in the reference picture list, according to some embodiments of the present disclosure.

FIG. 15B illustrates a flow-chart of an exemplary video decoding method 1500B for determining the index in the reference picture list, according to some embodiments of the disclosure. Method 1500B can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1500B. In some embodiments, method 1500B can be implemented by a computer program product, embodied in a computer-readable medium, including computer-executable instructions, such as program code, executed by computers (e.g., apparatus 400 of FIG. 4). Referring to FIG. 15B, method 1500B may include the following steps 1502B-1514B.

At step 1502B, the decoder receives a video bitstream (e.g., video bitstream 228 in FIG. 3B) and the video bitstream may be coded using inter prediction. the reference pictures can be derived, for example, by reference picture 0 and reference picture list 1, each of which includes a list of reconstructed pictures in the DPB (e.g., buffer 234 in FIG. 3B) to be used as the reference pictures.

At step 1504B, a value of a first flag (e.g., pps_rpl1_idx_present_flag) indicating whether a second flag (e.g., rpl_sps_flag[1]) and a first index (e.g., rpl_idx[1]) is present in a picture header syntax or a slice header for a current picture is determined. The second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1. Then the value of the second flag (e.g., rpl_sps_flag[1]) can be determined.

At step 1506B, whether the first index (e.g., rpl_idx[1]) and a second index (e.g., rpl_idx[0]) being present is determined. The second index (e.g., rpl_idx[0]) is the index, to the list of the reference picture list structures associated with reference picture list 0 included in the SPS, of the reference picture list structure associated with reference picture list 0 that is used for derivation of reference picture list 0.

When the second index (e.g., rpl_idx[0]) is not present, a value of the second index (e.g., rpl_idx[0]) can be determined by step 1508B.

At step 1508B, the value of the second index (e.g., rpl_idx[0]) is determined to be equal to 0, when at most one reference picture list structure associated with reference picture list 0 is included in SPS. Referring to FIG. 5A, when the sps_num_ref_pic_lists[0] is less than or equal to one, the rpl_idx[0] is not signaled, thus the rpl_idx[0] is not present. In this case, the rpl_idx[0] is set to be equal to 0. Therefore, with step 1508B, the value of rpl_idx[0] is determined for the situation that the rpl_idx[0] is not present, enhancing the reliability for inferring rpl_idx[0].

When the first index (e.g., rpl_idx[1]) is not present, the value of the first index (e.g., rpl_idx[1]) can be determined by the step 1510B and 1512B.

At step 1510B, the value of the first index (e.g., rpl_idx[1]) is determined to be equal to 0 when at most one reference picture list structure associated with reference picture list 1 is included in SPS. Referring to FIG. 5A, when the sps_num_ref_pic_lists[1] is less than or equal to one, the rpl_idx[1] is not signaled, thus the rpl_idx[1] is not present. Therefore, with step 1510B, the value of rpl_idx[1] is determined for the situation that the rpl_idx[1] is not signaled, enhancing the reliability for inferring rpl_idx[1].

At step 1512B, the value of the first index (e.g., rpl_idx[1]) is determined to be equal to the value of the second index (e.g., rpl_idx[0]), when the first flag (e.g., pps_rpl1_idx_present_flag) is equal to 0 and the second flag (e.g., rpl_sps_flag[1]) is equal to 1 Since the value of rpl_idx[0] is set to 0 if sps_num_ref_pic_lists[0] is less than or equal to one (in step 1508A) and otherwise (e.g., sps_num_ref_pic_list[0]>1), the rpl_idx[0] is signaled (referring to FIG. 5A), the value of rpl_idx[0] is determined for all the scenarios. Therefore, in this case, the value of rpl_idx[1] is set equal to the value of rpl_idx[0], which is determined. Thus, for all the scenarios (e.g., no matter rpl_idx[0] is present or not), the value of rpl_idx[1] is determined. The value of rpl_idx[i] (both rpl_idx[0] and rpl_idx[1]) can be guaranteed to get a proper value if the rpl_idx[i] is not present.

At 1514B, a current picture is decoded based on the first index (e.g., rpl_idx[1]) and the second index (e.g., rpl_idx[0]). As the determination of the values of the first index (e.g., rpl_idx[1]) and the second index (e.g., rpl_idx[0]) is guaranteed for the cases no matter the first index (e.g., rpl_idx[1]) and the second index (e.g., rpl_idx[0]) being present or not, the determination for the reference picture list can be more reliable.

In some embodiments, the step 1514B can be replaced by "rpl_idx[i] is inferred to be equal to 0 in response to one reference picture list structure for reference picture list i being present in SPS", as rpl_idx[0] is inferred to be equal to 0 when one reference picture list structure of reference picture list 0 being present in SPS (referring to step 1508B). The efficiency of decoding process can be further improved.

FIG. 15C illustrates a portion of an exemplary semantics 1500C, according to some embodiments of the present disclosure. The semantics 1500C can be used in methods 1500A and 1500B. As shown in FIG. 15C, changes from the previous VVC are shown in italic, with proposed deleted syntax being further shown in strikethrough (referring to block 1510C and 1520C). Two alternative derivation descriptions are provided. In some embodiments, as shown in block 1510C, for the case that the rpl_idx[i] is not present, if there is at most one reference picture list structure for reference picture list i (e.g., sps_num_ref_pic_list[i] is less than or equal to 1), the value of rpl_idx[i] is inferred to equal to 0; otherwise (there is more than one reference picture list structure for reference picture i, that is sps_num_ref_pic_list[i] is greater than 1), and i is equal to 1, that is sps_num_ref_pic_list[1] is greater than 1, the value of rpl_idx[1] is inferred to be equal to rpl_idx[0]. The difference between block 1520C and 1510C is that the expression of "otherwise" and "i is equal to 1" are interpreted in detail as "sps_num_ref_pic_list[1] is greater than 1." In some embodiments, the condition "if sps_num_ref_pic_list[i] is less than or equal to 1" (referring to block 1511C and block 1521C) can be replaced by "if sps_num_ref_pic_list[i] is equal to 1."

In VVC (e.g., VVC draft 9), syntax element 1010A (e.g., sh_num_ref_idx_active_override_flag) being equal to 1 specifies that the syntax element sh_num_ref_idx_active_minus1[0] is present for P and B slices and the syntax element sh_num_ref_idx_active_minus1[1] is present for B slices. Syntax element 1010A being equal to 0 specifies that the syntax elements sh_num_ref_idx_active_minus1[0] and sh_num_ref_idx_active_minus1[1] are not present. However, as shown in FIG. 10A, when syntax element 1010A is equal to 1, the value of num_ref_entries[i][RplsIdx[i]] is further checked for signaling sh_num_ref_idx_active_minus1[i]. Syntax element sh_num_ref_idx_active_minus1[i] is signaled only when syntax element 1010A is equal to 1 and num_ref_entries[i][RplsIdx[i]] is greater than 1. As a result, syntax element 1010A equal to 1 does not necessarily mean sh_num_ref_idx_active_minus1[i] is signaled.

To overcome this deficiency with conventional coding technologies, in some embodiments of the present disclosure (such as provided below in FIGS. 16A-16C), an updated semantics for syntax element 1010A is provided to improve the efficiency of the encoding/decoding process.

Figure 16A:
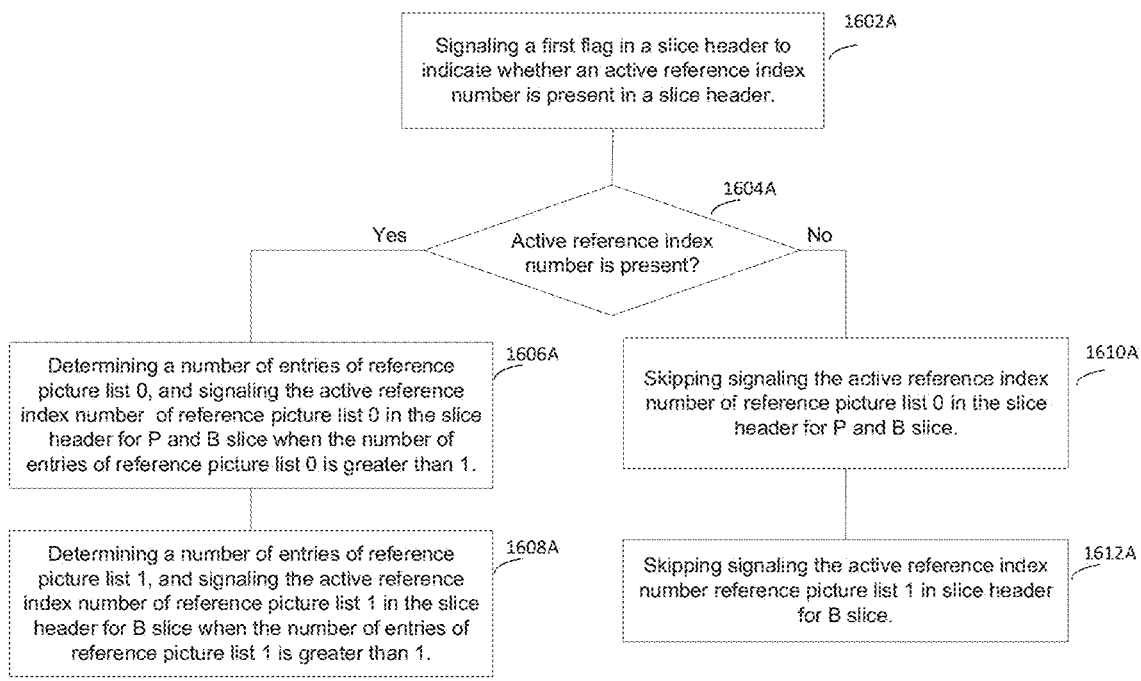
FIG. 16A shows a flow-chart of an exemplary video encoding method for indicating whether an override number of active reference index in slice header present, according to some embodiments of the present disclosure.

FIG. 16A illustrates a flow-chart of an exemplary video encoding method 1600A for indicating active reference index number in slice header present, according to some embodiments of the disclosure. Method 1600A can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1600A. In some embodiments, method 1600A can be implemented by a computer program product, embodied in a computer-readable medium, including computer-executable instructions, such as program code, executed by computers (e.g., apparatus 400 of FIG. 4). Referring to FIG. 16A, method 1600A may include the following steps 1602A-1608A.

At step 1602A, a first flag is signaled in a slice header to indicate whether an active reference index number is present in a slice header. For example, syntax element sh_num_ref_idx_active_override_flag is signaled to indicate whether the active reference index number of reference picture list i (e.g., sh_num_ref_idx_active_minus1[i]) (i equals to 0 or 1) is present in the slice header or not. The active reference index number is used to derive maximum reference index for a corresponding reference picture list that may be used to encode a current slice. The number of reference index used for encoding the current slice can be less than or equal to the maximum number derived from the active reference index number.

At step 1604A, whether the active reference index number being present is determined. When the first flag indicates the active reference index number is present, the syntax element sh_num_ref_idx_active_minus1[0] is present for P and B slices and the syntax element sh_num_ref_idx_active_minus1[1] is present for B slices. Then, step 1606A and step 1608A are performed.

At step 1606A, a number of entries of reference picture list 0 is determined first and if the number of entries of reference picture list 0 (e.g., num_ref_entries[0][RplsIdx[0]]) is determined to be greater than 1, an active reference index number of reference picture list 0 (e.g., sh_num_ref_idx_active_minus1[0]) is signaled in slice header for P and B slice.

At step 1608A, a number of entries of reference picture list 1 is determined first and if the number of entries of reference picture list 1 (e.g., num_ref_entries[1][RplsIdx[1]]) is determined to be greater than 1, an active reference index number of reference picture list 1 (e.g., sh_num_ref_idx_active_minus1[1]) is signaled in slice header for B slice.

With step 1606A and step 1608A, the active reference index number of reference picture list i (e.g., sh_num_ref_idx_active_minus1[i]) is signaled in the slice level when a number of entries of reference picture list i (e.g., num_ref_entries[i][RplsIdx[i]]) is greater than 1.

Therefore, the uncertainty for sh_num_ref_idx_active_minus1[i] signaled when the sh_num_ref_idx_active_override_flag being equals to 1 is eliminated, and the accuracy and robustness for encoding process can be improved.

In some embodiments, the method 1600A can further include step 1610A and 1612A. When the first flag indicates the active reference index number is not present, the syntax element sh_num_ref_idx_active_minus1[i] is not present. Then, step 1610A and step 1612A are performed.

At step 1610A, signaling the active reference index number of reference picture list 0 (e.g., sh_num_ref_idx_active_minus1[0]) is skipped in slice header for P and B slice. In another word, there is no sh_num_ref_idx_active_minus1[0] signaled in slice header for P and B slice.

At step 1612A, signaling the active reference index number of reference picture list 1 is skipped in slice header for B slice. In another word, there is no sh_num_ref_idx_active_minus1[1] signaled in slice header for B slice.

Therefore, when the active reference index number is not present, by skipping signaling the active reference number, the encoding process can be more efficient.

Figure 16B:
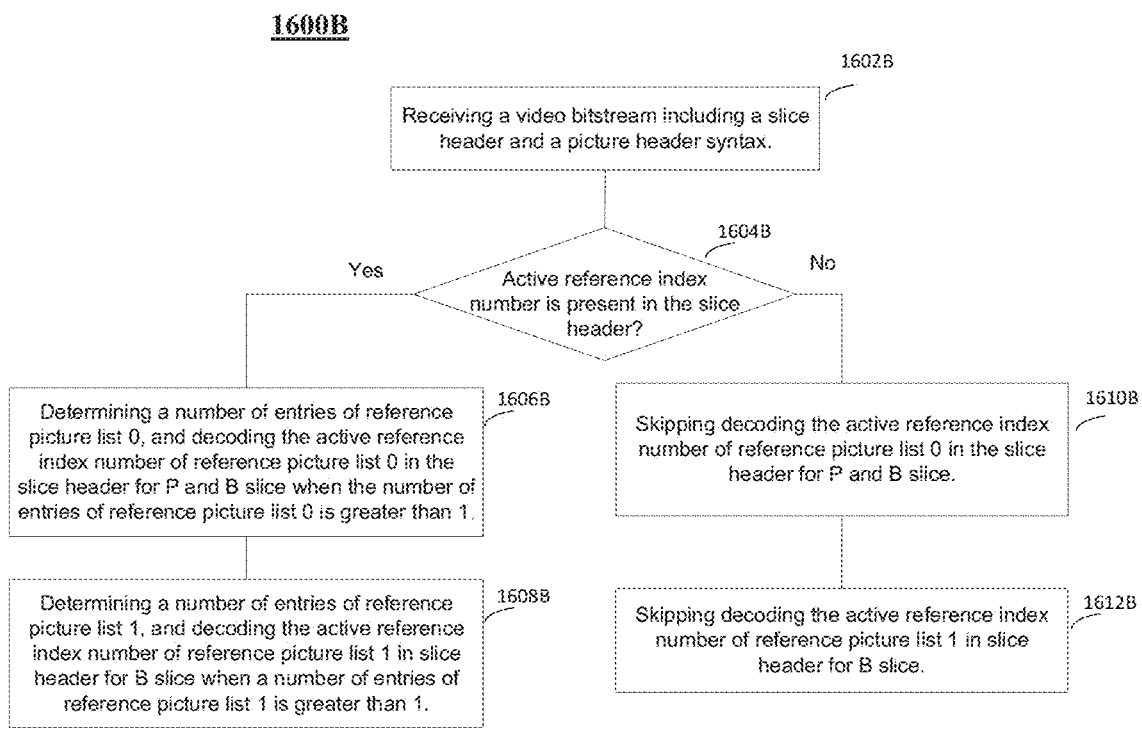
FIG. 16B shows a flow-chart of an exemplary video decoding method for indicating whether an override number of active reference index in slice header present, according to some embodiments of the present disclosure.

FIG. 16B illustrates a flow-chart of an exemplary video decoding method 1600B for indicating the active reference index number in slice header, according to some embodiments of the disclosure. Method 1600B can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1600B. In some embodiments, method 1600B can be implemented by a computer program product, embodied in a computer-readable medium, including computer-executable instructions, such as program code, executed by computers (e.g., apparatus 400 of FIG. 4). Referring to FIG. 16A, method 1600B may include the following steps 1602B-1608B.

At step 1602B, the decoder receives a video bitstream (e.g., Video bitstream 228 in FIG. 3B) including a slice header and a picture header syntax and the video bitstream may be coded using inter prediction. The reference pictures can be derived, for example, by reference picture 0 and reference picture list 1, each of which includes a list of reconstructed pictures in the DPB (e.g., buffer 234 in FIG. 3B) to be used as the reference pictures.

At step 1604B, a value of the first flag signaled in the slice header that indicates whether an active reference index number is present is determined. In some embodiments, the first flag is the syntax element sh_num_ref_idx_active_override_flag, which can indicate whether an active reference index of reference picture list i (e.g., sh_num_ref_idx_active_minus1[i]) (i equals to 0 or 1) is present or not. The active reference index number is used to derive maximum reference index for a corresponding reference picture list that may be used to decode a current slice. The number of reference index used for decoding the current slice can be less than or equal to the maximum number derived from the active reference index number.

When the value of the first flag is determined to a value indicating the active reference index number is present, the syntax element sh_num_ref_idx_active_minus1[0] is present for P and B slices and the syntax element sh_num_ref_idx_active_minus1[1] is present for B slices. Then, step 1606B and step 1608B are performed.

At step 1606B, a number of entries of reference picture list 0 (e.g., num_ref_entries[0][RplsIdx[0]]) is determined and if the number of entries of reference picture list 0 is determined to be greater than 1, an active reference index number of reference picture list 0 (e.g., sh_num_ref_idx_active_minus1[0]) is decoded in slice header for P and B slice.

At step 1608B, a number of entries of reference picture list 1 (e.g., num_ref_entries[1][RplsIdx[1]]) is determined and if the number of entries of reference picture list 1 is determined to be greater than 1, an active reference index number of reference picture list 1 (e.g., sh_num_ref_idx_active_minus1[1]) is decoded in slice header for B slice.

With step 1606B and step 1608B, the active reference index number of reference picture list i (e.g., sh_num_ref_idx_active_minus1[i]) is signaled when a number of entries of reference picture list i (e.g., num_ref_entries[i][RplsIdx[i]]) is greater than 1. Therefore, the uncertainty for sh_num_ref_idx_active_minus1[i] signaled when the sh_num_ref_idx_active_override_flag being equals to 1 is eliminated.

In some embodiments, the method 1600B can further include step 1610B and step 1612B. When the value of the first flag is determined to be a value indicating the active reference index number is not present, the syntax element sh_num_ref_idx_active_minus1[i] is not signaled. Then, step 1610B and step 1612B are performed.

At step 1610B, decoding the active reference index number of reference picture list 0 (e.g., sh_num_ref_idx_active_minus1[0]) is skipped in slice header for P and B slice. In another word, there is no sh_num_ref_idx_active_minus1[0] in slice header for B slice At step 1612B, decoding the active reference index number of reference picture list 1 (e.g., sh_num_ref_idx_active_minus1[1]) is skipped in slice header for B slice. In another word, there is no sh_num_ref_idx_active_minus1[1] present in slice header for B slice. Therefore, the efficiency of decoding process can be improved.

FIG. 16C illustrates a portion of an exemplary semantics 1600C, according to some embodiments of the present disclosure. The semantics 1600B can be used in method 1600A and 1600B. As shown in FIG. 16C, changes from the previous VVC are shown in italic, with proposed deleted syntax being further shown in strikethrough (referring to block 1610C and 1620C). Two alternative descriptions are provided. As shown in block 1610C, sh_num_ref_idx_active_override_flag being equal to 1 doesn't necessarily specify the syntax element sh_num_ref_idx_active_minus1[0] is present for P and B slices or the syntax element sh_num_ref_idx_active_minus1[1] is present for B slices. As shown in block 1620C, a condition of "when num_ref_entries[0][RplsIdx[0] is greater than 1" is added for the syntax element sh_num_ref_idx_active_minus1[0] is present for P and B slices and a condition of "when num_ref_entries[1][RplsIdx[1] is greater than 1" is added for the syntax element sh_num_ref_idx_active_minus1[1] is present for B slices, for sh_num_ref_idx_active_override_flag being equal to 1. Therefore, the accuracy and robustness for decoding process can be improved.

In VVC (e.g., VVC draft 9), there is a bitstream conformance constraint that the picture referred to by syntax element 1050A (e.g., sh_collocated_ref_idx) is the same for all slices of a coded picture and RprConstraintsActive[sh_collocated_from_l0_flag ? 0:1][sh_collocated_ref_idx] is equal to 0. To identify the picture referred to by syntax element 1050A, the value of syntax element 1040A (e.g., sh_collocated_from_l0_flag) and syntax element 1050A (e.g., sh_collocated_ref_idx) need to be decided first. However, as shown in FIG. 10A, syntax element 1040A is only signaled for B slice and syntax element 1050A is only signaled for P and B slice. For I slices, syntax element 1040A and syntax element 1050A are not signaled. And there is also no inferred value for these two syntax elements for I slices. As a result, for I slices, the value of syntax element 1050A is undefined. Therefore, the encoder/decoder cannot identify the picture referred to by syntax element 1050A and cannot perform the conformance constraint check.

To overcome this deficiency with conventional coding technologies, in some embodiments of the present disclosure (such as provided below in FIG. 17A and FIG. 17B), updated semantics are provided to improve the accuracy and robustness for video processing.

Figure 17A:
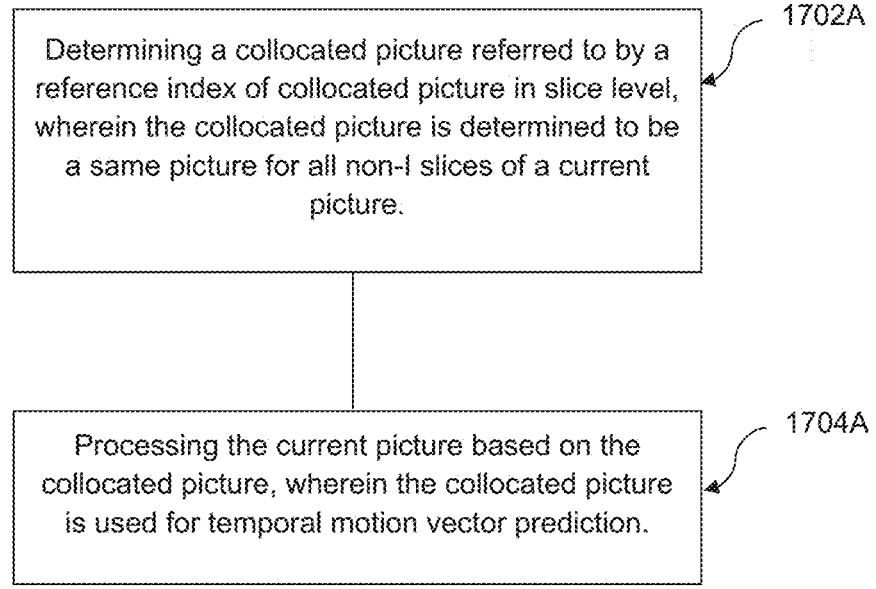
FIG. 17A shows a flow-chart of an exemplary video processing method for defining an index of collocated picture in SH for I slices, according to some embodiments of the present disclosure.

For example, FIG. 17A illustrates a flow-chart of an exemplary video processing method 1700A for picture processing. Method 1700A can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1700A. In some embodiments, method 1700A can be implemented by a computer program product, embodied in a computer-readable medium, including computer-executable instructions, such as program code, executed by computers (e.g., apparatus 400 of FIG. 4). Referring to FIG. 24A, method 1700A may include the step 1702A and 1704A.

At step 1702A, determining a collocated picture referred to by a reference index of the collocated picture in slice level (e.g., sh_collocated_ref_idx), wherein the collocated picture is determined to be a same picture for all non-I slices of a current picture. Therefore, the uncertainty for the values of sh_collocated_ref_idx and sh_collocated_from_l0_flag is avoided.

At step 1704A, the current picture is processed based on the collocated picture, wherein the collocated picture is used for temporal motion vector prediction. Thus, the robustness for video processing can be improved.

That is picture used for temporal motion vector prediction which is referred to by a reference index of collocated picture is determined to be the same for all non-I slices of a coded picture. In some embodiments, picture used for temporal motion vector prediction that is referred to by a reference index of collocated picture is determined to be the same for all P slices and B slices of a current picture.

FIG. 17B illustrates a portion of an exemplary semantics 1700B, according to some embodiments of the present disclosure. The semantics 1700B can be used in method 1700A. As shown in FIG. 17B, changes from the previous VVC are shown in italic, with proposed deleted syntax being further shown in strikethrough (referring to block 1710B and 1720B). Two alternative description are provided. As shown in block 1710B, the requirement of bitstream conformance is further detailed to "all non-I slices" instead of "all slices". Therefore, the efficiency and robustness for decoding process is improved. The difference between block 1720B and 1710B is that the expression of "non-I slices" is replaced by "P slices and B slices" to be more accurate.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

The embodiments may further be described using the following clauses:

1. A computer-implemented method for encoding video, comprising:
   encoding a current picture based on a collocated picture, wherein the collocated picture is used for temporal motion vector prediction; and
   signaling a first flag and a second flag in response to a number of entries in a reference picture list 0 and a number of entries in a reference picture list 1 being both greater than 0, wherein the first flag indicates that the collocated picture is derived from the reference picture list 0 or the reference picture list 1, and the second flag indicates whether a motion vector difference syntax structure is signaled.

2. A computer-implemented method for decoding video, comprising:
   receiving a video bitstream;
   decoding a first flag and a second flag in response to a number of entries in a reference picture list 0 and a number of entries in a reference picture list 1 being both greater than 0, wherein the first flag indicates a collocated picture used for temporal motion vector prediction is derived from the reference picture list 0 or the reference picture list 1, and the second flag indicates whether a motion vector difference syntax structure is present in the bitstream for a current picture; and
   decoding the current picture based on the collocated picture.

3. A computer-implemented method for encoding video, comprising:
   encoding a current picture based on a collocated picture, wherein the collocated picture is used for temporal motion vector prediction; and
   indicating the collocated picture in the bitstream without signaling an index to a reference picture list.

4. The method of clause 3, wherein indicating the collocated picture in the bitstream without signaling an index to a reference picture list further comprises:
   signaling a first flag to indicate whether the collocated picture is an inter-layer reference picture; and
   in response to the collocated picture being an inter-layer reference picture, signaling a first parameter to indicate the collocated picture, wherein the first parameter indicates the index of the collocated picture to the list of direct reference layers of the layer where the current picture is in.

5. The method of clause 4, wherein indicating the collocated picture in the bitstream without signaling an index to a reference picture list further comprises:
   signaling a second flag to indicate whether the collocated picture is a short-term reference picture or a long-term reference picture; and
   in response to the collocated picture being the short-term reference picture, signaling a second parameter to indicate the collocated picture, wherein the second parameter indicates a difference between a picture order count of the collocated picture and a picture order count of the current picture.

6. The method of clause 5, further comprising:
   in response to the collocated picture being the long-term reference picture, signaling a third parameter and a fourth parameter to indicate the collocated picture, wherein the third parameter indicates a least significant bit (LSB) of picture order count (POC) of the collocated picture and the fourth parameter indicates a delta most significant bit (MSB) of picture order count (POC) of the collocated picture.

7. The method of clause 6, wherein the first flag, the second flag, the first parameter, the second parameter, the third parameter and the fourth parameter are signaled in a picture header, and all slices within a picture have a same collocated picture.

8. The method of clause 3, wherein the reference picture list is reference picture list 0 or reference picture list 1.

9. A computer-implemented method for decoding video, comprising:
   receiving a video bitstream;
   determining a collocated picture used for temporal motion vector prediction without decoding an index to a reference picture list; and decoding a current picture based on the collocated picture.
10. The method of clause 9, wherein determining the collocated picture used for temporal motion vector prediction without decoding an index to the reference picture list further comprises:
  decoding a first flag that indicates whether the collocated picture is an inter-layer reference picture;
  determining whether the collocated picture is an inter-layer reference picture based on the first flag; and
  in response to the collocated picture being an inter-layer reference picture, decoding a first parameter and determining the collocated picture based on the first parameter, wherein the first parameter indicates an index of the collocated picture to the list of direct reference layers of the layer where the current picture is in.
11. The method of clause 10, wherein determining the collocated picture used for temporal motion vector prediction without decoding an index to a reference picture list structure further comprises:
  decoding a second flag that indicates whether the collocated picture is a short-term reference picture or a long-term reference picture;
  determining whether the collocated picture is the short-term reference picture or the long-term reference picture based on the second flag; and
  in response to the collocated picture being the short-term reference picture, decoding a second parameter and determining the collocated picture based on the second parameter, wherein the second parameter indicates a difference between a picture order count of the collocated picture and a picture order count of the current picture.
12. The method of clause 11, further comprising:
  in response to the collocated picture being the long-term reference picture, decoding a third parameter and a fourth parameter and determining the collocated picture based on the third and the fourth parameter, wherein the third parameter indicates a least significant bit (LSB) of picture order count (POC) of the collocated picture and the fourth parameter indicates a delta most significant bit (MSB) of picture order count (POC) of the collocated picture.
13. The method of clause 12, wherein the first flag, the second flag, the first parameter, the second parameter, the third parameter and the fourth parameter are present in a picture header, and all slices within a picture have a same collocated picture.
14. The method of clause 9, wherein the reference picture list is reference picture list 0 or reference picture list 1.
15. A computer-implemented method for encoding video, comprising:
  determining whether to signal a parameter to indicate a reference index of a collocated picture in a slice header;
  in response to the parameter not being signaled in the slice header, determining the collocated picture as the picture referred to by an index with a value equal to a smaller one between a value of a reference index of the collocated picture signaled in a picture header and a number of active entries in a target reference picture list minus 1; and
  encoding a current picture based on the collocated picture, wherein the collocated picture is used for temporal motion vector prediction.
16. The method of clause 15, wherein the target reference picture list is indicated by a flag that indicates from which reference picture list the collocated picture used for temporal motion vector prediction is derived.
17. A computer-implemented method for decoding video, comprising:
  receiving a video bitstream;
  determining whether a parameter indicating a reference index of a collocated picture used for temporal motion vector prediction is present in a slice header;
  in response to the parameter being not present, determining a value of the parameter to be equal to a smaller one between a value of a reference index of the collocated picture used for temporal motion vector prediction present in picture header and a number of active entries in a target reference picture list minus 1;
  determining the collocated picture as a picture referred to by an index with a value equal to the value of the parameter in the target reference picture list; and
  decoding a current picture based on the collocated picture.
18. The method of clause 17, wherein the target reference picture list is indicated by a flag that indicates from which reference picture list the collocated picture used for temporal motion vector prediction is derived.
19. A computer-implemented method for video processing, comprising:
  deriving a total number by summing a number of reference picture list structures in sequence parameter set (SPS) and one;
  allocating memory for the total number of reference picture list structures in response to a reference picture list structure being signaled in a picture header of a current picture or a slice header of a current slice; and
  processing a current picture or a current slice using the allocated memory.
20. A computer-implemented method for encoding video, comprising:
  signaling a first flag in a picture parameter set (PPS) to indicate whether a second flag and a first index is present in a picture header syntax or a slice header for a current picture referring to the PPS; wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1;
  determining whether the first index and a second index to be signaled, wherein the second index is an index, to the list of the reference picture list structures associated with reference picture list 0 included in the SPS, of the reference picture list structure associated with reference picture list 0 that is used for derivation of reference picture list 0;
  in response to the second index not to be signaled, determining a value of the second index comprising:
    when at most one reference picture list structure associated with reference picture list 0 is included in SPS, determining the value of the second index to be equal to 0;

in response to the first index not to be signaled, determining a value of the first index comprising:
  when at most one reference picture list structure associated with reference picture list 1 is included in SPS, determining the value of the first index to be equal to 0; and
  when the first flag is equal to 0 and the second flag is equal to 1, determining the value of the first index to be equal to the value of the second index;
deriving the reference picture list based on the first index and the second index; and
encoding the current picture based on the reference picture list.

21. A computer-implemented method for decoding video, comprising:
receiving a video bitstream;
determining a value of a first flag indicating whether a second flag and a first index is present in a picture header syntax or a slice header for a current picture, wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1;
determining whether the first index and a second index being present, wherein the second index is the index, to the list of the reference picture list structures associated with reference picture list 0 included in the SPS, of the reference picture list structure associated with reference picture list 0 that is used for derivation of reference picture list 0;
in response to the second index being not present, determining a value of the second index comprising:
  when at most one reference picture list structure associated with reference picture list 0 is included in SPS, determining the value of the second index to be equal to 0;
in response to the first index being not present, determining a value of the first index comprising:
  when at most one reference picture list structure associated with reference picture list 1 is included in SPS, determining the value of the first index to be equal to 0; and
  when the first flag is equal to 0 and the second flag is equal to 1, determining the value of the first index to be equal to the value of the second index; and
decoding a current picture based on the first index and the second index.

22. A computer-implemented method for encoding video, comprising:
signaling a first flag in a slice header to indicate whether an active reference index number is present in a slice header, wherein the active reference index number is used to derive maximum reference index for a corresponding reference picture list that can be used to encode a current slice;
in response to the first flag indicating the active reference index number is present in the slice header,
  determining a number of entries of reference picture list 0, and signaling the active reference index number of reference picture list 0 in the slice header for P and B slice when the number of entries of reference picture list 0 is greater than 1; and
  determining a number of entries of reference picture list 1, and signaling the active reference index number of reference picture list 1 in the slice header for B slice when the number of entries of reference picture list 1 is greater than 1.

23. A method of clause 22, further comprising:
in response to the first flag indicating the active reference index number is not present in the slice header,
  skipping signaling the active reference index number of reference picture list 0 in the slice header for P and B slice; and
  skipping signaling the active reference index number reference picture list 1 in slice header for B slice.

24. A computer-implemented method for decoding video, comprising:
receiving a video bitstream including a slice header and a picture header syntax;
determining a value of a first flag signaled in the slice header that indicates whether an active reference index number is present in the slice header, wherein the active reference index number is used to derive maximum reference index for a corresponding reference picture list that can be used to decode a current slice;
in response to the first flag indicating the active reference index number is present,
  determining a number of entries of reference picture list 0, and decoding the active reference index number of reference picture list 0 in the slice header for P and B slice when the number of entries of reference picture list 0 is greater than 1; and
  determining a number of entries of reference picture list 1, and decoding the active reference index number of reference picture list 1 in slice header for B slice when a number of entries of reference picture list 1 is greater than 1.

25. The method of clause 24, further comprising:
in response to the first flag indicating the active reference index number is not present,
  skipping decoding the active reference index number of reference picture list 0 in the slice header for P and B slice; and
  skipping decoding the active reference index number of reference picture list 1 in slice header for B slice.

26. A computer-implemented method for video processing, comprising:
determining a collocated picture referred to by a reference index of the collocated picture in slice level, wherein the collocated picture is determined to be a same picture for all non-I slices of a current picture; and
processing the current picture based on the collocated picture, wherein the collocated picture is used for temporal motion vector prediction.

27. A computer-implemented method for video processing, comprising:
determining a collocated picture referred to by a reference index of the collocated picture in slice level, wherein the collocated picture is determined to be a same picture for all P slices and B slices of a current picture; and processing the current picture based on the collocated picture, wherein the collocated picture is used for temporal motion vector prediction.

28. An apparatus for performing video data processing, the apparatus comprising:
a memory configured to store instructions; and
one or more processors configured to execute the instructions to cause the apparatus to perform:
encoding a current picture based on a collocated picture, wherein the collocated picture is used for temporal motion vector prediction; and
signaling a first flag and a second flag in response to a number of entries in a reference picture list 0 and a number of entries in a reference picture list 1 being both greater than 0, wherein the first flag indicates that the collocated picture is derived from the reference picture list 0 or the reference picture list 1, and the second flag indicates whether a motion vector difference syntax structure is signaled.

29. An apparatus for performing video data processing, the apparatus comprising:
a memory configured to store instructions; and
one or more processors configured to execute the instructions to cause the apparatus to perform:
receiving a video bitstream;
decoding a first flag and a second flag in response to a number of entries in a reference picture list 0 and a number of entries in a reference picture list 1 being both greater than 0, wherein the first flag indicates a collocated picture used for temporal motion vector prediction is derived from the reference picture list 0 or the reference picture list 1, and the second flag indicates whether a motion vector difference syntax structure is present in the bitstream for a current picture; and
decoding the current picture based on the collocated picture.

30. An apparatus for performing video data processing, the apparatus comprising:
a memory configured to store instructions; and
one or more processors configured to execute the instructions to cause the apparatus to perform:
encoding a current picture based on a collocated picture, wherein the collocated picture is used for temporal motion vector prediction; and
indicating the collocated picture in the bitstream without signaling an index to a reference picture list.

31. The apparatus of clause 30, wherein the processor is further configured to execute the instructions to cause the apparatus to perform:
signaling a first flag to indicate whether the collocated picture is an inter-layer reference picture; and
in response to the collocated picture being an inter-layer reference picture, signaling a first parameter to indicate the collocated picture, wherein the first parameter indicates the index of the collocated picture to the list of direct reference layers of the layer where the current picture is in.

32. The apparatus of clause 31, wherein the processor is further configured to execute the instructions to cause the apparatus to perform:
signaling a second flag to indicate whether the collocated picture is a short-term reference picture or a long-term reference picture; and in response to the collocated picture being the short-term reference picture, signaling a second parameter to indicate the collocated picture, wherein the second parameter indicates a difference between a picture order count of the collocated picture and a picture order count of the current picture.

33. The apparatus of clause 32, wherein the processor is further configured to execute the instructions to cause the apparatus to perform:
in response to the collocated picture being the long-term reference picture, signaling a third parameter and a fourth parameter to indicate the collocated picture, wherein the third parameter indicates a least significant bit (LSB) of picture order count (POC) of the collocated picture and the fourth parameter indicates a delta most significant bit (MSB) of picture order count (POC) of the collocated picture.

34. The apparatus of clause 33, wherein the first flag, the second flag, the first parameter, the second parameter, the third parameter and the fourth parameter are signaled in a picture header, and all slices within a picture have a same collocated picture.

35. The apparatus of clause 30, wherein the reference picture list is reference picture list 0 or reference picture list 1.

36. An apparatus for performing video data processing, the apparatus comprising:
a memory configured to store instructions; and
one or more processors configured to execute the instructions to cause the apparatus to perform:
receiving a video bitstream;
determining a collocated picture used for temporal motion vector prediction without decoding an index to a reference picture list; and
decoding a current picture based on the collocated picture.

37. The apparatus of clause 36, wherein the processor is further configured to execute the instructions to cause the apparatus to perform:
decoding a first flag that indicates whether the collocated picture is an inter-layer reference picture;
determining whether the collocated picture is an inter-layer reference picture based on the first flag; and
in response to the collocated picture being an inter-layer reference picture, decoding a first parameter and determining the collocated picture based on the first parameter, wherein the first parameter indicates an index of the collocated picture to the list of direct reference layers of the layer where the current picture is in.

38. The apparatus of clause 37, wherein the processor is further configured to execute the instructions to cause the apparatus to perform:
decoding a second flag that indicates whether the collocated picture is a short-term reference picture or a long-term reference picture;
determining whether the collocated picture is the short-term reference picture or the long-term reference picture based on the second flag; and
in response to the collocated picture being the short-term reference picture, decoding a second parameter and determining the collocated picture based on the second parameter, wherein the second parameter indicates a difference between a picture order count of the collocated picture and a picture order count of the current picture.

39. The apparatus of clause 38, wherein the processor is further configured to execute the instructions to cause the apparatus to perform:
in response to the collocated picture being the long-term reference picture, decoding a third parameter and a fourth parameter and determining the collocated picture based on the third and the fourth parameter, wherein the third parameter indicates a least significant bit (LSB) of picture order count (POC) of the collocated picture and the fourth parameter indicates a delta most significant bit (MSB) of picture order count (POC) of the collocated picture.

40. The apparatus of clause 39, wherein the first flag, the second flag, the first parameter, the second parameter, the third parameter and the fourth parameter are present in a picture header, and all slices within a picture have a same collocated picture.

41. The apparatus of clause 36 wherein the reference picture list is reference picture list 0 or reference picture list 1.

42. An apparatus for performing video data processing, the apparatus comprising:
a memory configured to store instructions; and
one or more processors configured to execute the instructions to cause the apparatus to perform:
determining whether to signal a parameter to indicate a reference index of a collocated picture in a slice header;
in response to the parameter not being signaled in the slice header, determining the collocated picture as the picture referred to by an index with a value equal to a smaller one between a value of a reference index of the collocated picture signaled in a picture header and a number of active entries in a target reference picture list minus 1; and
encoding a current picture based on the collocated picture, wherein the collocated picture is used for temporal motion vector prediction.

43. The apparatus of clause 42, wherein the target reference picture list is indicated by a flag that indicates from which reference picture list the collocated picture used for temporal motion vector prediction is derived.

44. An apparatus for performing video data processing, the apparatus comprising:
a memory configured to store instructions; and
one or more processors configured to execute the instructions to cause the apparatus to perform:
receiving a video bitstream;
determining whether a parameter indicating a reference index of a collocated picture used for temporal motion vector prediction is present in a slice header; and
in response to the parameter being not present, determining a value of the parameter to be equal to a smaller one between a value of a reference index of the collocated picture used for temporal motion vector prediction present in picture header and a number of active entries in a target reference picture list minus 1;
determining the collocated picture as a picture referred to by an index with a value equal to the value of the parameter in the target reference picture list; and
decoding a current picture based on the collocated picture.

45. The apparatus of clause 44, wherein the target reference picture list is indicated by a flag that indicates from which reference picture list the collocated picture used for temporal motion vector prediction is derived.

46. An apparatus for performing video data processing, the apparatus comprising:
a memory configured to store instructions; and
one or more processors configured to execute the instructions to cause the apparatus to perform:
deriving a total number by summing a number of reference picture list structures in sequence parameter set (SPS) and one;
allocating memory for the total number of reference picture list structures in response to a reference picture list structure being signaled in a picture header of a current picture or a slice header of a current slice; and
processing a current picture or a current slice using the allocated memory.

47. An apparatus for performing video data processing, the apparatus comprising:
a memory configured to store instructions; and
one or more processors configured to execute the instructions to cause the apparatus to perform:
signaling a first flag in a picture parameter set (PPS) to indicate whether a second flag and a first index is present in a picture header syntax or a slice header for a current picture referring to the PPS; wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1;
determining whether the first index and a second index to be signaled, wherein the second index is an index, to the list of the reference picture list structures associated with reference picture list 0 included in the SPS, of the reference picture list structure associated with reference picture list 0 that is used for derivation of reference picture list 0;
in response to the second index not to be signaled, determining a value of the second index comprising:
when at most one reference picture list structure associated with reference picture list 0 is included in SPS, determining the value of the second index to be equal to 0;
in response to the first index not to be signaled, determining a value of the first index comprising:
when at most one reference picture list structure associated with reference picture list 1 is included in SPS, determining the value of the first index to be equal to 0; and
when the first flag is equal to 0 and the second flag is equal to 1, determining the value of the first index to be equal to the value of the second index;
deriving the reference picture list based on the first index and the second index; and
encoding the current picture based on the reference picture list.

48. An apparatus for performing video data processing, the apparatus comprising:
a memory configured to store instructions; and
one or more processors configured to execute the instructions to cause the apparatus to perform:
receiving a video bitstream;
determining a value of a first flag indicating whether a second flag and a first index is present in a picture header syntax or a slice header for a current picture, wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1;
determining whether the first index and a second index being present, wherein the second index is the index, to the list of the reference picture list structures associated with reference picture list 0 included in the SPS, of the reference picture list structure associated with reference picture list 0 that is used for derivation of reference picture list 0;
in response to the second index being not present, determining a value of the second index comprising:
when at most one reference picture list structure associated with reference picture list 0 is included in SPS, determining the value of the second index to be equal to 0;
in response to the first index being not present, determining a value of the first index comprising:
when at most one reference picture list structure associated with reference picture list 1 is included in SPS, determining the value of the first index to be equal to 0; and
when the first flag is equal to 0 and the second flag is equal to 1, determining the value of the first index to be equal to the value of the second index; and
decoding a current picture based on the first index and the second index.

49. An apparatus for performing video data processing, the apparatus comprising:
a memory configured to store instructions; and
one or more processors configured to execute the instructions to cause the apparatus to perform:
signaling a first flag in a slice header to indicate whether an active reference index number is present in a slice header, wherein the active reference index number is used to derive maximum reference index for a corresponding reference picture list that can be used to encode a current slice;
in response to the first flag indicating the active reference index number is present in the slice header,
determining a number of entries of reference picture list 0, and signaling the active reference index number of reference picture list 0 in the slice header for P and B slice when the number of entries of reference picture list 0 is greater than 1; and
determining a number of entries of reference picture list 1, and signaling the active reference index number of reference picture list 1 in the slice header for B slice when the number of entries of reference picture list 1 is greater than 1.

50. The apparatus of clause 49, wherein the processor is further configured to execute the instructions to cause the apparatus to perform:
in response to first flag indicating the active reference index number is not present in the slice header,
skipping signaling the active reference index number of reference picture list 0 in the slice header for P and B slice; and
skipping signaling the active reference index number reference picture list 1 in slice header for B slice.

51. An apparatus for performing video data processing, the apparatus comprising:
a memory configured to store instructions; and
one or more processors configured to execute the instructions to cause the apparatus to perform:
receiving a video bitstream including a slice header and a picture header syntax;
determining a value of a first flag signaled in the slice header that indicates whether an active reference index number is present in the slice header, wherein the active reference index number is used to derive maximum reference index for a corresponding reference picture list that can be used to decode a current slice;
in response to the first flag indicating the active reference index number is present,
determining a number of entries of reference picture list 0, and decoding the active reference index number of reference picture list 0 in the slice header for P and B slice when the number of entries of reference picture list 0 is greater than 1; and
determining a number of entries of reference picture list 1, and decoding the active reference index number of reference picture list 1 in slice header for B slice when a number of entries of reference picture list 1 is greater than 1.

52. The apparatus of clause 50, wherein the processor is further configured to execute the instructions to cause the apparatus to perform:
in response to the first flag indicating the active reference index number is not present,
skipping decoding the active reference index number of reference picture list 0 in the slice header for P and B slice; and
skipping decoding the active reference index number of reference picture list 1 in slice header for B slice.

53. An apparatus for performing video data processing, the apparatus comprising:
a memory configured to store instructions; and
one or more processors configured to execute the instructions to cause the apparatus to perform:
determining a collocated picture referred to by a reference index of the collocated picture in slice level, wherein the collocated picture is determined to be a same picture for all non-I slices of a current picture; and
processing the current picture based on the collocated picture, wherein the collocated picture is used for temporal motion vector prediction.

54. An apparatus for performing video data processing, the apparatus comprising:
a memory configured to store instructions; and
one or more processors configured to execute the instructions to cause the apparatus to perform:
determining a collocated picture referred to by a reference index of the collocated picture in slice level, wherein the collocated picture is determined to be a same picture for all P slices and B slices of a current picture; and
processing the current picture based on the collocated picture, wherein the collocated picture is used for temporal motion vector prediction.

55. A non-transitory computer readable medium that stores a set of instructions that is executable by one or more processors of an apparatus to cause the apparatus to initiate a method for performing video data processing, the method comprising:
encoding a current picture based on a collocated picture, wherein the collocated picture is used for temporal motion vector prediction; and
signaling a first flag and a second flag in response to a number of entries in a reference picture list 0 and a number of entries in a reference picture list 1 being both greater than 0, wherein the first flag indicates that the collocated picture is derived from the reference picture list 0 or the reference picture list 1, and the second flag indicates whether a motion vector difference syntax structure is signaled.

56. A non-transitory computer readable medium that stores a set of instructions that is executable by one or more processors of an apparatus to cause the apparatus to initiate a method for performing video data processing, the method comprising:
receiving a video bitstream;
decoding a first flag and a second flag in response to a number of entries in a reference picture list 0 and a number of entries in a reference picture list 1 being both greater than 0, wherein the first flag indicates a collocated picture used for temporal motion vector prediction is derived from the reference picture list 0 or the reference picture list 1, and the second flag indicates whether a motion vector difference syntax structure is present in the bitstream for a current picture; and
decoding the current picture based on the collocated picture.

57. A non-transitory computer readable medium that stores a set of instructions that is executable by one or more processors of an apparatus to cause the apparatus to initiate a method for performing video data processing, the method comprising:
encoding a current picture based on a collocated picture, wherein the collocated picture is used for temporal motion vector prediction; and
indicating the collocated picture in the bitstream without signaling an index to a reference picture list.

58. The non-transitory computer readable medium of clause 57, wherein the method further comprises:
signaling a first flag to indicate whether the collocated picture is an inter-layer reference picture; and
in response to the collocated picture being an inter-layer reference picture, signaling a first parameter to indicate the collocated picture, wherein the first parameter indicates the index of the collocated picture to the list of direct reference layers of the layer where the current picture is in.

59. The non-transitory computer readable medium of clause 58, wherein the method further comprises:
signaling a second flag to indicate whether the collocated picture is a short-term reference picture or a long-term reference picture; and
in response to the collocated picture being the short-term reference picture, signaling a second parameter to indicate the collocated picture, wherein the second parameter indicates a difference between a picture order count of the collocated picture and a picture order count of the current picture.

60. The non-transitory computer readable medium of clause 59, wherein the method further comprises:
in response to the collocated picture being the long-term reference picture, signaling a third parameter and the fourth parameter to indicate the collocated picture, wherein the third parameter indicates a least significant bit (LSB) of picture order count (POC) of the collocated picture and a fourth parameter indicates a delta most significant bit (MSB) of picture order count (POC) of the collocated picture.

61. The non-transitory computer readable medium of clause 60, wherein the first flag, the second flag, the first parameter, the second parameter, the third parameter and the fourth parameter are signaled in a picture header, and all slices within a picture have a same collocated picture.

62. The non-transitory computer readable medium of clause 57, wherein the reference picture list is reference picture list 0 or reference picture list 1.

63. A non-transitory computer readable medium that stores a set of instructions that is executable by one or more processors of an apparatus to cause the apparatus to initiate a method for performing video data processing, the method comprising:
receiving a video bitstream;
determining a collocated picture used for temporal motion vector prediction without decoding an index to a reference picture list; and
decoding a current picture based on the collocated picture.

64. The non-transitory computer readable medium of clause 63, wherein the method further comprises:
decoding a first flag that indicates whether the collocated picture is an inter-layer reference picture;
determining whether the collocated picture is an inter-layer reference picture based on the first flag; and
in response to the collocated picture being an inter-layer reference picture, decoding a first parameter and determining the collocated picture based on the first parameter, wherein the first parameter indicates an index of the collocated picture to the list of direct reference layers of the layer where the current picture is in.

65. The non-transitory computer readable medium of clause 64, wherein the method further comprises:
decoding a second flag that indicates whether the collocated picture is a short-term reference picture or a long-term reference picture;
determining whether the collocated picture is the short-term reference picture or the long-term reference picture based on the second flag; and
in response to the collocated picture being the short-term reference picture, decoding a second parameter and determining the collocated picture based on the second parameter, wherein the second parameter indicates a difference between a picture order count of the collocated picture and a picture order count of the current picture.

66. The non-transitory computer readable medium of clause 65, wherein the method further comprises:
   in response to the collocated picture being the long-term reference picture, decoding a third parameter and a fourth parameter and determining the collocated picture based on the third and the fourth parameter, wherein the third parameter indicates a least significant bit (LSB) of picture order count (POC) of the collocated picture and the fourth parameter indicates a delta most significant bit (MSB) of picture order count (POC) of the collocated picture.

67. The non-transitory computer readable medium of clause 66, wherein the first flag, the second flag, the first parameter, the second parameter, the third parameter and the fourth parameter are present in a picture header, and all slices within a picture have a same collocated picture.

68. The non-transitory computer readable medium of clause 63, wherein the reference picture list is reference picture list 0 or reference picture list 1.

69. A non-transitory computer readable medium that stores a set of instructions that is executable by one or more processors of an apparatus to cause the apparatus to initiate a method for performing video data processing, the method comprising:
   determining whether to signal a parameter to indicate a reference index of a collocated picture in a slice header;
   in response to the parameter not being signaled in the slice header, determining the collocated picture as the picture referred to by an index with a value equal to a smaller one between a value of a reference index of the collocated picture signaled in a picture header and a number of active entries in a target reference picture list minus 1; and
   encoding a current picture based on the collocated picture, wherein the collocated picture is used for temporal motion vector prediction.

70. The non-transitory computer readable medium of clause 69, wherein the target reference picture list is indicated by a flag that indicates from which reference picture list the collocated picture used for temporal motion vector prediction is derived.

71. A non-transitory computer readable medium that stores a set of instructions that is executable by one or more processors of an apparatus to cause the apparatus to initiate a method for performing video data processing, the method comprising:
   receiving a video bitstream;
   determining whether a parameter indicating a reference index of a collocated picture used for temporal motion vector prediction is present in a slice header;
   in response to the parameter being not present, determining a value of the parameter to be equal to a smaller one between a value of a reference index of the collocated picture used for temporal motion vector prediction present in picture header and a number of active entries in a target reference picture list minus 1;
   determining the collocated picture as a picture referred to by an index with a value equal to the value of the parameter in the target reference picture list; and
   decoding a current picture based on the collocated picture.

72. The non-transitory computer readable medium of clause 71, wherein the target reference picture list is indicated by a flag that indicates from which reference picture list the collocated picture used for temporal motion vector prediction is derived.

73. A non-transitory computer readable medium that stores a set of instructions that is executable by one or more processors of an apparatus to cause the apparatus to initiate a method for performing video data processing, the method comprising:
   deriving a total number by summing a number of reference picture list structures in sequence parameter set (SPS) and one;
   allocating memory for the total number of reference picture list structures in response to a reference picture list structure being signaled in a picture header of a current picture or a slice header of a current slice; and
   processing a current picture or a current slice using the allocated memory.

74. A non-transitory computer readable medium that stores a set of instructions that is executable by one or more processors of an apparatus to cause the apparatus to initiate a method for performing video data processing, the method comprising:
   signaling a first flag in a picture parameter set (PPS) to indicate whether a second flag and a first index is present in a picture header syntax or a slice header for a current picture referring to the PPS; wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1;
   determining whether the first index and a second index to be signaled, wherein the second index is an index, to the list of the reference picture list structures associated with reference picture list 0 included in the SPS, of the reference picture list structure associated with reference picture list 0 that is used for derivation of reference picture list 0;
   in response to the second index not to be signaled, determining a value of the second index comprising:
      when at most one reference picture list structure associated with reference picture list 0 is included in SPS, determining the value of the second index to be equal to 0;
   in response to the first index not to be signaled, determining a value of the first index comprising:
      when at most one reference picture list structure associated with reference picture list 1 is included in SPS, determining the value of the first index to be equal to 0; and
      when the first flag is equal to 0 and the second flag is equal to 1, determining the value of the first index to be equal to the value of the second index;
   deriving the reference picture list based on the first index and the second index; and
   encoding the current picture based on the reference picture list.

75. A non-transitory computer readable medium that stores a set of instructions that is executable by one or more processors of an apparatus to cause the apparatus to initiate a method for performing video data processing, the method comprising:
receiving a video bitstream;
determining a value of a first flag indicating whether a second flag and a first index is present in a picture header syntax or a slice header for a current picture, wherein the second flag indicates whether reference picture list 1 is derived based on one of the reference picture list structures associated with reference picture list 1 signaled in a sequence parameter set (SPS) and the first index is the index, to the list of the reference picture list structures associated with reference picture list 1 included in the SPS, of the reference picture list structure associated with reference picture list 1 that is used for derivation of reference picture list 1;
determining whether the first index and a second index being present, wherein the second index is the index, to the list of the reference picture list structures associated with reference picture list 0 included in the SPS, of the reference picture list structure associated with reference picture list 0 that is used for derivation of reference picture list 0;
in response to the second index being not present, determining a value of the second index comprising:
when at most one reference picture list structure associated with reference picture list 0 is included in SPS, determining the value of the second index to be equal to 0;
in response to the first index being not present, determining a value of the first index comprising:
when at most one reference picture list structure associated with reference picture list 1 is included in SPS, determining the value of the first index to be equal to 0; and
when the first flag is equal to 0 and the second flag is equal to 1, determining the value of the first index to be equal to the value of the second index; and
decoding a current picture based on the first index and the second index.

76. A non-transitory computer readable medium that stores a set of instructions that is executable by one or more processors of an apparatus to cause the apparatus to initiate a method for performing video data processing, the method comprising:
signaling a first flag in a slice header to indicate whether an active reference index number is present in a slice header, wherein the active reference index number is used to derive maximum reference index for a corresponding reference picture list that can be used to encode a current slice;
in response to the first flag indicating the active reference index number is present in the slice header,
determining a number of entries of reference picture list 0, and signaling the active reference index number of reference picture list 0 in the slice header for P and B slice when the number of entries of reference picture list 0 is greater than 1; and
determining a number of entries of reference picture list 1, and signaling the active reference index number of reference picture list 1 in the slice header for B slice when the number of entries of reference picture list 1 is greater than 1.

77. The non-transitory computer readable medium of clause 76, wherein the method further comprises:
in response to the first flag indicating the active reference index number is not present in the slice header,
skipping signaling the active reference index number of reference picture list 0 in the slice header for P and B slice; and
skipping signaling the active reference index number reference picture list 1 in slice header for B slice.

78. A non-transitory computer readable medium that stores a set of instructions that is executable by one or more processors of an apparatus to cause the apparatus to initiate a method for performing video data processing, the method comprising:
receiving a video bitstream including a slice header and a picture header syntax;
determining a value of a first flag signaled in the slice header that indicates whether an active reference index number is present in the slice header, wherein the active reference index number is used to derive maximum reference index for a corresponding reference picture list that can be used to decode a current slice;
in response to the first flag indicating the active reference index number is present,
determining a number of entries of reference picture list 0, and decoding the active reference index number of reference picture list 0 in the slice header for P and B slice when the number of entries of reference picture list 0 is greater than 1; and
determining a number of entries of reference picture list 1, and decoding the active reference index number of reference picture list 1 in slice header for B slice when a number of entries of reference picture list 1 is greater than 1.

79. The non-transitory computer readable medium of clause 78, wherein the method further comprises:
in response to the first flag indicating the active reference index number is not present,
skipping decoding the active reference index number of reference picture list 0 in the slice header for P and B slice; and
skipping decoding the active reference index number of reference picture list 1 in slice header for B slice.

80. A non-transitory computer readable medium that stores a set of instructions that is executable by one or more processors of an apparatus to cause the apparatus to initiate a method for performing video data processing, the method comprising:
determining a collocated picture referred to by a reference index of the collocated picture in slice level, wherein the collocated picture is determined to be a same picture for all non-I slices of a current picture; and
processing the current picture based on the collocated picture, wherein the collocated picture is used for temporal motion vector prediction.

81. A non-transitory computer readable medium that stores a set of instructions that is executable by one or more processors of an apparatus to cause the apparatus to initiate a method for performing video data processing, the method comprising:
determining a collocated picture referred to by a reference index of the collocated picture in slice level, wherein the collocated picture is determined to be a same picture for all P slices and B slices of a current picture; and processing the current picture based on the collocated picture, wherein the collocated picture is used for temporal motion vector prediction.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An apparatus for performing video data processing, the apparatus comprising:
   a memory configured to store instructions; and
   one or more processors configured to execute the instructions to cause the apparatus to perform:
      signaling a first flag in a picture parameter set (PPS) to indicate whether a second flag and a first index are present in a picture header syntax or a slice header for a current picture referring to the PPS; wherein the second flag indicates whether reference picture list 1 is derived based on one of reference picture list structures associated with the reference picture list 1 signaled in a sequence parameter set (SPS) and the first index is an index, to a list of the reference picture list structures associated with the reference picture list 1 included in the SPS, of a reference picture list structure that is associated with the reference picture list 1 and that is used for derivation of the reference picture list 1;
      determining whether the first index and a second index to be signaled, wherein the second index is an index, to a list of reference picture list structures associated with reference picture list 0 included in the SPS, of a reference picture list structure that is associated with the reference picture list 0 and that is used for derivation of the reference picture list 0;
      in response to the second index not to be signaled, determining a value of the second index comprising:
         when at most one reference picture list structure associated with the reference picture list 0 is included in the SPS, determining the value of the second index to be equal to 0;
      in response to the first index not to be signaled, determining a value of the first index comprising:
         when at most one reference picture list structure associated with the reference picture list 1 is included in the SPS, determining the value of the first index to be equal to 0; and
         when the first flag is equal to 0 and the second flag is equal to 1, determining the value of the first index to be equal to the value of the second index;
      deriving the reference picture list 1 based on the first index or the reference picture list 0 based on the second index; and
      encoding the current picture based on the reference picture list 1 or the reference picture list 0.

2. A non-transitory computer readable medium that stores a bitstream of a video for processing according to a method comprising:
   determining a value of a first flag indicating whether a second flag and a first index are present in a picture header syntax or a slice header for a current picture, wherein the second flag indicates whether reference picture list 1 is derived based on one of reference picture list structures associated with the reference picture list 1 signaled in a sequence parameter set (SPS) and the first index is an index, to a list of the reference picture list structures associated with the reference picture list 1 included in the SPS, of a reference picture list structure that is associated with the reference picture list 1 and that is used for derivation of the reference picture list 1;
   determining whether the first index and a second index being present, wherein the second index is an index, to a list of reference picture list structures associated with reference picture list 0 included in the SPS, of a reference picture list structure associated with the reference picture list 0 that is used for derivation of the reference picture list 0;
   in response to the second index being not present, determining a value of the second index comprising:
      when at most one reference picture list structure associated with the reference picture list 0 is included in the SPS, determining the value of the second index to be equal to 0;
   in response to the first index being not present, determining a value of the first index comprising:
      when at most one reference picture list structure associated with the reference picture list 1 is included in the SPS, determining the value of the first index to be equal to 0; and
      when the first flag is equal to 0 and the second flag is equal to 1, determining the value of the first index to be equal to the value of the second index; and
   decoding a current picture based on the first index and the second index.

3. A computer-implemented method for decoding video, comprising:
   receiving a video bitstream;
   determining a value of a first flag indicating whether a second flag and a first index are present in a picture header syntax or a slice header for a current picture, wherein the second flag indicates whether reference picture list 1 is derived based on one of reference picture list structures associated with the reference picture list 1 signaled in a sequence parameter set (SPS) and the first index is an index, to a list of the reference picture list structures associated with the reference picture list 1 included in the SPS, of a reference picture list structure that is associated with the reference picture list 1 and that is used for derivation of the reference picture list 1;
   determining values of the first index and a second index, wherein the second index is an index, to a list of reference picture list structures associated with reference picture list 0 included in the SPS, of a reference picture list structure that is associated with the reference picture list 0 and that is used for derivation of the reference picture list 0; and decoding a current picture based on the first index and the second index, wherein the second index is not present, and the value of the second index is determined to be:
  equal to 0 when at most one reference picture list structure associated with the reference picture list 0 is included in the SPS;

wherein the first index is not present, and the value of the first index is determined to be:
  equal to 0 when at most one reference picture list structure associated with the reference picture list 1 is included in the SPS; and
  equal to the value of the second index when the first flag is equal to 0 and the second flag is equal to 1.

* * * * *